United States Patent
Guim Bernat et al.

(10) Patent No.: US 12,259,254 B2
(45) Date of Patent: Mar. 25, 2025

(54) SYSTEMS AND METHODS FOR VEHICLE-OCCUPANCY-BASED AND USER-PREFERENCE-BASED SMART ROUTING AND AUTONOMOUS VOLUMETRIC-OCCUPANCY MEASUREMENT

(71) Applicant: Intel Corporation, Santa Clara, CA (US)

(72) Inventors: Francesc Guim Bernat, Barcelona (ES); Marcos E. Carranza, Portland, OR (US); Satish Chandra Jha, Portland, OR (US); Sindhu Pandian, Hillsboro, OR (US); Lakshmi Talluru, Chandler, AZ (US); Cesar Martinez-Spessot, Beaverton, OR (US); Mateo Guzman, Beaverton, OR (US); Dario Nicolas Oliver, Hillsboro, OR (US); Ignacio J. Alvarez, Portland, OR (US); David Gonzalez Aguirre, Portland, OR (US); Javier Felip Leon, Hillsboro, OR (US); S M Iftekharul Alam, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 904 days.

(21) Appl. No.: 17/247,844

(22) Filed: Dec. 26, 2020

(65) Prior Publication Data
US 2021/0116261 A1    Apr. 22, 2021

(51) Int. Cl.
G06F 3/048     (2013.01)
G01C 21/36    (2006.01)
(Continued)

(52) U.S. Cl.
CPC ....... *G01C 21/3664* (2013.01); *G05D 1/0212* (2013.01); *G08G 1/09* (2013.01)

(58) Field of Classification Search
CPC ..... G01C 21/3664; G05D 1/0212; G08G 1/09
See application file for complete search history.

(56) References Cited

U.S. PATENT DOCUMENTS 10,372,129 B1 * 8/2019 Urmson .................... G06T 7/20
11,263,904 B2 * 3/2022 O'Sullivan ............ G08G 1/123
(Continued)

OTHER PUBLICATIONS

"RedBus", [Online]. Retrieved from the Internet: URL: https : www.redbus.in , (accessed on Jan. 14, 2022), 4 pgs.
(Continued)

*Primary Examiner* — David Phantana-angkool
(74) *Attorney, Agent, or Firm* — Schwegman Lundberg & Woessner, P.A.

(57) ABSTRACT

Disclosed herein are systems and methods for vehicle-occupancy-based and user-preference-based smart routing, and autonomous volumetric-occupancy measurement. In an embodiment, a system is configured to receive from a user device associated with a user, a routing-options request for routing options between two locations, and to responsively identify one or more routing options between the two locations based at least in part on occupancy data for a vehicle that would be utilized for at least a portion of at least one of the identified routing options. The occupancy data is based on an output of an automated occupancy-measurement system onboard the vehicle. The system is also configured to provide the one or more identified routing options to the user device. In some embodiments, the occupancy data is obtained using volumetric-occupancy measurement. Some embodiments relate to volumetric-occupancy measurement conducted by autonomous mesh nodes.

24 Claims, 17 Drawing Sheets

(51) Int. Cl.
  *G05D 1/00*   (2006.01)
  *G08G 1/09*   (2006.01)

(56) References Cited

U.S. PATENT DOCUMENTS

| | | | | |
|---|---|---|---|---|
| 11,734,618 | B2* | 8/2023 | Ogden | G06Q 10/02 |
| | | | | 705/6 |
| 11,745,768 | B2* | 9/2023 | Urano | G06Q 50/40 |
| | | | | 701/2 |
| 11,747,808 | B2* | 9/2023 | Nix | G06Q 10/02 |
| | | | | 701/25 |
| 11,801,730 | B1* | 10/2023 | Vader | G06Q 50/40 |
| 11,802,778 | B2* | 10/2023 | Dubielzyk | G06Q 50/40 |
| 2018/0209803 | A1* | 7/2018 | Rakah | G06Q 10/0631 |
| 2020/0104770 | A1* | 4/2020 | Aich | B60N 2/245 |
| 2020/0142407 | A1* | 5/2020 | Kozloski | G01C 21/3484 |
| 2020/0160477 | A1* | 5/2020 | Ramot | G06T 7/215 |
| 2020/0160709 | A1* | 5/2020 | Ramot | G06Q 10/047 |
| 2020/0242945 | A1* | 7/2020 | Beaurepaire | G08G 1/20 |
| 2021/0116261 | A1* | 4/2021 | Guim Bernat | G01C 21/3664 |
| 2021/0280067 | A1* | 9/2021 | Beaurepaire | G01C 21/3682 |
| 2022/0005140 | A1* | 1/2022 | Beaurepaire | G06F 16/9535 |
| 2022/0065644 | A1* | 3/2022 | Kundu | G01C 21/3446 |
| 2022/0099450 | A1* | 3/2022 | Pandit | G08G 1/147 |
| 2022/0169258 | A1* | 6/2022 | Samarthyam | H04L 67/12 |
| 2022/0276066 | A1* | 9/2022 | Beaurepaire | G01C 21/3492 |
| 2023/0080281 | A1* | 3/2023 | Kundu | G06N 5/022 |
| | | | | 701/410 |
| 2023/0274634 | A1* | 8/2023 | Takahashi | G08G 1/056 |
| | | | | 701/118 |
| 2023/0325631 | A1* | 10/2023 | Kelly | G06N 3/045 |
| 2024/0092345 | A1* | 3/2024 | Shin | G06N 3/0495 |
| 2024/0219191 | A1* | 7/2024 | Eylander | G01C 21/3453 |

OTHER PUBLICATIONS

"Intel Distribution of OpenVINO Toolkit", [Online]. Retrieved from the Internet: URL: https: www.intel.com content www US en developer tools openvino-toolkit overview.html, (accessed on Jan. 14, 2022), 9 pgs.

"A multilayered space-event model for navigation in indoor spaces", 3D geo-information sciences, (2009), 20 pgs.

Aldoma, Aitor, "OUR-CVFH-oriented, unique and repeatable clustered viewpoint feature histogram for object recognition and 6DOF pose estimation", Joint DAGM (German Association for Pattern Recognition) and OAGM Symposium. Springer, (2012).

Berclaz, Jerome, "Evaluation of probabilistic occupancy map people detection for surveillance systems", Proceedings of the IEEE International Workshop on Performance Evaluation of Tracking and Surveillance. No. CONF [Online]. Retrieved from the Internet: URL: https: www.epfl.ch labs cvlab software tracking-and-modelling-people pom , (2009), 4 pgs.

Choy, Christoher, "Fully convolutional geometric features", Proceedings of the IEEE International Conference on Computer Vision, (2019), 9 pgs.

Haque, Armin, "Towards vision-based smart hospitals: A system for tracking and monitoring hand hygiene compliance", arXiv preprint arXiv:1708.00163, (2017), 13 pgs.

Hasaballah, Taylah, "Transit crowdedness trends from around the world, according to Google Maps", [Online]. Retrieved from the Internet: URL: https: www.blog.google products maps transit-crowdedness-trends-around , (Jun. 27, 2019), 5 pgs.

Hornung, A, "OctoMap; An Efficient Probabilistic 3D Mapping Framework Based on Octrees", Automonomous Robots [Online]. Retrieved from the Internet: URL: https: octomap.github.io , (2013), 3 pgs.

Nagarajan, Ramesh, "Get around safely with these new Google Maps features", [Online]. Retrieved from the Internet: URL: https : blog.google products maps get-around-safely-these-new-google-maps-features , (Jun. 8, 2020), 7 pgs.

* cited by examiner

SYSTEMS AND METHODS FOR VEHICLE-OCCUPANCY-BASED AND USER-PREFERENCE-BASED SMART ROUTING AND AUTONOMOUS VOLUMETRIC-OCCUPANCY MEASUREMENT

TECHNICAL FIELD

Embodiments of the present disclosure relate to smart routing, occupancy measurement, public health, public safety, and, more particularly, to vehicle-occupancy-based and user-preference-based smart routing, and to autonomous volumetric-occupancy measurement.

BACKGROUND

There are numerous contexts in which prospective travelers evaluate a number of different routes that they could take to travel between locations. Such people include tourists and commuters, as examples, as well as people that are traveling for other reasons within a given city, between cities, between states, among countries, etc. Some routes that prospective travelers consider include only a single travel modality, while others include a combination of different travel modalities. Example travel modalities include walking, biking, driving, taking one or more buses, taking one or more trains (e.g., subway trains, elevated trains, commuter trains, passenger trains, etc.), taking one or more airplanes, taking one or more boats (e.g., ferries), etc. When choosing among multiple routes, people often weigh factors such as expected transit time, cost, comfort, convenience, weather, traffic, and so forth. There are a number of websites, apps, and the like that assist prospective travelers by presenting multiple routing options for a given trek, and in some cases by providing expected travel times, expected costs, links for purchasing tickets, and/or the like.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
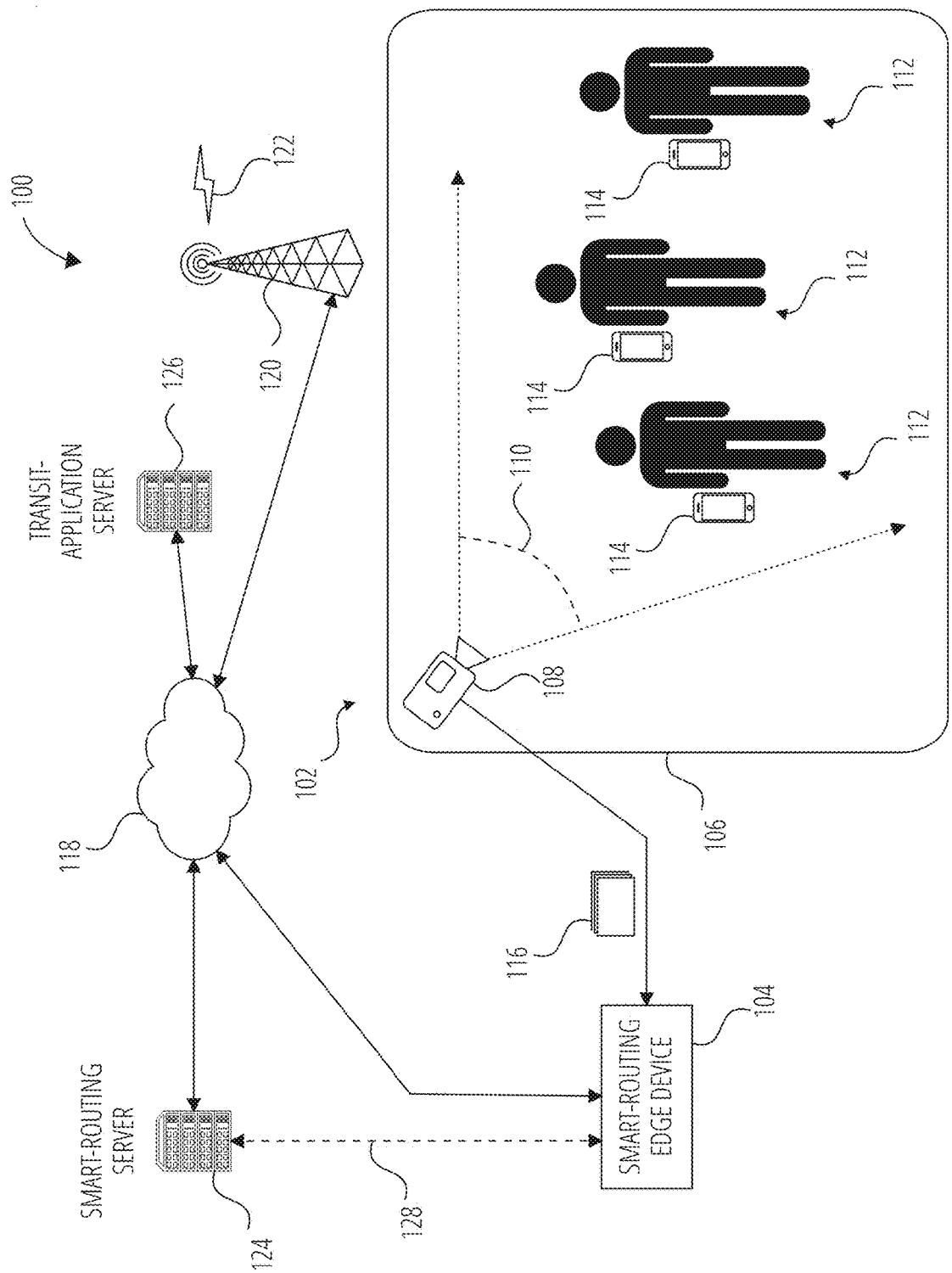
FIG. 1 depicts a first example communication context that includes a first example occupancy-measurement configuration, in accordance with at least one embodiment.

In an example scenario, a person is looking to make an example trek from one location to another in a big city, perhaps as part of a commute to or from work. In such a situation, it is typically the case that the person, when waiting for a given bus or train, is unaware of how crowded the bus or train will be until it arrives. This often occurs when, as examples, people take public transportation during peak hours and/or travel frequently in densely populated areas. To set expectations in such situations, people often make educated guesses based on past experiences, day of the week, time of day, how many other people are waiting with them at their stop, and so forth.

Often, when a person sees that an overcrowded bus or train has arrived, what they do next depends on circumstances and factors such as whether they have time to spare, whether they are naturally patient or impatient, and so forth. Ultimately, they generally either squeeze in or wait for the next one, or the next one after that, etc. This scenario was undoubtedly more common prior to the ongoing COVID-19 pandemic than it is at the moment, and will become common again. At the present time, many modes of transportation in many places are operating at less than 50% of capacity, though some are completely open and allowing operation at 100% of capacity in, e.g., their public transportation. In any case, due to the present need, desire, and often mandate to social distance, neither boarding an overcrowded vehicle nor waiting at an overcrowded station is a particularly good option at the moment, nor are such options all that appealing regardless of the times.

Among other inspirations and motivations, embodiments of the present disclosure arose in part from the realization and recognition that, as has become increasingly and acutely problematic during the ongoing pandemic, it is often the case that modes of transportation that are taken by people between various locations often involve a number of people being in relatively close contact with one another, very often separated by than less six feet. This situation is exacerbated in densely populated areas such as major cities. In situations in which there are multiple routing options between a first location X and a second location Y, it would be advantageous for people making a routing selection to know in advance how crowded they could expect a particular vehicle (e.g, a bus or a train) to be on a given leg of a possible route. Such knowledge could influence a decision such as taking a current bus or train, waiting for the next one, or "calling an audible" (e.g., taking a cab or rideshare service, walking, not going, etc.). Currently, people do not have, or at least typically do not select from, these options until the relevant bus or train shows up, and even then people don't know how crowded the next one will be.

Some prior implementations of travel-related software, websites, desktop applications, mobile apps, and the like incorporate vehicle-occupancy data into their travel-planning features, though among the shortcomings of such implementations is that this occupancy data is limited to being provided in the context of pre-booked travel, such as on-demand taxis, rideshare services, station-to-station (e.g., city-to-city) bus tickets, and the like. As one example, some bus-ticketing platforms and airline-ticketing platforms display the number of remaining seats on a given vehicle for a given trip, and many provide users with the option of preselecting a particular seat. Additionally, there are mapping services that provide crowd-sourced predictions of crowdedness, though, being crowd-sourced, these features tend not to be overly reliable or to provide real-time information to prospective travelers prior to boarding. These approaches also tend to be limited in applicability to point-to-point contexts, such as a particular leg of a possible journey.

As an other example of a prior implementation, there are transportation applications-a term that is used herein as broadly encompassing websites, desktop applications, mobile apps, and so forth that are related at least in part to transportation, transit, travel, etc.—that present suggested routes as well as personal bike routes, among other information. Such transportation applications, however, typically display only a most-efficient routing option for a prospective traveler based on that prospective traveler's current location. Some such applications present options such as suggested routes, combined public-transit-and-personal-biking routes, and taxi routes. In many cases, such implementations present the exact same set of routing options to very different people who happen to be in the same location at the time that they are accessing the application.

To address these and other shortcomings of prior implementations, disclosed herein are systems and methods for vehicle-occupancy-based and user-preference-based smart routing. Embodiments of the present disclosure account for and tailor to different people owning or at least having access to different sets of vehicles, and also account for and tailor to different people's preferences with respect to the occupancy level of a given vehicle at a given time, different people's preferences for or against certain modes of transportation generally and/or in certain ambient (e.g., weather) conditions and/or in certain situations (e.g., after a certain time of night), different extents to which different people are willing and/or wanting to travel using their bicycle (or a shared-bicycle service, etc.), different extents to which different people are willing and/or wanting to walk, different amounts of time that different people are willing to wait for various different forms of transportation, and/or one or more additional preferences.

Embodiments of the present disclosure involve identifying a current and/or predicted occupancy level of one or more vehicles that would be utilized as all or part of a given routing option. Additionally, some embodiments involve suggesting routes to users and/or rerouting users to routes that they would prefer based on their preselected preferences (as recorded in, e.g., a stored user profile). Moreover, in at least some embodiments, users can incorporate into their profile one or more hard-and-fast rules (e.g., "no routing on a bus or a train that is at or above (or predicted to be at or above) 75% occupancy," etc.) and/or one or more preferences that fall short of being hard-and-fast rules (e.g., "prefer bus and train that is below 75% occupancy unless the wait is 45 minutes or longer," etc.). Furthermore, in different embodiments, a situation such as a bus having a current or expected occupancy level that is at or above a given user-specified threshold may result in routes that would involve that bus not being suggested or presented as an option at all, being presented as an option but one that is less recommended than one or more other routes, and/or the like.

It is noted that, in the present disclosure, the terms "capacity" and "occupancy" are used differently (from one another). Capacity is used herein as akin to a limit that a given vehicle or other space can accommodate, and could be based on how many people could physically fit inside a given space, how many seats and authorized standing positions there are, legal limits on the number of people in the given space at a given time, and/or the like. So capacity is an upper bound, and occupancy is a measure of how full the relevant space currently is (or is expected or predicted to be at a relevant future time). As an example to illustrate the manner in which these two words are used in this disclosure, a city bus that is occupied at % of capacity at a given moment and is permitted by city law to have no more than 60 passengers on board at any particular time has a current occupancy of 45 people (75%) and has a capacity of 60 people (100%). It could be the case that, in non-pandemic times, the city permits the bus to have as many as 100 passengers on board at any given time, and that number may be used as the capacity in those times, whereas 60 may be used during times of social distancing. Thus, during the pandemic, 45 people is 75% occupancy, which could also be stated as "an occupancy of 75% of capacity," "being at 75% of capacity," "being at 75% capacity," and/or the like. In non-pandemic times, those 45 people would represent a 45% occupancy of the higher, 100-person capacity.

In accordance with at least one embodiment, one or more video cameras are deployed inside a given vehicle (e.g., a bus, a train compartment, etc.) in order to determine the current occupancy of the vehicle, which in some embodiments includes counting how many people (or passengers, etc.) are currently inside the vehicle. In some cases, existing security cameras or other existing cameras can be leveraged for use in connection with one or more embodiments. In some embodiments, instead of or in addition to internally mounted cameras, one or more externally mounted cameras are used to count people entering and exiting a vehicle in order to determine how many people are in the vehicle at a given time.

In some embodiments, a person-detection model is utilized for this purpose, and that model may implement capabilities such as person identification and person reidentification, the latter of which relates to attempting to avoid or at least minimize the counting of any person as more than one person if they, for example, keep exiting the vehicle and then getting back in. In some embodiments, as described more fully below, volumetric analysis is implemented to monitor the occupancy of a given space (e.g., the inside of a vehicle) in an ongoing manner. This approach is also useful in non-vehicle contexts, including for spaces such as the inside of a train station, the inside of a warehouse, the inside of a shipping container, the inside of a business such as a gym, a bar, a restaurant, and so forth.

Before proceeding, it is noted that there are mentions in this disclosure of measuring an occupancy of a space, a cabin, an inside of a vehicle or other space, etc. Any description herein that seems specific to a given one or few of such terms should not be read that way. It is for brevity and clarity of presentation that each mention of any of these is not accompanied by a full list of all other alternatives, though it should be understood that the principles apply equally to each of those alternatives and to other spaces, any one or more of which could just as easily be specifically mentioned herein. For example, a phrase such as "monitoring the inside of a space" should be understood to mean something akin to "monitoring the inside of a space such as a room, the inside of a vehicle, the inside of a train station, and/or the inside of any other suitable space, etc." It should not be assumed or summarily (or even eventually) concluded, for example, that description of embodiments involving monitoring the occupancy of the inside of a bus or train are limited in their applicability to vehicles.

Furthermore, in at least one embodiment, in addition to monitoring current occupancy of one or more vehicles, historical data of the occupancy of different vehicles at different times on different days is maintained to facilitate making predictions regarding expected occupancy of a given vehicle or other space at a given time. In accordance with embodiments of the present disclosure, expected-occupancy predictions are usefully provided to travelers who are attempting to select a preferred route from one location to another. Prospective travelers may find this information helpful due to concerns about social distancing and/or for one or more other reasons. Indeed, in some embodiments, the real-time occupancy of a given vehicle and/or a projected occupancy of the vehicle at a future time is obtained by, e.g., a route-planning app such as Moovit, which incorporates this information into presentation of route options, selection of routes, priority of recommendations among possible routes, and/or the like.

Moreover, some embodiments account for vehicles in which an overall occupancy is high or is predicted to be high but in which there are still particular spaces that remain relatively open; in an example scenario, a football team, volleyball team, show choir, etc. may be traveling together and sitting together, leaving open space in a given train car, bus, and/or the like. In another case, passengers may be packing the forward cars of a given train and leaving the rearward cars relatively open. Thus, as an example, a train could be treated as a vehicle, or any subset of one or more of its cars could be treated as a vehicle, and so on. Additional types of preferences that can be included in user profiles in various different embodiments and accordingly used to enhance multimodal-routing suggestions or selections include preferences such as "prefer less than 50% capacity," "prefer biking over walking," "prefer walking over waiting at a station," etc. Embodiments of the present disclosure consider such preferences and others and create custom routes that accord with the respective preferences of individual users.

During the above-mentioned ongoing COVID-19 pandemic, so-called lockdowns, shelter-at-home orders, shelter-in-place orders, stay-at-home orders, and the like seem to come and go as the virus ebbs and flows in various different places at various different times. Presently, many countries, states, counties, cities, and other jurisdictions are struggling to figure out how to safely reopen one or more aspects of their community. Public and other shared modes of transportation (e.g., airlines, private bus lines, commuter ferries, etc.) have taken a significant hit to their bottom line due to the reticence of people to use such services even when allowed to, as well as due to a number of actual shutdowns, legal limits on occupancy, and the like of many such services. In many places in which modes of transportation are operating, it is very often the case that these services are not permitted to function at full capacity, nor would they likely often be full in any event, even if they were allowed to be.

As described, these restrictions, prudent and necessary as they may be and typically are, tend not only to limit people's options-including routing options—as a legal matter, but also to have a chilling effect on people's willingness to use the options that are available. Among other advantages, embodiments of the present disclosure address some of these fears and stresses by enhancing multimodal-trip planning based on actual and expected occupancy levels of particular vehicles, in addition to enhancing such planning based on user-manageable preference profiles, as described above and elsewhere herein. Some embodiments involve providing the herein-described smart-routing enhancements as a service to governments to assist them in achieving a certain degree of social distancing, whether mandated by law or just in the interest of caution, health, safety, and the like. Governments and/or other organizations may use embodiments of the present disclosure to obtain real-time usage statistics, occupancy statistics, and/or the like, with respect to interiors of vehicles, interiors of transportation hubs such train stations, and/or one or more other spaces, be they related to transportation or not.

Furthermore, embodiments of the present disclosure are also useful in contexts other than epidemics, pandemics, and the like, and as a general matter can be utilized for any number of reasons in any number of contexts in which it may be beneficial to, for example, measure occupancy in a given space such as a given train station, a given train car, a given bus, and/or the like. Moreover, embodiments of the present disclosure can be usefully employed to measure occupancy in one or more spaces that are unrelated to transportation (e.g., a bar, a restaurant, a gym, a museum, a retail store, a grocery store, etc.). Such measurements can facilitate identification of high-demand, low-demand, medium-demand, etc. days during a week, days or weeks during a month, months during the year, times during a given day of the week, on weekdays, on weekend days, and so on. Furthermore, in the context of transportation and travel, such measurements may assist transit and travel providers, governments, and/or the like by providing such organizations with additional information that can be advantageously used to deploy additional vehicles, take vehicles offline for maintenance, adjust a number of stops for reasons such as fuel efficiency, compare usage of different modalities of transport during various different times (e.g., buses and trains by day, rideshare vehicles by night, etc.), make decisions regarding environmental impact, trigger alerts when, e.g., capacity limits are not being adhered to, and/or the like.

One embodiment takes the form of a system that includes a processor configured to receive a routing-options request for routing options from a first location to a second location, the routing-options request being received from a user device associated with a user; identify, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle; and provide the one or more identified routing options to the user device.

Another embodiment takes the form of one or more non-transitory computer-readable storage media containing instructions that, when executed by at least one hardware processor, cause the at least one hardware processor to perform operations including the operations listed in the preceding paragraph. Still another embodiment takes the form of a method that is performed by a computer system executing instructions on at least one hardware processor, and that includes the operations listed in the preceding paragraph.

Still another embodiment takes the form of a system that includes communication means for receiving a routing-options request for routing options from a first location to a second location, the routing-options request being received from a user device; and route-identification means for identifying, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle, the communication means being further for providing the one or more identified routing options to the user device.

Yet another embodiment takes the form of one or more non-transitory computer-readable storage media containing instructions that, when executed by at least one hardware processor, cause the at least one hardware processor to perform operations including receiving a routing-options request for routing options from a first location to a second location, the routing-options request being received from a user device associated with a user; identifying, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle; and providing the one or more identified routing options to the user device.

Another embodiment takes the form of a method performed by a computer system executing instructions on at least one processor, the method including receiving a routing-options request for routing options from a first location to a second location, the routing-options request being received from a user device associated with a user; identifying, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle; and providing the one or more identified routing options to the user device.

Broadly speaking, in addition to embodiments of systems and methods for vehicle-occupancy-based and user-preference-based smart routing, also disclosed herein are embodiments of systems and methods for autonomous volumetric-occupancy measurement. Those two categories of embodiments are referred to herein at times as "smart-routing embodiments" and "volumetric-occupancy embodiments," respectively. And while it is certainly the case that many embodiments from each of those categories fit together in interesting and advantageous ways with various different embodiments from the other, and while it is also the case that combinations of examples of the two types of embodiments are themselves embodiments of the present disclosure, it is important that it be understood that not all smart-routing embodiments involve volumetric-based occupancy measurement, and not all volumetric-occupancy embodiments apply only (if they do at all) to transportation-related and routing-related contexts.

Moreover, not every embodiment that is described herein is also labeled herein as being in one category or the other-few are, in fact. Indeed, many non-categorical references are made herein such as "embodiments of the present disclosure," "in at least one embodiment," and so forth. Generally speaking, however, FIG. 1 through FIG. 13 and their descriptions pertain primarily to smart-routing embodiments, FIG. 14 through FIG. 18 and their descriptions pertain primarily to volumetric-occupancy embodiments, and FIG. 19 and FIG. 20 and their descriptions pertain to the same extent to all embodiments. And though it is the case that at least some of the smart-routing embodiments of the present disclosure make use of occupancy measurements of vehicles and other spaces in various ways, these embodiments are largely agnostic as to how that measurement is conducted. That being said, certainly some of the smart-routing embodiments that are disclosed herein include description of one or more example ways in which the occupancy of a given volume can be measured, typically involving one or more approaches that count human beings in the field of view of one or more types of cameras.

Volumetric-occupancy embodiments seek to measure how much of a given volume (e.g., the inside of a train car) is occupied by something as opposed to nothing, regardless of the sort of something with which that volume is occupied. To wit, in at least some volumetric-occupancy embodiments, the volume of dogs counts the same as the volume of suitcases, the volume of people counts the same as the volume of strollers, the volume of bicycles counts the same as the volume of tubas, and so forth. This is referred to at times as at least some of the volumetric-occupancy embodiments of the present disclosure being "class-free" in that they make no attempt to determine what something in a field of view is (using, e.g., an image-processing convolutional neural network (CNN), a deep neural network (DNN), etc.), noting only that something is there (or probably there).

The class-free aspect of at least some volumetric-occupancy embodiments protects the privacy of those passing through the field of view in monitored spaces. Thus, in connection with one or more embodiments, the extent (by volume) to which a monitored space is occupied serves as a proxy for the number of people present in that space, the crowdedness level of that space, and so forth, and not an actual count of human beings. Such approaches can be beneficial in certain types of smart-routing embodiments, such as those that involve buses, trains, train platforms, and the like that frequently get so packed with people that visually segmenting and counting individual people is not feasible.

Volumetric occupancy is often expressed in terms of how many or what percentage or what fraction, etc. of discrete volume elements ("voxels") in a monitored space are occupied by something as opposed to nothing. The voxels may be arranged in a three-dimensional (3D) lattice that is aligned with the axes of an XYZ coordinate system that is projected on the monitored space. A given voxel may be considered to be occupied by something in the real world if that voxel is, e.g., overlapped by, or within the boundaries of, etc. that something. In at least some such embodiments, a voxel is counted as occupied if and only if a determination that it is occupied is coupled with at least a threshold confidence value. In some embodiments, a likelihood value is computed and maintained for each voxel, where the likelihood value for a given voxel represents a calculated likelihood that the voxel is occupied.

As an alternative to expressing volumetric occupancy in terms of occupied voxels, it can be expressed in terms of how many or what percentage or what fraction, etc. of virtual cubes (or other 3D shapes) into which a monitored space has been virtually demarcated are occupied by something, with reference again to an XYZ coordinate system. In this sort of formulation, a given cube may be considered to be occupied by something in the real world if that cube is, e.g., completely filled by, or filled to at least a threshold degree by, or completely within, or at all within, etc. that something. In at least some such embodiments, a cube is counted as occupied if and only if a determination that it is occupied is coupled with at least a threshold confidence value. As above, an implementation could compute, for each cube, a likelihood that the cube is occupied. Earlier in this paragraph, there is a mention of "other 3D shapes" into which a monitored space could be virtually demarcated—in at least one embodiment, one or more of those other 3D shapes are those that can form 3D tessellations, which are also known as honeycombs.

Generally speaking, in the present disclosure, volumetric occupancy is expressed in terms of a percentage (or fraction) of voxels occupied, though this is by way of example. In various different embodiments, many different types of data structures can be used to store voxel data associated with monitored spaces. In at least some embodiments, voxels are stored as leaves in a tree-type data structure that is known as a hexadeca-tree data structure, referred to many times in this disclosure as just a "hexadeca tree." In other embodiments, other similar types of tree structures are used, such as octrees, quadtrees, and/or the like. In a hexadeca tree, the root and each other node can have up to 16 child nodes or leaves depending therefrom. In this disclosure, tree structures are described such that a "node" in a tree is any element that is not a leaf, as a leaf is not considered to be a "node" of the tree. The "root" is a node, a unique type of node: it is the top of the tree, not a child of any node. Often, a given instance of a tree structure is accessible in data storage via its root. As mentioned above, the respective voxel in each leaf may include a data value described herein as a likelihood value, which numerically represents the (as-computed, not absolute) likelihood that the particular voxel is occupied in the monitored space.

The implementation of a hexadeca tree (or octree, or quadtree, etc.) to store voxel data enables a number of aspects of embodiments of the present disclosure to be flexible with respect to the level of granularity at which they operate—in this context, granularity can also be referred to as resolution. Several examples of such aspects include the granularity at which volumetric-occupancy data about a given monitored space is queried (and queryable), as well as the granularity at which map-differences data (deltas) is communicated among hardware nodes in connection with a shared monitored space. As used herein, "granularity" essentially means how far down (e.g., how many levels down) the tree from the root a given process goes to complete its task, or how far down the tree the results of a query came from, etc. The farther down the tree, the finer the granularity. The fewer levels down the tree, the coarser the granularity. Thought of in this way, operations with fine granularities are operating on clusters (or grains) of small numbers of voxels, the finest granularity in a given n-tree being at the leaf level. And operations with coarse granularities are operating on clusters (or grains) of larger numbers of voxels, with the coarsest possible granularity in connection with a given n-tree being at the root level.

As one would expect, finer granularities allow for finer distinctions, and coarser granularities allow only for coarser distinctions but are typically more efficient in at least the amount of data that would be included in a given query response or in a given delta broadcast, etc. In an example implementation that uses hexadeca trees, and assuming a fully stocked tree—one in which every non-leaf node has a full complement of 16 child nodes (including each node in the level that is just above the leaves having a full 16 leaves), and also (just for the moment) assuming example operations that visit (e.g., examine) every node at the lowest level reached by the operation, each successive level down the tree would be coupled with a decrease, by a factor of 16, in the number of voxels contained in the subtree of each node at that level (or in the node itself in the case of leaves), and each successive level down the tree would accordingly also be coupled with an increase, again by a factor of 16, in the number of nodes with which a given operation interacts per level. Accordingly, different granularities realized by traversing to different levels of depth down the tree can significantly change the number of results in a query response, the number of individual voxel operations that are needed in order to apply deltas to volumetric maps, and so forth.

Due to the prevalence of both hardware nodes and tree-structure nodes in this disclosure, efforts were made in the remainder of this disclosure to refer to the former as "occupancy nodes" or "four-dimensional (4D) occupancy nodes" ("4DO nodes") and to the latter as "tree nodes," though this convention may not have been adhered to in every instance. In some embodiments, voxels contain not only their most recently computed likelihood value, but also some number of previously computed (and timestamped) likelihood values as well. In such embodiments, not only can volumetric-occupancy indices be obtained for a current time, but also for a number of previous times as well, such that, as an example, an evolution of a given subspace over time can be tracked, recreated, and the like.

When conducting volumetric-occupancy measurement, there are a number of different ways in which a given space can be considered to be at 0% occupancy (empty), often dependent on the way in which the boundaries of the monitored space itself are defined. Take, for example, a basic room with a rectangular floor, a rectangular ceiling, two rectangular side walls, and two square-shaped end walls. Suppose also that the room has a number of fixed benches and bookcases spaced about. Some volumetric-occupancy-measurement implementations view just the underlying room itself, as if the furniture were not there, as the baseline volume, and thus the room, even when empty of people, would not have a zero occupancy—the furniture would always be counted. Some embodiments of the present disclosure work that way. The embodiments that are primarily discussed in this disclosure, however, do not. This is again by way of example and not limitation.

In embodiments that are primarily discussed in this disclosure, using the above-mentioned rectangular room for illustration, a 4DO node conducts its own calibration process, which may identify, and run at, times when no people or virtually no people are present. At a certain point in this calibration, the 4DO node considers the, e.g., stationary furniture to be part of the structure of the monitored space rather than something occupying it. Thus, in at least one embodiment, the monitored space without people (or anything else that would have had to have recently appeared) but with the furniture still there would be considered to be at (or near) 0% occupancy. Furthermore, in at least one embodiment, objects or structures do not need to be indefinitely, permanently stationary to qualify as part of the structure of a space rather than as something in the space; in such embodiments, anything that moves (e.g., any voxel that experiences change of) less than a threshold amount (or not at all) for at least a specified amount of time (or for at least a threshold amount of time within a set time period, etc.) may be considered to be part of the boundary of the space for purposes of volumetric-occupancy measurements that are made until the next such calibration is conducted, which, as examples, could be triggered in a time-based and/or event-based manner in various different embodiments.

Various volumetric-occupancy embodiments take the form of nodes that are referred to herein as 4DO nodes at numerous times in this disclosure. In accordance with embodiments of the present disclosure, a given 4DO node may extract highly representative, normalized occupancy indices for monitored spaces, which in some embodiments are spaces that are related to transportation. Some example transportation-related spaces include bus stations, train stations, train platforms, the inside of a bus, the inside of a train car, the inside of a cab or rideshare vehicle, the cabin of an airplane, and so on. In the context of, as examples, Mobility as a Service (MaaS), smart cities, smart in-cabin spaces, and the like, embodiments of the present disclosure advantageously take the form of, e.g., devices and systems that dependably and efficiently observe objects, people, processes, other phenomena, etc., and infer dynamics over the relevant monitored spaces at scale. Moreover, embodiments of the present disclosure assist with more effectively modeling, with identifying actionable insights, with triggering responsive actions, and the like by, among other advantages, providing current and accurate measurements, including volumetric-occupancy measurements, of the current state of one or more (e.g., mobility-related) monitored spaces.

In accordance with at least one embodiment, highly accurate and normalized volumetric-occupancy indices are generated using, e.g., 4DO nodes, systems, and the like that are not burdensome to install, that are robust with respect to enduring motion, vibration, wear and tear, and the like, and that are self-calibrating, among other benefits that are discussed herein and that will be apparent to those of skill in the art having the benefit of this disclosure. A few of those additional benefits are an increased ability to generate dynamic analytics that can, e.g., assist in the planning, prediction, and modification of crowds and asset flows; an increased ability to, as mentioned above, generate actionable insights that can, e.g., assist in triggering and rerouting resources, access controls, and the like to improve efficiency and to manage contingencies; and an increased ability to reduce disruption by implementing anticipatory operational enhancements such as planned preventive and corrective maintenance, as well as to reduce disruption caused by construction and other seasonal eventualities.

As also discussed above, the importance of accurate and reliable measurement and monitoring of occupancy levels in various spaces is only heightened by the ongoing COVID-19 pandemic. In the present situation, social distancing and crowd management are more important than ever. Among other benefits, the collection and flow of volumetric-occupancy-related data in connection with embodiments of the present disclosure promote the safety and efficiency of, e.g., heterogeneous transportation networks. Furthermore, maintaining and using historical data regarding occupancy of various transportation-related spaces and other spaces, including both publicly run and privately owned shared spaces, as is done in connection with embodiments of the present disclosure, is an ever-increasingly prominent aspect of smart MaaS infrastructure workflows now, in the near future, and beyond.

In some implementations, embodiments include integrated solutions such as intelligent infrastructure devices (e.g., 4DO nodes) that efficiently determine occupancy level and time-varying traffic in enclosed spaces while protecting the privacy of the people involved. Furthermore, embodiments disclosed herein are relatively easy to deploy in that, among other advantages, certain typical deployment-type activities are not necessary or at least the need for them is greatly reduced. Some examples of such activities include mapping, calibration, and classification. In accordance with embodiments of the present disclosure, 4DO nodes operate as compact, lightweight, ad hoc computation platforms that are readily attachable for use in a wide variety of installations.

Embodiments of the above-mentioned intelligent sensing-and-communication infrastructure devices that are referred to herein as 4DO nodes provide a number of benefits, among which is that the deployment of 4DO nodes is relatively frictionless, typically not being dependent on any previous installation or on any mapping of the relevant space having been already completed, and also not being dependent on needing significant initial calibration. Another benefit is that the 4DO nodes of embodiments of the present disclosure self-tune, self-calibrate, self-recalibrate, and the like.

Also, as mentioned above, 4DO nodes of embodiments of the present disclosure are flexible with respect to the granularity at which volumetric-occupancy measurements are queried and communicated, as described more fully below. The ability in various different embodiments of 4DO nodes to scale up and down among levels of volumetric granularity advantageously provides a highly descriptive occupancy index with respect to a given space even if and when, over time and at various different times, the monitored space includes a wide variety of different objects, people, animals, equipment, and/or the like. A further advantage of embodiments of the present disclosure is that the 4DO nodes are topologically aware of one another (if one or more others are present, of course), such that each node autonomously identifies, if present, an overlap in sensing volume with one or more peer 4DO nodes, and responsively enters into a topological volumetric-occupancy mesh network with the one or more peers. Embodiments of the 4DO node also have a robust and compact form factor, having beneficial attributes such as being small, cost-effective, rugged, and turn-on ready to operate dependably as described herein.

Some embodiments of 4DO nodes take the form of or at least include an Intel® Smart Connect Technology (ISCT) device that is equipped and configured to engage in 3D range sensing. One example such device is the Intel® Realsense LiDAR RS-515, which includes an ASIC processor and wireless-communication capabilities. Embodiments of the present disclosure have low processing and memory requirements by virtue of, among other factors, the efficiency of the operating logic of embodiments of the 4DO node. In at least one embodiment, the occupancy metric that is generated for the relevant space is probabilistic in nature, and is generated at least in part using a sliding window with a Bayesian filtering schema per volume unit (e.g., per voxel). In some embodiments, the 4DO node has an inner loop having an adjustable refresh rate that varies based on, e.g., available power, which may be different for in-vehicle installations than for indoor installations, as examples. Moreover, in at least some embodiments, a 4DO node transmits external updates (e.g., volumetric-occupancy deltas that are relevant at a given volumetric granularity) on an event-driven basis and/or in response to receiving one or more on-demand requests such as one or more Representational state transfer (REST) requests via, e.g., an application programming interface (API).

Further implementation details of some example embodiments are provided below in connection with the figures, but generally speaking, in some embodiments, a 4DO node carries out a number of operations, including conducting active 3D range sensing and time synchronization. After collecting depth data for an initial calibration period (that could be on the order of 24 hours, 48 hours, etc.), the 4DO node arrives at a locally stored baseline depth map of its environment, referred to herein as the 4DO node's "local baseline map." It is noted that, as used herein, a "baseline map" is a map (e.g., a dataset that includes a collection of voxels) that is considered to represent the monitored space in what may be referred to as its empty (or at least substantially empty) state. Thus, the local baseline map maintained by a given 4DO node represents what that node (at that time) considers its monitored space to be like in its empty state, when nothing is present within the boundaries of the monitored space, where those boundaries were defined by that node's most recent calibration operation.

As used herein, a "volumetric map" of a monitored space is a map that provides a probability-based, statistical estimate of the current occupancy of the monitored space based on an integration of what is often a high quantity of relatively noisy range-sensor data. Comparatively, a baseline map is typically much more stable and smooth at least in part as a result of being compiled over a period of time (e.g., 24 hours) that is orders of magnitude longer than the relative instant used to assemble a given volumetric map. Structurally, however, they are both datasets of compatible type, making it possible to, for example, subtract a baseline map from a volumetric map by, for example, doing a voxel-wise subtraction of values representative of, e.g., a likelihood that the given voxel is associated with something rather than nothing. If, for a given voxel, the result of the volumetric-map value minus the baseline-map value is above a given threshold, that voxel may be considered to be occupied in a resulting map. After that subtraction is done with all of the voxels, what remains is a probabilistic estimate of the amount of "stuff" that is now in the monitored space and that was not there during the, e.g., 3:00 a.m. observations that led to the local baseline map.

In various different embodiments, as mentioned above, a 4DO node arrives at its local baseline map based at least in part on an identification of environmental features (e.g., corners) that may not be permanently stationary but that were stationary (enough) during the most recent (e.g., initial) calibration period to be classified as structure rather than content of the monitored space. The 4DO node may broadcast these features to any peers that are in range so that each of the other 4DO nodes can compare one or more features that they have identified to each independently determine whether they have a shared field of view with one or more peer 4DO nodes. If two or more 4DO nodes conclude (each on their own, based at least in part on feature data from their one or more peers) that they do share a field of view of a given monitored space, those 4DO nodes may share information that enables each of them to arrive at the same result for what is referred to herein as each 4DO node's "global volumetric map," which, in at least one embodiment, is one of (at least) two volumetric maps of the monitored space that each 4DO node maintains.

It is recognized that a given 4DO node does use some information that it receives from one or more peer 4DO nodes to update its respective global volumetric map, and so in that sense is not truly 100% independent, fending only for itself, but each 4DO node is an autonomous, independent actor in the sense that no 4DO node needs another to be around to do its job. If one or more others are around and sharing a field of view, in at least one embodiment the 4DO nodes that share that field of view refine their own global volumetric map based on observations (e.g., differential data) of others.

With the information that is flowing around the mesh of 4DO nodes, even though each 4DO node starts out with a different global volumetric map, the effect of each node implementing every other node's deltas is that eventually they will each have a different instance of substantively the same global volumetric map of the monitored space. To facilitate working together so that each node's deltas from their own computations (as described below) are useable by each other node, the 4DO nodes in the mesh compute spatial transforms with respect to one another's positions and rotations. so as to be translatable to one another in six dimensions (6D): horizontal (X), vertical (Y), depth (Z), pitch (rotation angle about the X axis in the YZ plane), yaw (rotation angle about the Y axis in the XZ plane), and roll (rotation angle about the Z axis in the XY plane).

In at least one embodiment, after the initial or a subsequent calibration process, the 4DO node, in repeated frame intervals at, e.g., the frame rate of a depth-information-capture device of the 4DO node, collects a point cloud or other 3D representation of the monitored space, and generates an instantaneous volumetric map of the monitored space based at least in part that point cloud. The 4DO node may then combine its newest instantaneous volumetric map, which reflects the set of sensor readings for a current time "t," with one or more of its past few instantaneous volumetric maps, each of which corresponds respectively to a set of sensor readings for a time such as "t−1," "t−2," "t−5," etc. The operation to combine multiple recent instantaneous volumetric maps may involve, on a voxel-by-voxel basis, keeping the highest likelihood value across the maps, averaging (e.g., weighted averaging) the likelihood values across the maps, and/or the like. Combining the multiple instantaneous volumetric maps in this or another suitable manner can help to mitigate the often transient nature of observed voxels.

For simplicity, in this disclosure, the instantaneous volumetric map from which the 4DO node then subtracts (its most-recent iteration of) its local baseline map is referred to as its "perceived volumetric map," the contents of which depend (at least) on whether the 4DO node is arranged to combine its newest instantaneous volumetric map with one or more of its recent instantaneous volumetric maps for comparison to the local baseline map. If it is not, the 4DO node's perceived volumetric map may just be equal to its most recent (or a recent) instantaneous volumetric map. If it is, however, the 4DO node's perceived volumetric map may be equal to an output of that combination. Either way, the 4DO node may subtract its local baseline map from its perceived volumetric map to produce and/or update what is referred to herein as that 4DO node's "local volumetric map," which is the second of the (at least) two volumetric maps that each 4DO node maintains in at least one embodiment.

The comparison by the 4DO node of its current local perceived volumetric map to its stored local baseline map (e.g., subtraction of the local baseline map from the local perceived volumetric map) typically occurs at a frequency (e.g., 6 hertz (Hz), 10 Hz, etc.) that is less than the frame rate (e.g., 30 Hz) of the depth-information-capture device. On that point, it is noted that the frame rate of the depth-information-capture device may be an upper bound with respect to how frequently the depth-information-capture device is configured in various different instances to capture fresh volumetric data (e.g., new, current, etc. volumetric data) in the monitored space.

In some cases, for various reasons, a 4DO node may be configured to capture fresh volumetric data in a monitored space at a rate that is less than (e.g., $\frac{1}{3}$ of, $\frac{2}{3}$ of, $\frac{1}{2}$ of, etc.) that upper bound. For this reason, rather than "frame rate," the rate at which a given 4DO node is configured in a given embodiment to capture fresh volumetric data in a monitored space (and generate a corresponding newest instantaneous volumetric map of that monitored space) is referred to in this disclosure as that 4DO node's "capture rate," and may be an adjustable parameter. The frequency at which a given 4DO node compares its local baseline map to its perceived volumetric map (e.g., subtracts its local baseline map from its perceived volumetric map) is referred to herein as that 4DO node's "reference-comparison rate," and may be an adjustable parameter that may or may not derive its value from a presently selected capture rate. As stated, the reference-comparison rate is typically lower than the capture rate of the depth-information-capture device of the 4DO node.

In this disclosure, the cyclical structure according to which a given 4DO node (or any other device) performs a given set of operations in each period of a given "rate" is referred to as the "loop" associated with that rate, and the operations that are performed in each iteration of that loop (or that may be performed, given different conditions and logical statements, etc.) are referred to using a similar qualifier. So for example, in the parlance of the present disclosure, a 4DO node performs, at its capture rate, a sequence of "capture operations" in each "capture iteration" of its "capture loop." A "capture period" may also be referenced, and may correspond to an amount of time equal to the inverse of the capture rate. And so it is in this disclosure with respect to other rates that are discussed herein, such as but not limited to the above-mentioned reference-comparison rate of a given 4DO node.

Those of skill in the art understand the concept of loops, including nested loops, inner loops, outer loops, and the like. In various different embodiments, a given loop may be implemented by or as, by way of example, a corresponding circuit (e.g., ASIC, FPGA, etc.), a corresponding module, processor-based execution of instructions defining a corresponding functional component of an application, and/or the like. Thus, as examples, the capture loop may be implemented by or as, a "capture circuit," a "capture module," a "capture process," a "capture function," "a capture block," and/or the like. Both the "module" and the "process" forms of these are used herein by way of example and not limitation. In each such case, the process provides a functional definition of the corresponding process, and that corresponding process includes but is not limited to the corresponding "loop."

As stated, in at least one embodiment, each 4DO node maintains two separate volumetric maps of a given monitored space: its local volumetric map and its global volumetric map. As described, however, the 4DO node also generates various instantaneous volumetric maps. Those exist only fleetingly, and it is the local volumetric map and the global volumetric map that the 4DO node persists, updates, etc. As to the local volumetric map, in at least one embodiment, 4DO nodes do not use data from any other 4DO node to update their respective local volumetric map, which therefore, in at least one embodiment, represents a volumetric representation of the monitored space based solely on what that particular 4DO node perceives. In at least one embodiment, each 4DO node is also fully in control of its global volumetric map, but does, in at least some circumstances, update its respective global volumetric map based at least in part on volumetric data (e.g., deltas) that it receives from one or more peer 4DO nodes. This may occur in situations in which those 4DO nodes have a shared sensing volume (monitored space).

In each capture iteration of the capture loop, a 4DO node may obtain its newest instantaneous volumetric map, and may use that map as, or as an input to compute, its newest perceived volumetric map. In at least some embodiments, the 4DO node obtaining its newest instantaneous volumetric map involves the 4DO node using its depth-information-capture device to cast rays to detect points in the monitored space. The 4DO node may reduce the likelihood values of voxels that are on rays between the sensor and detected points (and are therefore less likely to be occupied), and may increase the likelihood values of voxels that are at detected points (and are therefore more likely to be occupied).

If the capture loop is configured to generate perceived volumetric maps based on multiple recent instantaneous volumetric maps in addition to the newest instantaneous volumetric map as described above, the capture loop may do so at least in part with reference to a cache (or pipeline, or queue, etc.) of some number (e.g., 4) of very recent (e.g., immediately preceding) instantaneous volumetric maps. The capture loop may provide its newest perceived volumetric map to a reference-comparison loop of the 4DO node at the reference-comparison rate. The capture loop may also provide the newest perceived volumetric map as an update for its local volumetric map. The 4DO node may update its local volumetric map at least in part by, e.g., applying any deltas (voxel differences) between the perceived volumetric map and the existing local volumetric map to the (thereafter-modified) local volumetric map.

In each reference-comparison iteration of the reference-comparison loop, which iterates at the reference-comparison rate, the 4DO node computes a set of what are referred to herein as "local deltas." In an embodiment, the reference-comparison loop takes three inputs into the computation that results in the local deltas (of which there may be none) for a given reference-comparison iteration:

1. the newest perceived volumetric map, received by the reference-comparison loop from the capture loop in connection with the current reference-comparison iteration;

2. a copy of the local volumetric map (in a state in which it had not yet been modified in light of the information contained in #1 above); and
3. a copy of the local baseline map.

The reference-comparison loop may then perform what is referred to herein as a local-deltas computation to compute, based on those three inputs, the local deltas for the current reference-comparison iteration. There could be different input sets in different embodiments, though those are the three inputs that are used for illustration in the present disclosure. The reference-comparison loop may perform the local-deltas computation in a number of different ways. In one example, the reference-comparison loop performs the local-deltas computation for the current reference-comparison iteration at least in part by subtracting the received copy of the local baseline map from the received copy of the local volumetric map as modified by the received newest perceived volumetric map. This may be done in two stages, as described below.

In the first stage, the reference-comparison loop may generate a modified local volumetric map at least in part by modifying the received copy of the local volumetric map in light of the received newest perceived volumetric map. The reference-comparison loop may do this by performing the same functions described just above with respect to updating the stored local volumetric map based on differences between the newest perceived volumetric map and the stored local volumetric map. Thus, the reference-comparison loop may apply any deltas between the perceived volumetric map and the existing local volumetric map to the received copy of the local volumetric map in order to generate the modified local volumetric map. Thus, the reference-comparison loop may identify intermediate deltas as the result of subtracting the received copy of the local volumetric map from the received newest perceived volumetric maps, and then apply those intermediate deltas as changes to the received copy of the local volumetric map to generate the modified local volumetric map. In other words, the same updates may be made, substantially simultaneously, to the stored local volumetric map and to the copy of the local volumetric map that is received by the reference-comparison loop. In the second stage, the reference-comparison loop may subtract the received copy of the local baseline map from the modified local volumetric map, resulting in the local deltas. Other approaches may be used as well.

The 4DO node may then update its global volumetric map by applying the newly computed local deltas to the global volumetric map. As discussed more fully below, the 4DO node may also broadcast these local deltas to its peer 4DO node with which the 4DO node shares a field of view of the monitored space. The 4DO node may also receive, from one or more peer 4DO nodes, broadcasts of (local-to-them) deltas that were generated by the each of the one or more peer 4DO nodes in the same way as described above. In this disclosure, for increased clarity, from the perspective of a given 4DO node, deltas broadcast by a peer 4DO node and received by the given 4DO node are referred to as "peer deltas." The given 4DO node may apply any received peer deltas to its own global volumetric map, just as it does with the local delta that it generates.

Indeed, in some embodiments, peer deltas that are received from other nodes are integrated by a given 4DO node into the global volumetric map maintained by that node in a substantially similar way in which that 4DO node integrates local map differences. In at least one embodiment, due to the auto-calibration process described herein voxel coordinates among all nodes in a given mesh are in the same reference frame and the inputs can be consistently integrated. In at in at least some embodiments, this mutual occupancy-information integration process is deterministic and commutative, resulting in a situation in which each of the nodes in a given mesh arrive at the same occupancy representation, providing a consistent result across all nodes in the connected mesh. The herein-described n-tree data structures (e.g., hexadeca trees)—that, in at least some embodiments, are utilized to store the voxels of various volumetric maps-natively encode time as a fourth dimension. Due to this, it is the case that the integration of messages from different nodes is, in at least some embodiments, consistent even if such messages were captured at different points in time.

In addition to installations of multiple 4DO nodes that act as peers in a topological mesh, other local network topologies are possible as well, and indeed, embodiments are described herein in which a supervisor-type device referred to herein as a 4D occupancy aggregator ("4DO aggregator," for short) maintains its own global map (an "aggregator global map") of a given monitored space based on volumetric information that the 4DO aggregator receives from each of the 4DO nodes that has visibility of that monitored space. In various different embodiments, both 4DO nodes and 4DO aggregators may expose various data via, for example, respective REST APIs. In an example embodiment, 4DO nodes expose data such as their local baseline map, their local delta as a time series, and/or the like, whereas 4DO aggregators may expose data such as their aggregator global maps and/or one or other types of data.

As introduced above in connection with the discussion involving hexadeca-tree data structures, and as is discussed more fully below, in some embodiments, 4DO nodes and 4DO aggregators maintain a non-uniform, multiresolution volumetric representation of the various volumetric maps, which indicate identified occupied portions of the monitored space. One advantage of this approach is that, as described herein, this multiresolution volumetric representation can be queried a different levels of granularity (resolution). This enables the communication at various different granularities-various different resolutions—of the deltas (local deltas and peer deltas), which in at least some embodiments are transmitted among one another in a differential-update fashion. Additionally, as is also explained more fully below, in at least some embodiments, 4DO nodes and/or 4DO aggregators monitor the quality of wireless-communication links between and among themselves, and base decisions as to levels of granularity at which to communicate deltas at least in part on these link-quality assessments.

Moreover, in at least some embodiments, a 4DO node and/or a 4DO aggregator (or one or more other computer systems) compute what is referred to herein as a volumetric-occupancy index, which is a numerical expression of the estimated volumetric-occupation level of a monitored space. In some embodiments, the volumetric-occupancy index is computed as the number of voxels in a monitored space that are marked as occupied (e.g., the voxels that have at least a threshold likelihood value) divided by the total number of voxels in the monitored space.

Other embodiments compute the volumetric-occupancy index as the sum of the likelihood values of all of the voxels divided by the total number of voxels in the monitored space. In such embodiments, likelihood values may be normalized to values that are between 0 and 1, and of course each voxel in the total number of voxels in the monitored space counts as 1.

As described herein, in at least one embodiment, the total number of voxels in a monitored space does not include stationary features such as walls, bookshelves, etc that had been subtracted off as part of the local baseline map. Those define the space, they don't fill it, in accordance with in at least some embodiments. And certainly other derivations of a volumetric-occupancy index and/or computation of other indices could be performed as well or instead. Embodiments of the present disclosure make use of certain data structures (e.g., hexadeca trees) as described herein to make, among other things, calculations of volumetric-occupancy indices more efficient than they might otherwise be, as explained more fully below. Moreover, the volumetric-occupancy index could be computed as often or as rarely as desired for a given implementation. One or more volumetric-occupancy-index thresholds could be set to trigger actions such as reporting, alerts, and/or the like. The time series of the volumetric-occupancy index could be archived by a receiving computer system, and such data could optionally be summarized at various time intervals in the interest of conserving storage space. And certainly many other implementations are possible as well.

The calculated volumetric-occupancy index could be transmitted (by, e.g., one or more 4DO nodes, a 4DO aggregator, etc.) to one or more endpoints as a time series that includes all or less than all of the volumetric-occupancy index values that are actually calculated. As examples, every N (e.g., 100) volumetric-occupancy indices that are computed could be, e.g., averaged and transmitted as a time series that may have a resulting frequency determined at least in part by the selection of N (e.g., N=1 results in the time series including every computed volumetric-occupancy index as compared to sending out half of the rate at which such values are calculated if every two values are averaged and sent, and so forth. Furthermore, as will occur to those of skill in the art having the benefit of this disclosure, numerous metrics and analytics can be derived from a time series of volumetric-occupancy indices that is generated in accordance with embodiments of the present disclosure.

In one example embodiment, a time series of volumetric-occupancy indices that is generated and transmitted in accordance with embodiments of the present disclosure is integrated into a control system of a city's metro transportation authority, so as to assist that organization by, for example, automatically deploying additional assets (e.g., buses) to account for higher-than-expected occupancy levels of buses on the road, generating alerts to one or more endpoints based on various present conditions being met, and/or the like. And numerous other such examples could be listed here as well. Moreover, in accordance with some embodiments, temporal information is stored in connection with calculated volumetric-occupancy indices, such that historical values can be queried, reported on, averaged, and/or the like. This is similar to the description above that, in at least some embodiments, each voxel may function not only as a present indicator of likelihood of occupancy, but also as an archive of some degree of its historical values.

One embodiment takes the form of a volumetric-occupancy node (e.g., a 4DO node) that includes an active range-sensing device, a wireless-communication interface, and a processor configured to perform operations including obtaining, from the active range-sensing device, a current point cloud representative of a monitored space in which the volumetric-occupancy node is positioned, as well as generating a current volumetric map of the monitored space based on the current point cloud. The operations also include computing current local deltas for the monitored space by subtracting a baseline volumetric map of the monitored space from a first volumetric map maintained of the monitored space by the volumetric-occupancy node, the first volumetric map having been updated to reflect any differences between it and the current volumetric map, as well as applying the current local deltas as changes to a second volumetric map maintained of the monitored space by the volumetric-occupancy node. The operations also include computing, based on one or both of the first and second volumetric maps, a volumetric-occupancy index indicative of a current volumetric occupancy of the monitored space, as well as transmitting the volumetric-occupancy index via the wireless-communication interface to at least one receiving computer system.

A further embodiment takes the form of one or more non-transitory computer-readable storage media containing instructions that, when executed by at least one hardware processor, cause the at least one hardware processor to perform operations including the operations listed in the preceding paragraph. Still another embodiment takes the form of a method that is performed by a computer system executing instructions on at least one hardware processor, and that includes the operations listed in the preceding paragraph.

As described herein, one or more embodiments of the present disclosure take the form of a method that includes multiple operations. One or more other embodiments take the form of a system that includes at least one hardware processor and that also includes one or more non-transitory computer-readable storage media containing instructions that, when executed by the at least one hardware processor, cause the at least one hardware processor to perform multiple operations (that in some embodiments do and in other embodiments do not correspond to the set of operations performed in a herein-disclosed method embodiment). Still one or more other embodiments take the form of one or more non-transitory computer-readable storage media containing instructions that, when executed by at least one hardware processor, cause the at least one hardware processor to perform multiple operations (that, again, in some embodiments do and in other embodiments do not correspond to the set of operations performed in a herein-disclosed method embodiment and/or the set of operations performed by a herein-disclosed system embodiment).

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a non-transitory-computer-readable-storage-media embodiment. Furthermore, this flexibility and cross-applicability of embodiments is present in spite of any slightly different language (e.g., processes, process flows, methods, methodologies, steps, operations, functions, and/or the like) that is used to describe and/or characterize such embodiments and/or any element or elements thereof.

Figure 2:
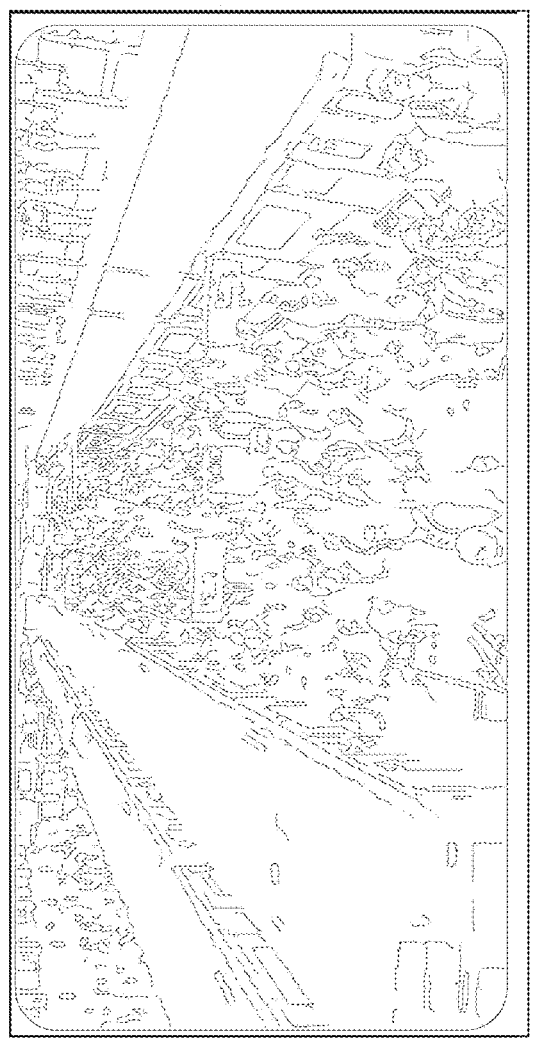
FIG. 2 depicts an example visible-light image, in accordance with at least one embodiment.

One example indoor public place in which people will benefit from embodiments of the present disclosure is a crowded train station, an example of which is shown in FIG. 2, which depicts a visible-light image 200. The scene that is depicted includes a configuration of neighboring trains being simultaneously loaded from and unloaded to a common platform area, which results in very crowded situations in which people are frequently in close contact with one another and unable to social distance. In accordance with embodiments of the present disclosure, people will benefit from avoiding being in this situation in the first place by, e.g., being able to plan routes for themselves in advance that include one or more, e.g., less-crowded train cars (and likely therefore a much less crowded train platform). Other benefits will be apparent as well from further description.

An example communication context 100 is depicted in FIG. 1, and includes an example occupancy-measurement configuration 102, in accordance with at least one embodiment. The communication context 100 is provided by way of example and not limitation, as differently arranged communication contexts could be used in connection with various different implementations. The occupancy-measurement configuration 102 includes an example arrangement in which a number of people 112 are within a vehicle interior 106 of a vehicle (e.g., a bus) (not depicted). Each of the people 112 has an associated mobile device 114, which could also or instead be referred to as a user device, and each of which could be a cell phone, a smart phone, a personal digital assistant (PDA), a tablet, a laptop, a netbook, and/or the like. In some instances, a given mobile device 114 is configured to perform one or more embodiments of the present disclosure.

In connection with the occupancy-measurement configuration 102, a video camera 108 is mounted in the vehicle interior 106, has a field of view 110 that covers the people 112, and transmits video frames 116 to a smart-routing edge device 104, which is also onboard the vehicle, and to which the video camera 108 is communicatively connected. The smart-routing edge device 104 may have data storage, memory, one or more hardware processors, and the like, as well as a communication interface with which the smart-routing edge device 104 establishes connectivity with a network 118. The smart-routing edge device 104 could be characterized as an "occupancy-measurement system" as that term is used herein, as could the combination of the smart-routing edge device 104 and the video camera 108, just as examples. In the example being described here, the (automated) occupancy-measurement system that is onboard the vehicle may be referred to as a type of occupancy-measurement system that is referred to herein as a "person-counting system."

In various different embodiments, the video camera 108 could be a video camera that does not capture depth information, in which case the video frames 116 may just be video frames, or a video camera that does capture depth information, in which case the video frames 116 may contain depth information associated with the field of view of the video camera 108. If the video camera 108 is the latter, it is an example of what is referred to herein as a "depth-information-capture device." In other embodiments, a non-depth camera could be used, and it may take frequent images which could then be processed by or through the smart-routing edge device 104. In that type of embodiment, it is again the case that the camera may or may not be a depth-information-capture device.

As the term is used herein, a "depth-information-capture device" could be any device arranged to capture depth information, some examples including depth cameras, combined visible-light-and-depth cameras, range-sensing devices, radar devices, sonar devices, LiDAR devices, and the like. Similarly, as used herein, a "depth image" can be any dataset that contains depth information. This includes depth maps, and also includes depth images captured by, e.g., depth cameras, combined visible-light-and-depth cameras, and the like, and also includes datasets, such as point clouds, that include data representative of the 3D points, surface(s), feature(s), etc. of its subject(s), including but not limited to datasets that are collected by devices that some of skill in the art may not typically refer to as depth cameras.

Figure 4:
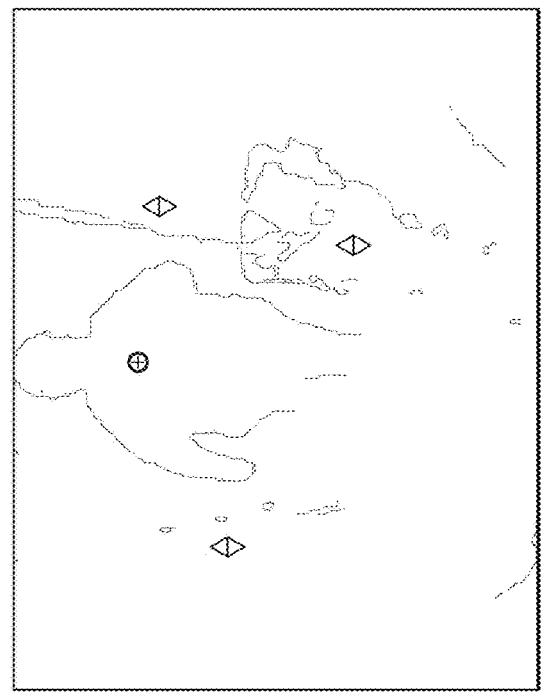
FIG. 4 depicts a second example depth image, in accordance with at least one embodiment.
Figure 3:
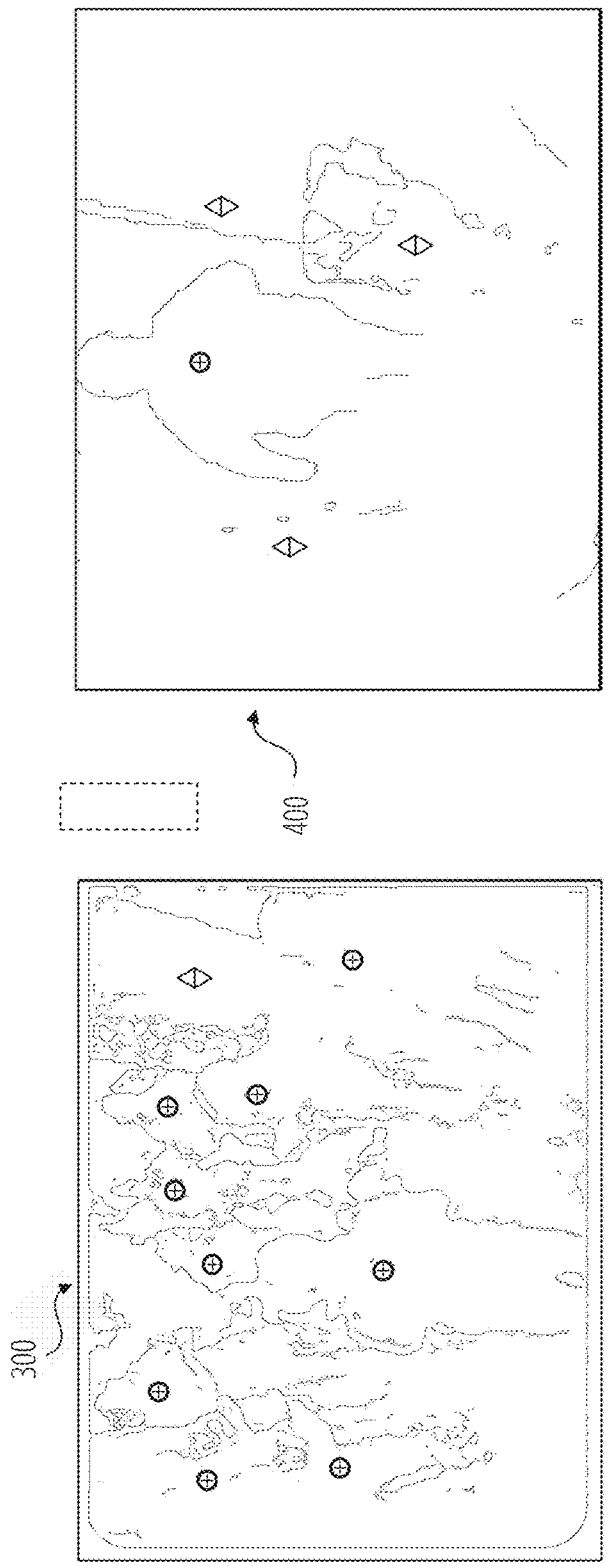
FIG. 3 depicts a first example depth image, in accordance with at least one embodiment.

An example depth image 300 and an example depth image 400 are depicted in FIG. 3 and FIG. 4, respectively, showing how analysis of such images could be used to count people within a field of view. In the depth image 300, a number of person segments have been identified, each of which may correspond to a person 112, and each of which is marked in FIG. 3 with a circled-plus icon. Also, by way of example, one structural segment has been identified, which may correspond to a column, a divider, a bathroom on a train, a luggage rack on a bus, or some other structure, and which is marked in FIG. 3 with a split-diamond icon. The depth image 400 is a relatively simpler depth image, showing only a single identified person segment, marked with a circled-plus icon located within its boundaries. Also depicted in FIG. 4 are three split-diamond icons to denote detected structure, in this case both sides of a door frame and a wall-mounted trash can.

Numerous other examples of depth images and/or visualizations of outputs of ranging devices could be presented here, as the depth image 300 and the depth image 400 are provided purely by way of example and not limitation. The depth image 300 could represent the field of view of a camera that is mounted within a vehicle's interior, while the depth image 400 could represent the field of view of a camera that is monitoring people coming in and out of a doorway, a type of configuration that is mentioned above and that is also discussed below in connection with FIG. 5.

The smart-routing edge device 104 (or another device in the communication path) may process the video frames 116 that it receives from the video camera 108, in some cases by applying a person-detection model to the images, as is known in the art. In addition to being configured to detect people in video frames, depth images, and the like, the person-detection model may also implement person "redetection" or "reidentification," as mentioned above, so as to attempt to avoid counting any individuals as being multiple different people. Some example person-detection models are mentioned below.

Returning to FIG. 1, it can be seen that the smart-routing edge device 104 is also communicatively connected to a network 118, as is an access station 120, a smart-routing server 124, and a transit-application server 126. Via the network 118, the smart-routing edge device 104 may communicate with any one or more of the entities shown in the communication context 100, as well as any one or more other entities reachable via the network 118. Also depicted in FIG. 1 is a link 128 between the smart-routing edge device 104 and the smart-routing server 124. This could be a dedicated direct link (e.g., wireless link), or could instead represent a tunneling-type connection such as a VPN that may physically pass through the network 118 in a secure manner, among other possibilities.

The smart-routing server 124 and the transit-application server 126 may each be or include a server system or other computing device that is equipped, programmed, and configured to perform various combinations of operations as described herein, including various embodiments of the present disclosure. In general, the smart-routing server 124 may support the collection and maintenance of occupancy information from installations such as the smart-routing edge device 104 together with the video camera 108. The transit-application server 126 may provide support to a transit-related mobile app that may execute on one or more mobile devices 114.

This support could include route generation, user-profile storage and maintenance, brokering requests for vehicle-occupancy information between the mobile devices 114 and the smart-routing server 124, and so forth. The transit-application server 126 may also provide a web interface that represents another way in which users of the aforementioned mobile app may be able to access their information and make use of services. An example method that may be carried out by, e.g., the transit-application server 126, is shown in, and discussed below in connection, with FIG. 6A. Moreover, the transit-application server 126 may be arranged (e.g., equipped, programmed, configured, and/or the like) to perform any of numerous variations of the method that is shown in and described in connection with FIG. 6A.

The network 118 can be or include any one or more types of networks (e.g., data networks). Some example types of networks that the network 118 can be or include are Internet Protocol (IP) networks such as the Internet, private data networks, public data networks, telephone networks, cellular networks, local area networks (LANs), wide area networks (WANs), wireless wide area networks (WWANs), personal area networks (PANs), and/or the like. The access station 120 could be or include any network base station, access node, tower, Wi-Fi access point, and/or the like, and may provide interconnectivity between the mobile devices 114 and the network 118 via an air interface 122, which could operate according to any one or more of the wireless-communication protocols mentioned herein and/or any one or more other wireless-communication protocols deemed suitable by those of skill in the art for a given implementation.

Any of the devices, systems, and the like that are depicted in FIG. 1 and/or in any of the other figures could have a hardware architecture that is similar to the example computer-system architecture that is described below in connection with the example computer system 1900 of FIG. 19, and could contain and execute software having an architecture similar to the example software architecture 2002, described below in connection with FIG. 20. Moreover, any of the communication links depicted in FIG. 1 and/or in any of the other figures could be or include one or more wired-communication links (e.g., Ethernet, fiber optic, Universal Serial Bus (USB), etc.) and/or one or more wireless-communication links (e.g., Wi-Fi, Long-Term Evolution (LTE), WiMAX, 3G, 4G, 5G and beyond, near-field communication (NFC), Bluetooth, Bluetooth Low Energy (BLE), etc.).

Furthermore, any of the communication links could include one or more networks, one or more intermediate devices such as one or more routers, bridges, servers, access points, base stations, and/or the like. Additionally, any communication link could include one or more virtual private networks (VPNs) and/or other tunneling-type connections.

Figure 5:
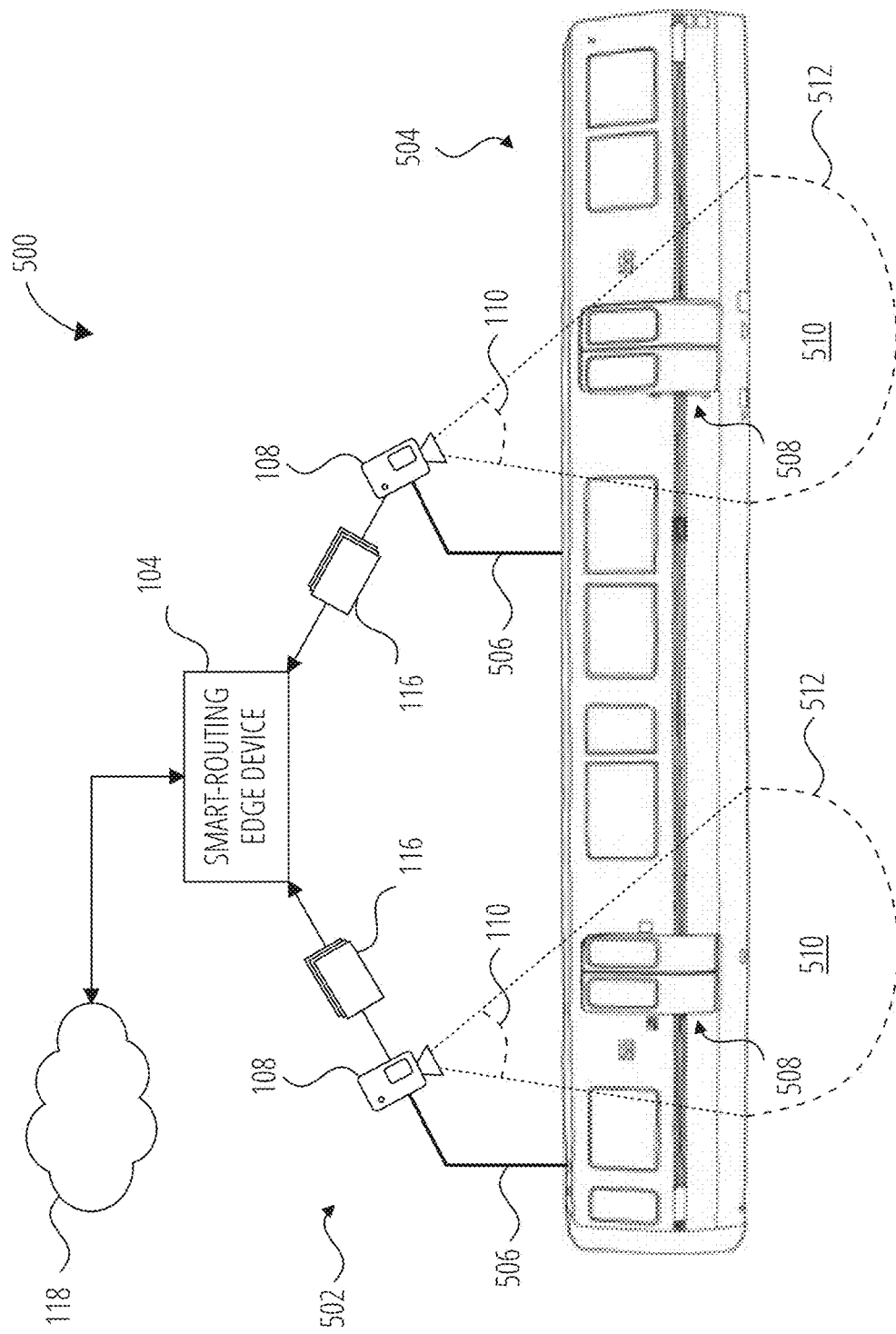
FIG. 5 depicts a second example communication context that includes a second example occupancy-measurement configuration, in accordance with at least one embodiment.

An example communication context 500 is depicted in FIG. 5, and includes an example occupancy-measurement configuration 502, in accordance with at least one embodiment. Similar to the communication context 100, the communication context 500 is provided by way of example and not limitation, as differently arranged communication contexts could be used in connection with various different implementations.

Like the occupancy-measurement configuration 102 of FIG. 1, the occupancy-measurement configuration 502 of FIG. 5 includes the smart-routing edge device 104 in communication with the network 118, as well as video frames 116 being provided to the smart-routing edge device 104 by, in this case, two different video cameras 108, each of which is mounted to an exterior of a train car 504 by a respective support 506 over a respective doorway 508 of the train car 504. It is noted that the supports 506 in an actual implementation may very well not be of the scale or in the style that is depicted in FIG. 5, as this is just for illustration. In FIG. 5, each of the two video cameras 108 has its respective field of view 110 trained on respective ingress/egress zones 510 that are defined as approximate virtual half circles in front of each of the doorways 508, bounded by the edge of the train car 504 and by virtual arcs 512. Moreover, it is noted that the other elements from FIG. 1 that are shown there as being in communication with the network 118 are omitted from FIG. 5 just for clarity of presentation.

Similar to FIG. 1, the smart-routing edge device 104 may implement a person detection/redetection model in connection with the video frames 116 that the smart-routing edge device 104 receives from the video cameras 108. In the occupancy-measurement configuration 502, however, the video cameras 108 are not capturing, and the smart-routing edge device 104 is not processing, video frames 116 that depict people, e.g., standing or sitting in a moving bus. In this case, the vehicle is stopped and the people 112 are moving, both in and out of both of the doorways 508. Various approaches for processing this video data are described herein.

One approach may be performed by the smart-routing edge device 104 and may involve using an inference engine, such as the inference engine in the Intel® Distribution of OpenVINO™ toolkit. The smart-routing edge device 104 may ingest the video frames 116 received from the video camera 108, and perform the following operations on a frame-by-frame basis:

1. detect people in the frame using a pre-trained DNN model;
2. extract features from people detected using a second pre-trained DNN in order to keep track of individual people to avoid duplicate counting;
3. check, based on coordinates, whether people crossed the predefined virtual gate (e.g., the virtual arc 512) and in what direction (in or out of the ingress/egress zone 510 and, by extension, the train car 504); and
4. update people count based on entry and exit determinations.

This is just one example, and numerous other people-counting approaches could be used, as is known to those of skill in the art. The approaches described above represent examples of "person-counting systems," as that term is used in this disclosure. In some embodiments, vehicle occupancy is determined in a given vehicle using a volumetric-occupancy approach, such as the approaches that are described in this disclosure.

In instances in which there is more than one compartment in a vehicle, such as more than one car in a train, some embodiments use a crowd-detection model to identify which particular areas of the train are crowded. In at least one embodiment, the output of this model, referred to here as a "crowd index," is tracked in real-time to help users identify which compartment they would like to board. In the midst of the ongoing pandemic, transportation providers can make use of this information in order to, for example, identify areas of high exposure for at least the purpose of disinfecting, cleaning, maintenance, and the like. The provider may also use this information to help them identify reasons for crowding and improve crowd-direction and social-distancing strategies.

Figure 6A:
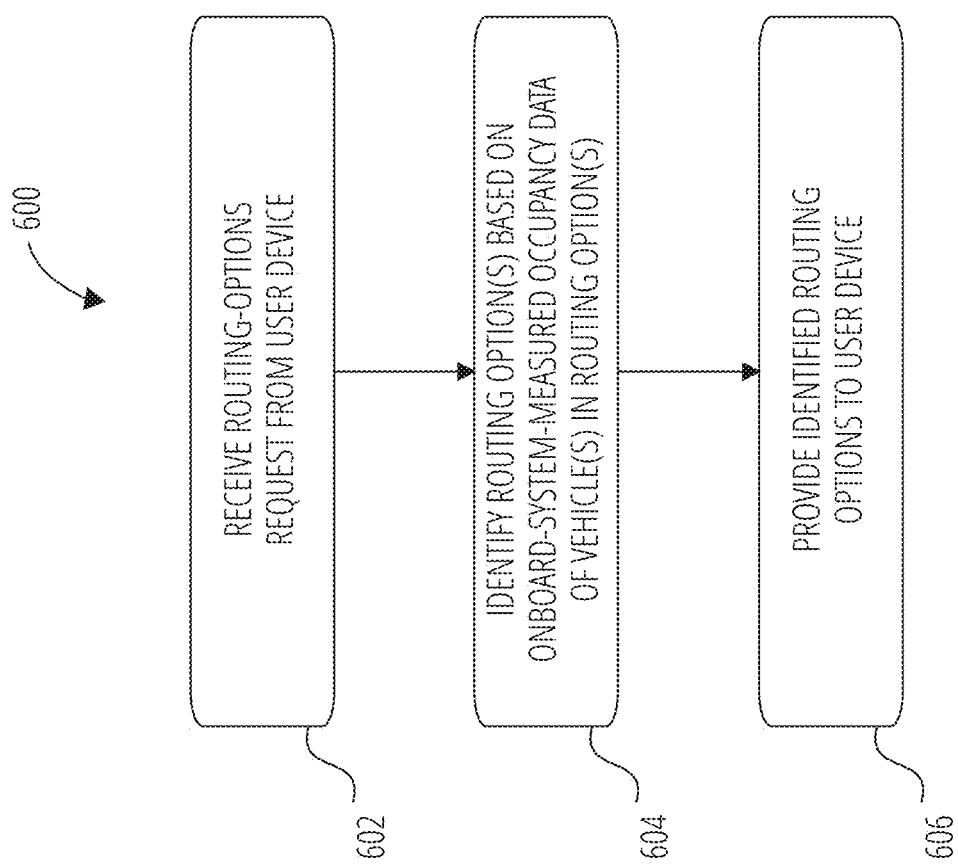
FIG. 6A depicts a first example method, which may be performed by a system (e.g., a computing system), in accordance with at least one embodiment.

FIG. 6A depicts a method 600 that is described hereby way of example as being performed by the transit-application server 126, and as a general matter can be performed in various different embodiments by other devices such as the mobile device 114, the smart-routing server 124, and/or any other suitable computing and communication device that is equipped, programmed, and configured to perform the recited functions.

At operation 602, the transit-application server 126 receives, via, e.g., a network interface, a routing-options request for routing options from a first location to a second location. The routing-option request in this example is received from a user device (e.g., the mobile device 114), and similar request may have been received by the mobile device 114 via its user interface, which, as discussed, is a mobile device of a person 112. The user (e.g., the person 112) may launch a particular transit-related app, navigate to a mobile-supported website, etc. Once there, the user may input their desired destination. The user may also input their current location or, e.g., an app may access this information via an operating system of the mobile device 114, among other options.

The receipt of the routing-options request by the transit-application server 126 could be performed components thereof that are similar to the communication components 1942, as an example. Instead or in addition, the transit-application server 126 could have a communication interface similar to the communication interface 1412 (of the 4DO node 1400) that is described in connection with FIG. 14. The below-described operation 606 could also be performed by one or more similar options.

It is noted that any description herein of the routing-options request being received from a user via a user interface of the mobile device 114, and the routing-options request also thereafter being received by the transit-application server 126 does not limit this disclosure to an exact same (e.g., protocol, formatted, etc.) message being received at both interfaces. Rather, the point is that, e.g., the user inputs (e.g., via a graphical user interface involving maps, text fields, dropdowns, etc.) a request for routing options between their present location (e.g., a shopping mall) and their home, and the routing-options request that the transit-application server 126 receives from the mobile device 114 is requesting the same thing: routing options between those two locations. There can certainly be a conversion of user inputs into a form saved by a transit app on the mobile device 114, and perhaps again into a protocol or API format that is preferred by the transit-application server 126. And numerous other implementations are possible as well.

Responsive to receiving the routing-options request, the transit-application server 126 identifies (at operation 604) one or more routing options from the first location to the second location based at least in part on occupancy data for a vehicle (e.g., a particular bus) that would be used for at least one portion of at least one of the identified routing options. In some instances, also in response to receiving the routing-options request, the transit-application server 126 queries the smart-routing server 124 to retrieve a current actual occupancy value of the vehicle by specifying a given vehicle, such as a particular bus number and a given time. The route identification of operation 604 could be performed by any one or more processors of the transit-application server 126 using any suitable route-selection approach as known in the art.

As an example, the transit-application server 126 may send this query after having identified a possible route that includes that bus number at that particular time. The occupancy data may be based on an output of an automated occupancy-measurement system onboard the vehicle, and may have been received by the smart-routing server 124 from such as system. An example automated occupancy-measurement system (e.g., a person-counting system) could take the form of or at least include a combination of the smart-routing edge device 104 and the video camera 108, or the terms occupancy-measurement system, person-counting system, and the like may refer to just the smart-routing edge device 104, and many other examples could be listed here as well. In some embodiments, the transit-application server 126 retrieves the occupancy data by querying the occupancy-measurement system onboard the vehicle directly. The occupancy data may include a current actual occupancy of the vehicle as determined by, e.g., a person-counting system.

The transit-application server 126 may be arranged to, after identifying at least one of the one or more routing options, provide the one or more identified routing options to the mobile device 114. For example, the transit-application server 126 may format one or more messages in any suitable protocol (e.g., HTML) and transmit the one or more messages to the mobile device 114. A secure connection could be established between the two devices.

In addition to being configured to provide the one or more routing options to the mobile device 114, the transit-application server 126 may also be configured to cause presentation (e.g., display) of the one or more routing options to the user via the user interface of the mobile device 114. The transit-application server 126 may include, with the one or more routing options, a command to the mobile device 114 (e.g., to an app on the mobile device 114) to present the one or more routing options. The transit-application server 126 may further be arranged to cause presentation, via the user interface of the mobile device 114, of (actual and/or predicted) occupancy data for one or more vehicles in one or more of the routing options. As a general matter, the transit-application server 126 may cause something to be presented to a user on the mobile device 114 by sending the relevant data to the mobile device 114, and in some cases, also or instead transmitting a command to the mobile device 114 (or to an app on the mobile device 114, etc.) to display or otherwise present certain content.

As discussed, in some cases, in addition to or instead of actual current occupancy of a vehicle, the retrieved occupancy data includes a predicted occupancy of the particular vehicle at the particular time, which may be at least approximately the time that the user would board that vehicle if they chose that route. In various different embodiments, a predicted occupancy value could be generated as an average of historical occupancy for that vehicle on that type of day (e.g., weekday) at or about the particular time. Historical data may increasingly become available over time due to, among other things, devices such as the smart-routing edge device 104 being configured to upload, to a server, captured data such as number of counted people, timestamps, and the like.

A given predicted occupancy could also or instead be generated using a trained machine-learning model, as is known in the art. To train such a model, a supervised learning approach could be utilized, and may be based on a pipeline of data including, as examples, a support vector machine that processes features such as day of the week, timeframe, behavioral patterns, holidays, etc. A given implementation may use multi-layer neural networks. In some embodiments, techniques such as linear regression may be used. Moreover, aspects related to the transit-application server 126 making vehicle-occupancy predictions could be performed by any one or more processors of the transit-application server 126 using any one or more of the techniques discussed herein (e.g., historical averages, machine-learning models, etc.) and/or any one or more other techniques deemed suitable by those of skill in the art for a given implementation or in a given context.

As also described herein, in addition to (actual and/or predicted) vehicle-occupancy values, the identifying of routing options may also based at least in part on one or more travel preferences in a stored user profile associated with the user. In this way, embodiments of the present disclosure provide routing options that are customized to users' preferences. Some examples of such preferences are described throughout this disclosure.

Upon having identified a set of routing options (at operation 604), the transit-application server 126 may, at operation 606, cause presentation to the user, via the user interface of the mobile device 114, of one or more of the identified routing options. As stated above, the transit-application server 126 may cause something to be presented to a user on the mobile device 114 by sending the relevant data to the mobile device 114, and in some cases, also or instead transmitting a command to the mobile device 114 (or to an app on the mobile device 114, etc.) to display or otherwise present certain content. A given presentation may list the routing options in a list format. As another alternative, the routing options could be depicted in a graphical way, similar to what is depicted in each of FIG. 7, FIG. 8, FIG. 9, and FIG. 13, as examples. In some cases, similar to what is shown in those figures, the presented routing options may show one or more actual-occupancy values and/or predicted-occupancy values for one or more vehicles in one or more of the presented routing options.

The user may select a given one of the presented routing options, and the transit-application server 126, perhaps with assistance (e.g., location data) from the mobile device 114, may accordingly track the progress of the user on that selected route. For example, based on current time and/or GPS location of the mobile device 114, among other possible monitored triggering values, the transit-application server 126 may cause the mobile device 114 to present, to the user via the user interface of that mobile device, a prompt requesting a confirmation that the user has boarded the particular vehicle. In at least one embodiment, upon receiving the confirmation via the user interface, the mobile device 114 may responsively transmit an update message to a server such as the smart-routing server 124 and/or the transit-application server 126, as examples, to update an actual occupancy of the vehicle to reflect that the user has boarded the vehicle.

As described herein, the transit-application server 126 may select, based at least in part on one or both of the occupancy data and one or more travel preferences in a stored user profile associated with the user, a recommendation order for the one or more identified routing options. Furthermore, the presented routing options may be presented according to the determined recommendation order. Thus, embodiments of the present disclosure provide recommendations with respect to what transport to take and when, considering all vehicles (personal and public) that are available to a given user, and also considering current and predicted occupancy levels of one or more shared vehicles, among other factors. In at least some embodiments, the set of vehicles that is available to a given person is defined in a stored user profile, along with various travel-related preferences.

Prior to describing FIG. 7 and the remaining figures, an example method 608 is described in connection with FIG. 6B. The method 608 is somewhat similar to the method 600, which is described herein by way of example as being performed by the transit-application server 126. The method 608 of FIG. 6B, however, is described herein by way of example as being performed by a mobile device 114, though it could be performed by any one or any combination of computer systems that are suitably equipped, programmed, and configured to perform the described operations.

At operation 610, the mobile device 114 receives, via its user interface, a routing-options request from a user for routing options from a first location to a second location. This may involve a user launching a particular transit-related app and inputting their desired destination. The user may input their current location or the app may access this information via an operating system of the mobile device 114, among other options. It is noted that, in this disclosure, including in this description of FIG. 6B, references to the mobile device 114 taking certain actions and the aforementioned transit-related app taking certain actions are made somewhat interchangeably, and no explicit demarcation of actions, roles, and/or the like as between the two is intended to be conveyed herein.

Responsive to receiving the routing-options request, the mobile device 114 identifies (at operation 612) one or more routing options from the first location to the second location based at least in part on occupancy data for a vehicle (e.g., a particular bus) that would be used for at least one portion of at least one of the identified routing options. In some instances, also in response to receiving the routing-options request, the mobile device 114 queries the smart-routing server 124 to retrieve a current actual occupancy value of the vehicle by specifying a given vehicle, such as a particular bus number and a given time. The mobile device 114 may send this query after having identified a possible route that includes that bus number at that particular time. As described above, that occupancy data may have been received by the smart-routing server 124 from an occupation-measurement system (e.g., a person-counting system) onboard the vehicle. In an embodiment, that system is or at least includes the combination of the video camera 108 and the smart-routing edge device 104, or could refer just to the smart-routing edge device 104, among other possibilities.

In some cases, in addition to or instead of an actual current occupancy of the vehicle, the retrieved occupancy data includes a predicted occupancy of the particular vehicle at the particular time, which may be at least approximately the time that the user would board that vehicle if they chose that route. In various different embodiments, a predicted occupancy value could be generated as an average of historical occupancy for that vehicle on that type of day (e.g., weekday) at or about the particular time. Historical data may increasingly become available over time due to, among other things, devices such as the smart-routing edge device 104 being configured to upload, to a server, captured data such as number of counted people, timestamp, and the like.

The predicted occupancy could also or instead be generated using a trained machine-learning model, as is known in the art. To train such a model, a supervised learning approach could be utilized, and may be based on a pipeline of data including, as examples, a support vector machine that processes features such as day of the week, timeframe, people behavioral patterns, holidays, etc. A given implementation may use multi-layer neural networks. In some embodiments, techniques such as linear regression may be used.

Figure 6B:
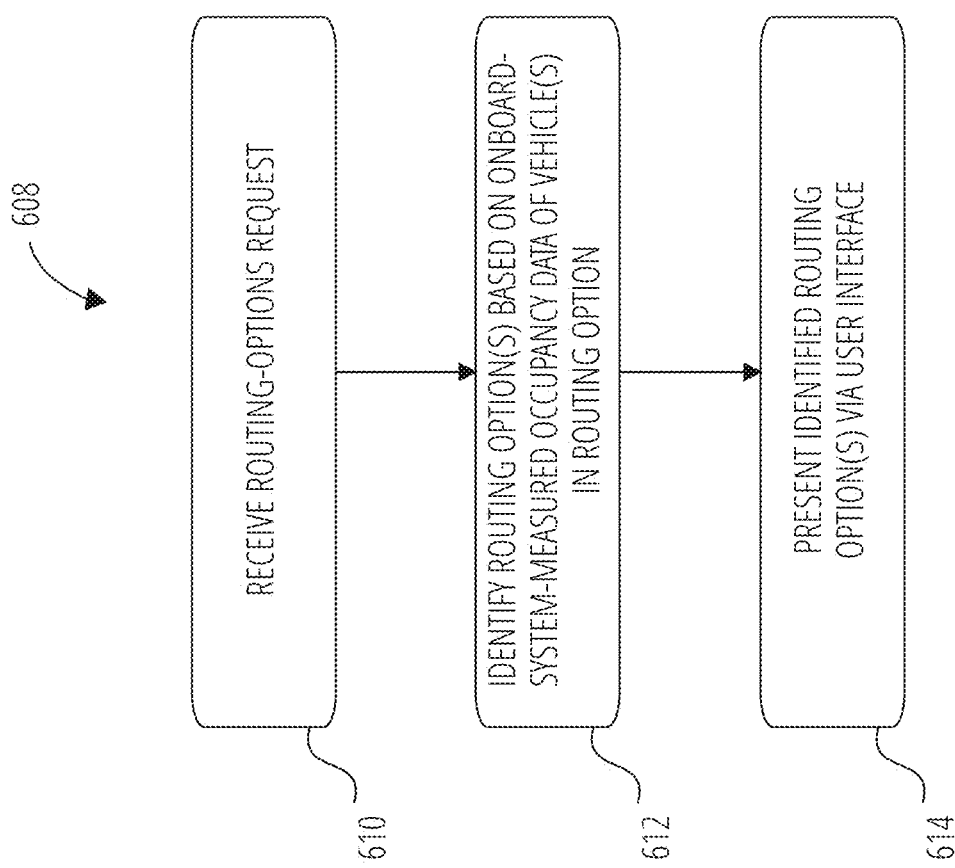
FIG. 6B depicts a second example method, which may be performed by a user device (e.g., mobile device), in accordance with at least one embodiment.

Furthermore, the various embodiments and permutations discussed above in connection with FIG. 6A that pertain to user's travel preferences fully apply to this discussion of FIG. 6B as well. In one or more embodiments that are consistent with FIG. 6A and/or FIG. 6B, the identifying of one or more routing options may be performed in a manner that accounts for users' travel preferences in addition to one or more (actual and/or predicted) vehicle-occupancy values. As above, those travel preferences may be stored in user profiles that may be configurable by users as described herein.

Upon having identified a set of routing options, the mobile device 114 may present (at operation 614), the one or more identified routing options via the user interface of the mobile device 114. A given presentation may list the routing options in a list format. As another alternative, the routing options could be depicted in a graphical way, similar to what is depicted in each of FIG. 7, FIG. 8, FIG. 9, and FIG. 13, as examples. In some cases, similar to what is shown in those figures, the presented routing options may show one or more actual-occupancy values and/or predicted-occupancy values for one or more vehicles in one or more of the presented routing options.

The user may select a given one of the presented routing options, and the mobile device 114 may accordingly track the progress of the user on that selected route. For example, based on current time and/or GPS location of the mobile device 114, among other possible monitored triggering values, the mobile device 114 may present, to the user via the user interface, a prompt requesting a confirmation that the user has boarded the particular vehicle. In at least one embodiment, upon receiving the confirmation via the user interface, the mobile device 114 may responsively transmit an update message to a server such as the smart-routing server 124 or the transit-application server 126, as examples, to update an actual occupancy of the vehicle to reflect that the user has boarded the vehicle.

As described herein, the mobile device 114, via the discussed example transit app, may select, based at least in part on one or both of the occupancy data and one or more travel preferences in a stored user profile associated with the user, a recommendation order for the one or more identified routing options. Furthermore, the presented routing options may be presented according to the determined recommendation order. Thus, embodiments of the present disclosure provide recommendations with respect to what transport to take and when, considering all vehicles (personal and public) that are available to a given user, and also considering current and predicted occupancy levels of one or more shared vehicles, among other factors. In at least some embodiments, the set of vehicles that is available to a given person is defined in a stored user profile, along with various travel-related preferences.

Returning now to the discussion of embodiments similar to the one depicted in and described in connection with FIG. 6A, as discussed herein, in a given instance, an example of a number of multimodal routing options are identified and presented via, e.g., a user interface of the mobile device 114, these options can be presented in a visual manner, one example of which is depicted in the example routing-options diagram 700 of FIG. 7. In the routing-options diagram 700, a person 112, who in this example is a user of the mobile device 114, is currently at an arbitrary Location X, and is looking to return to their home 708, which is also referred to in FIG. 7 as Location Y. The mobile device 114 has identified and is presenting three different trip options: a trip A 702, a trip B 704, and a trip C 706.

The trip A 702 has an estimated duration of 32 minutes, and can start immediately (at a time referred to in FIG. 7 as t0), perhaps corresponding with a situation in which a bus from a bus line 47 is currently right in front of the mobile device 114, ready to depart. The trip A 702 also includes a #67 bus. In the example situation depicted in FIG. 7, the #47 bus that is part of the trip A 702 has a capacity of 50 and a current occupancy of 48, while the #67 bus that would be taken has a capacity of 40, a current occupancy of 34, and a predicted occupancy of 40 at the time that the person 112 would take it.

By comparison, the trip B 704 has an expected duration of 27 minutes, and can also begin immediately (at t0) because the person 112 could depart immediately on their own bike. The trip B 704 next includes a leg on a #52 bus on which the person 112 would take their bike, after which the person 112 would bike to their home 708. As shown in FIG. 7, that #52 bus has a capacity of 50, a current occupancy of 18, and a predicted occupancy of 23 at the time that the person 112 would take it.

Figure 7:
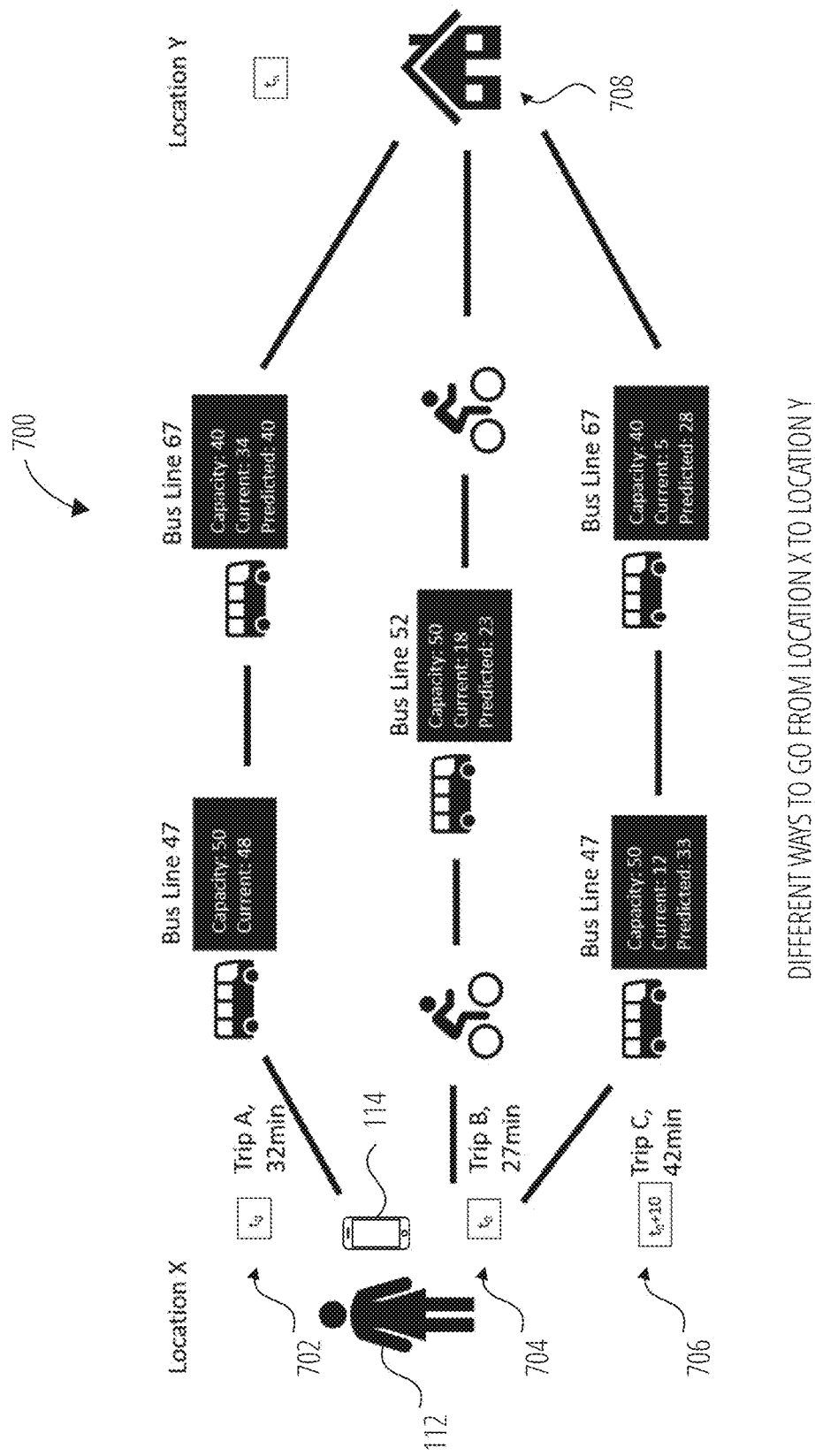
FIG. 7 depicts a first example routing-options diagram, in accordance with at least one embodiment.

The trip C 706 has an expected duration of 42 minutes, one reason being that it does not start until 10 minutes after t0, represented in FIG. 7 as t0+10. This may correspond to a situation in which the next #47 bus is due in 10 minutes, after which the person 112 would take a #67 bus, similar to in the trip A 702. Of course it would likely be a different #67 bus than the #67 bus that is shown in the trip A 702. In FIG. 7, it can be seen that, in connection with Trip C, that particular #47 bus has a capacity of 50, a current occupancy of 12, and a predicted occupancy of 33 at the time that the person 112 would take it; additionally, the #67 bus that the person 112 would take as part of the trip C 706 has a capacity of 40, a current occupancy of 5, and a predicted occupancy of 28 at the time that the person 112 would take it.

In connection with the trip C 706, the transit-related app may assess the current occupancy of the #47 bus as being acceptable (e.g., less than a user preference stored in the associated user profile), which may make the route in line with the user's preferences at the moment. However, the app may predict (or access a prediction) that indicates that, at an intermediate location, the occupancy will be at max capacity (e.g., while passing through a busy downtown area). Accordingly, route other than the trip C 706 may be recommended. Certainly numerous other examples could be presented as well.

Furthermore, in at least one embodiment, a level of occupancy of an intermediate transition point (e.g., a bus stop) of at least one candidate route is monitored. In an example scenario, even if the current and predicted occupancy levels for the #67 bus in the trip C 706 were relatively low, a big crowd waiting at the bus stop where the person 112 would board that #67 bus may lead to a different conclusion regarding expected occupancy. In an example situation in which the trip C 706 might otherwise have been recommended, the large crowd at the bus stop could be a basis for downgrading the trip C 706 and recommending a different route. Similar examples could be described in connection with crowds at train stations, subway stations, etc.

In embodiments that include waypoint-occupancy monitoring, for those waypoints in which people gather in bounded spaces (e.g., a subway platform bounded by the train on one side and a wall of the subway station on the other), the waypoint-occupancy monitoring could be conducted using one or more of the volumetric-occupancy-measurement embodiments described herein. In one example embodiment, a 4DO occupancy node such as are described in this disclosure is used to generate a time series of a volumetric-occupancy index for an intermediate location (e.g., a bus stop, a train platform, a waiting room at a train station, etc.) on a potential routing option. This time series may be received and processed by, e.g., the smart-routing server 124, which may derive from the time series an estimate of a number of people currently at that intermediate location. In at least one embodiment, the identifying of the one or more routing options is also based on the derived estimate.

Figure 8:
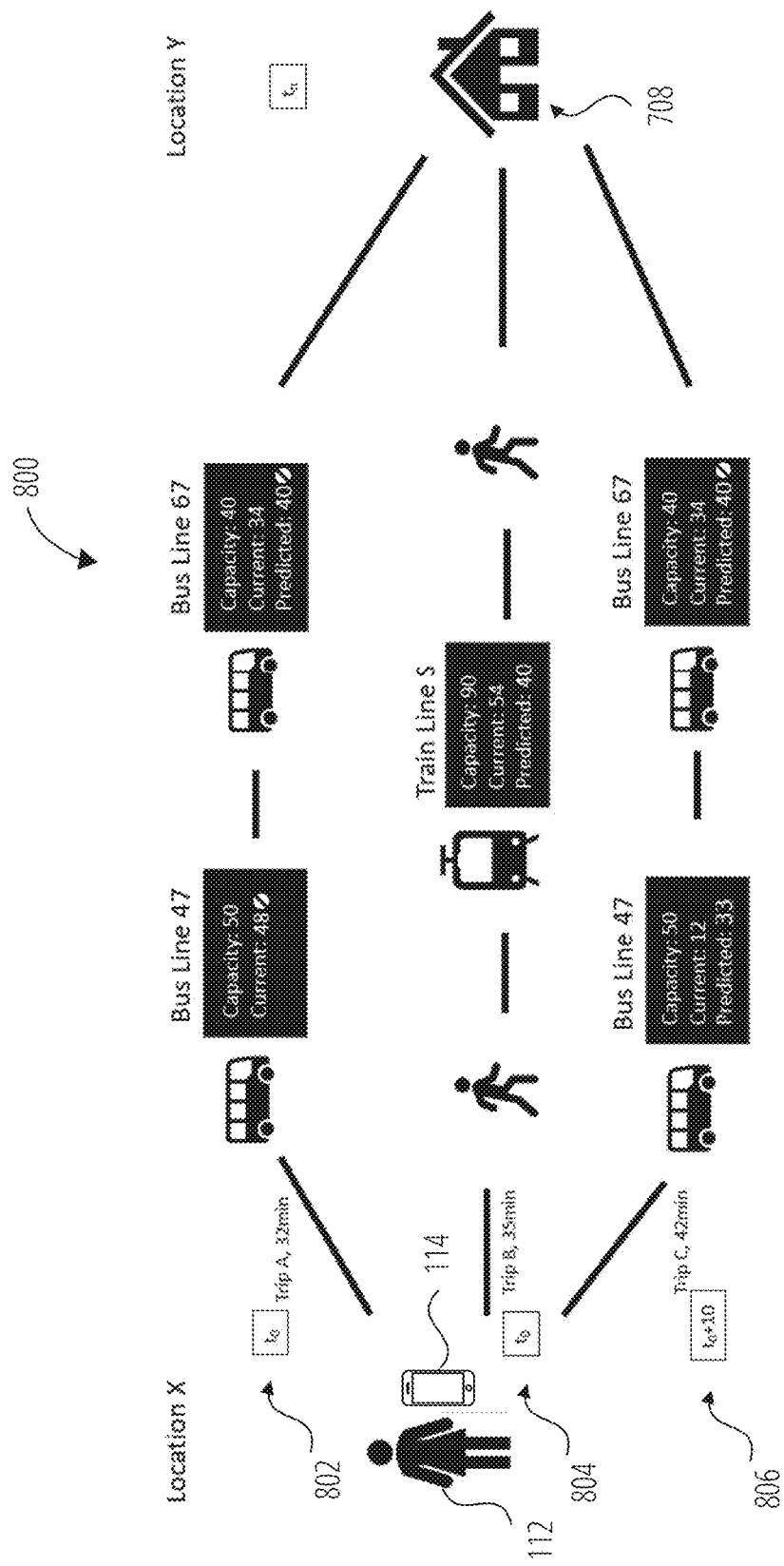
FIG. 8 depicts a second example routing-options diagram, in accordance with at least one embodiment.

To further illustrate examples of identification and presentation of routing options in accordance with embodiments of the present disclosure, depicted in FIG. 8 is a routing-options diagram 800. FIG. 8 depicts three routing options for a person 112 to return to their aforementioned home 708: a trip A 802, a trip B 804, and a trip C 806. It is first noted that the trip A 802 and the trip C 806 of FIG. 8 match the trip A 702 an the trip C 706 of FIG. 7, respectively, and thus are not described in detail again here other than to note that, in FIG. 8, a slashed-circle icon appears next to each high occupancy number. In this example, an icon is not specifically used to denote low occupancy numbers, but certainly one could be. Also, different users would very likely have different occupancy thresholds and, in this example, the predicted 33 out of 50 for the #47 bus in the trip C 806 is not labeled as high, though for other users it certainly might be.

Instead of or in addition to icons, colors could be used in various different embodiments to highlight certain current and/or predicted occupancy values. For example, red text could be used for high occupancy values (e.g., those at or above a user-specified vehicle-occupancy threshold, which could be for vehicles in general, or could be specific to vehicle type, among other possible implementations). Green text could be used for low current and/or predicted occupancies (e.g., those that are below a user-specified threshold). Yellow text could be used for intermediate values, and so on. Other manners of calling a user's attention to various high and low occupancy numbers could be used as well in various different implementations.

Among the three candidate routes in FIG. 8, it can be seen that both the trip A 802 and the trip C 806 include at least one leg of the trip in which the occupancy of the associated vehicle is predicted to be very close to or at full capacity. As such, in at least one embodiment, the trip B 804 would be the trip that would be labeled as recommended to the person 112.

In an example scenario, however, suppose that, after the candidate routes that are depicted in FIG. 8 had been presented to the person 112, a #67 bus breaks down near a train station that precedes the person 112's station on the same train line "S" in the direction of travel at the relevant time. Suppose further that this breakdown results in several passengers that were on that #67 bus being rerouted to the S train, causing the occupancy on the S train to increase significantly. Events such as this cannot be predicted, and if the person 112 is unaware of this situation and happily begins their trip B 804 at the time t0, the person 112 may well be met with a packed train when they reach their station expecting a train that is a little less than half full.

However, in an example scenario and consistent with at least one embodiment, one or more of the passengers that had been rerouted to the S train hop on the same transit-related app that is used by the person 112 and input information into the app to communicate these events in a route-update message to a central server such as the transit-application server 126, which can then make such information known (using, e.g., push alerts, texts, etc.) to other app instances. Upon receiving this information, the transit-application server 126 may alert the transit app on the mobile device 114 of the person 112. The transit-application server 126 may also account for this delay and resultingly, while still considering the user's preference with respect to vehicle occupancy, take advantage of this feedback loop and recommend a different route to the person 112, as shown in FIG. 9.

Figure 9:
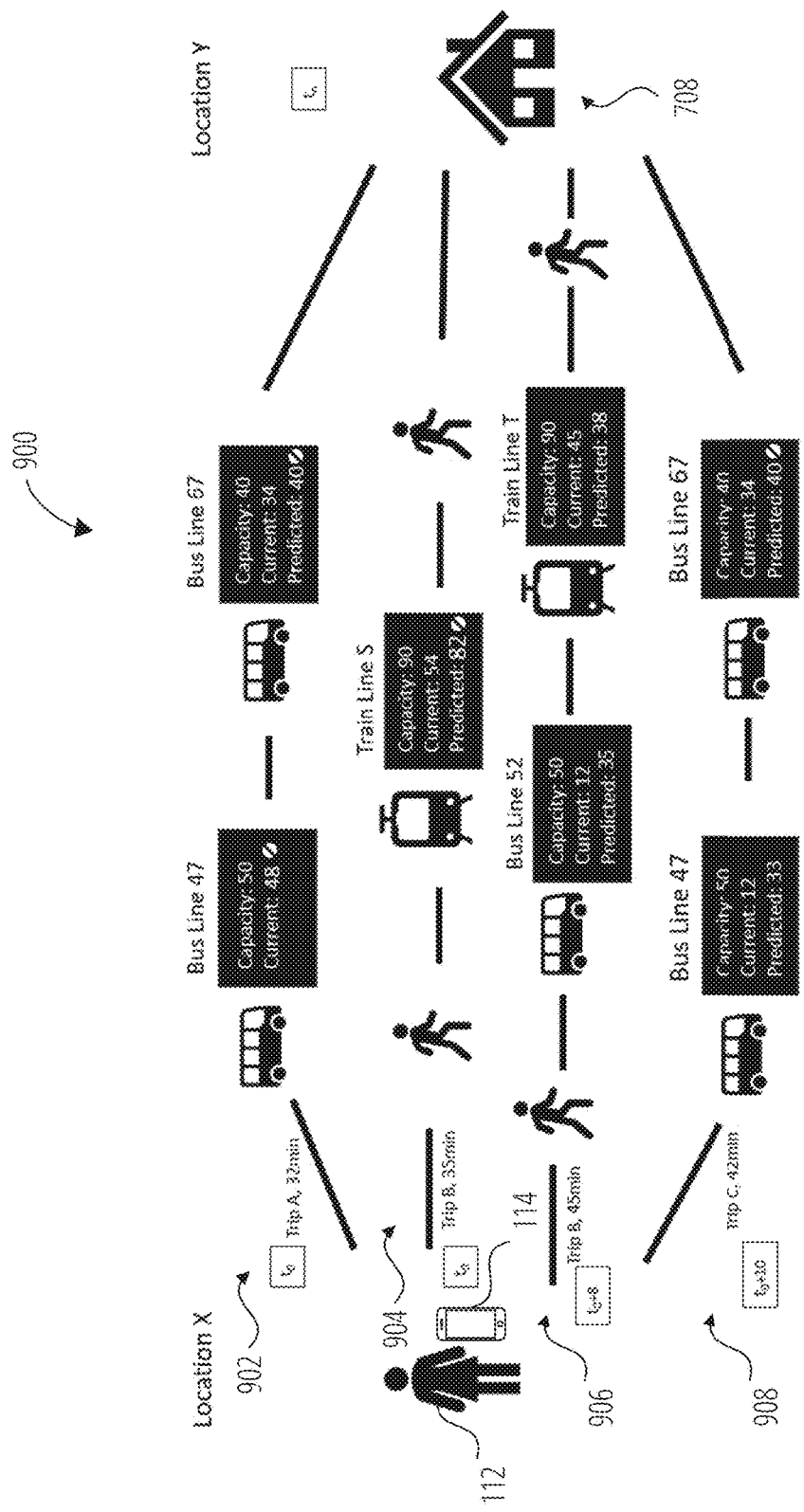
FIG. 9 depicts a third example routing-options diagram, in accordance with at least one embodiment.

In the routing-options diagram 900 of FIG. 9, four candidate routes are shown: a trip A 902, an original trip B 904, a revised trip B 906, and a trip C 908. Again, the top and bottom routes are the same as on the previous two figures, and are not further discussed here. The original trip B 904 has been updated to show a very high occupancy on the S train, and a newly suggested revised trip B 906 has been added. That is now the recommended trip for the person 112, and involves walking to a #52 bus and then catching the T train.

Figures 10, 11, 12:
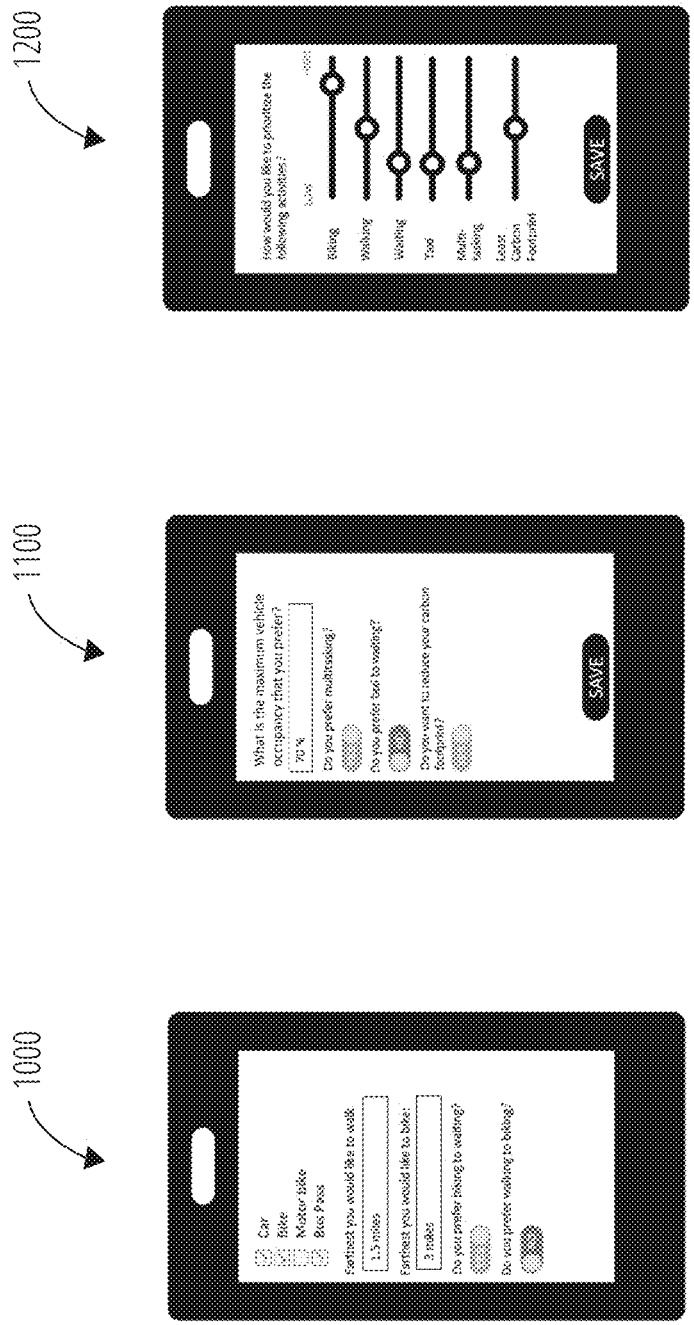
FIG. 10 depicts a first example user-profile screen, in accordance with at least one embodiment.
FIG. 11 depicts a second example user-profile screen, in accordance with at least one embodiment.
FIG. 12 depicts a third example user-profile screen, in accordance with at least one embodiment.

As described herein, in at least some embodiments, the transit app considers the user's preferences as stored in a user profile when making routing suggestions and recommendations. FIG. 10, FIG. 11 and FIG. 12 depict three example user-profile screens with which a user can interact to store their preferences in their profile for this app. In various different embodiments, the user profiles may be stored in the transit-application server 126, or in a data platform accessible to the transit-application server 126, etc. A local copy of the profile may be maintained on the mobile device 114. Furthermore, as described below a user may be presented with a number of configuration screens via the mobile device 114, to assist the user in configuring their preferences into their profile. Upon receiving changes a user's preferences, an update may be sent from the mobile device 114 to the transit-application server 126. This could be a push event, a periodic event, an on-demand event from the perspective of the transit-application server 126, and/or the like.

In the user-profile screen 1000 of FIG. 10, the user can indicate vehicles that are available to them, in this case indicating that they have access to a car and a bike, and that they have a bus pass, but that they do not have a motor bike. In at least one embodiment, one or more of the candidate routes that are selected for and presented to a user include at least one leg of the respective journey that would utilize at least one personal vehicle (e.g., a bike) that is listed in that user's profile as being available to that use.

There are also fields in the user-profile screen 1000 in which the user can input the furthest distances that they would prefer to walk and bike, respectively, as well as two yes/no buttons with which the user can indicate whether they prefer one travel modality (biking) over waiting for another, as well as whether they prefer one specific travel modality (walking) over a second specific travel modality (biking). With respect to that last button, in at least one embodiment, the transit-application server 126 prioritizes, in the one or more identified routing options, at least one routing option that involves biking and does not involve walking over another routing option that involves walking.

The user-profile screen 1100 includes a field within which the user can indicate the maximum vehicle occupancy that they prefer, as well as radio buttons with which they can indicate whether they prefer to multitask, whether they prefer taking a taxi (or rideshare, etc.) over waiting for another mode of transportation (e.g., a bus or a train), and whether they are interested in reducing their carbon footprint, or another eco-friendly question could be asked. Users that answer yes to the last question may see options recommended and/or more highly prioritized that include one or more environmentally friendly travel modalities such as walking, biking, using at least one electric vehicle, using public transportation, etc.

With respect to the specified maximum vehicle occupancy, this could be for all vehicles or it could be broken down by vehicle type. Additionally, a slider or other mechanism other than a text field may be used in different embodiments to receive this vehicle-occupancy threshold from the user.

In selecting and prioritizing (e.g., recommending) various different routing options, the transit-application server 126 may limit the listed routing options to those having occupancies below this threshold. In other implementations, such routing options are still shown, but in a less-recommended way, and often with the high-occupancy number of level highlighted for the user. These considerations could relate to actual current occupancy and/or predicted occupancy (for approximately the time at which the user would board the vehicle if that routing option were carried out). In some embodiments, users provide input separately for actual vs. predicted occupancy.

As another example screen, the user-profile screen 1200 shows an example graphical tool that may be presented to the user via the user interface of the mobile device 114. This example graphical tool enables a user to visually specify a relative importance to the user among a group of options that includes specific travel modalities (biking, walking, taxi), the passive activity of waiting for a given travel modality (e.g., a train or a bus), as well as two more general travel-preference questions (regarding multitasking and reducing one's carbon footprint). And certainly one or more other options could be listed in addition to or instead of one or more of the options that are listed in FIG. 12.

The graphical interface provides left-right sliders with which the user can indicate somewhere between a low and high level of importance that they attach to each of these listed options, which allows the user to convey both an absolute level (between low and high) for each item as well as relative relationships among the listed items. The sliders are provided by way of example. Other indicators could be used as well, including number rankings in some embodiments. In some embodiments, the user is input fields with which the user can weight the various consideration items for listed when routes are selected and prioritized.

In at least one embodiment, the transit-application server 126 may prioritize certain routing options over others based on the chosen position of these sliders. For example a routing option that aligns with a higher-ranked user preference may be prioritized and recommended over a routing option that aligns with a lower-ranked travel preference (and does not also align with the higher-ranked preference). Additionally, in at least one embodiment, a user may be able to provide personal information such as age or health risk factors, so that these can be considered as well with respect to automatic routing-option recommendation. Such personal information is very important, and embodiments of the present disclosure would apply appropriate security to such information.

Figure 13:
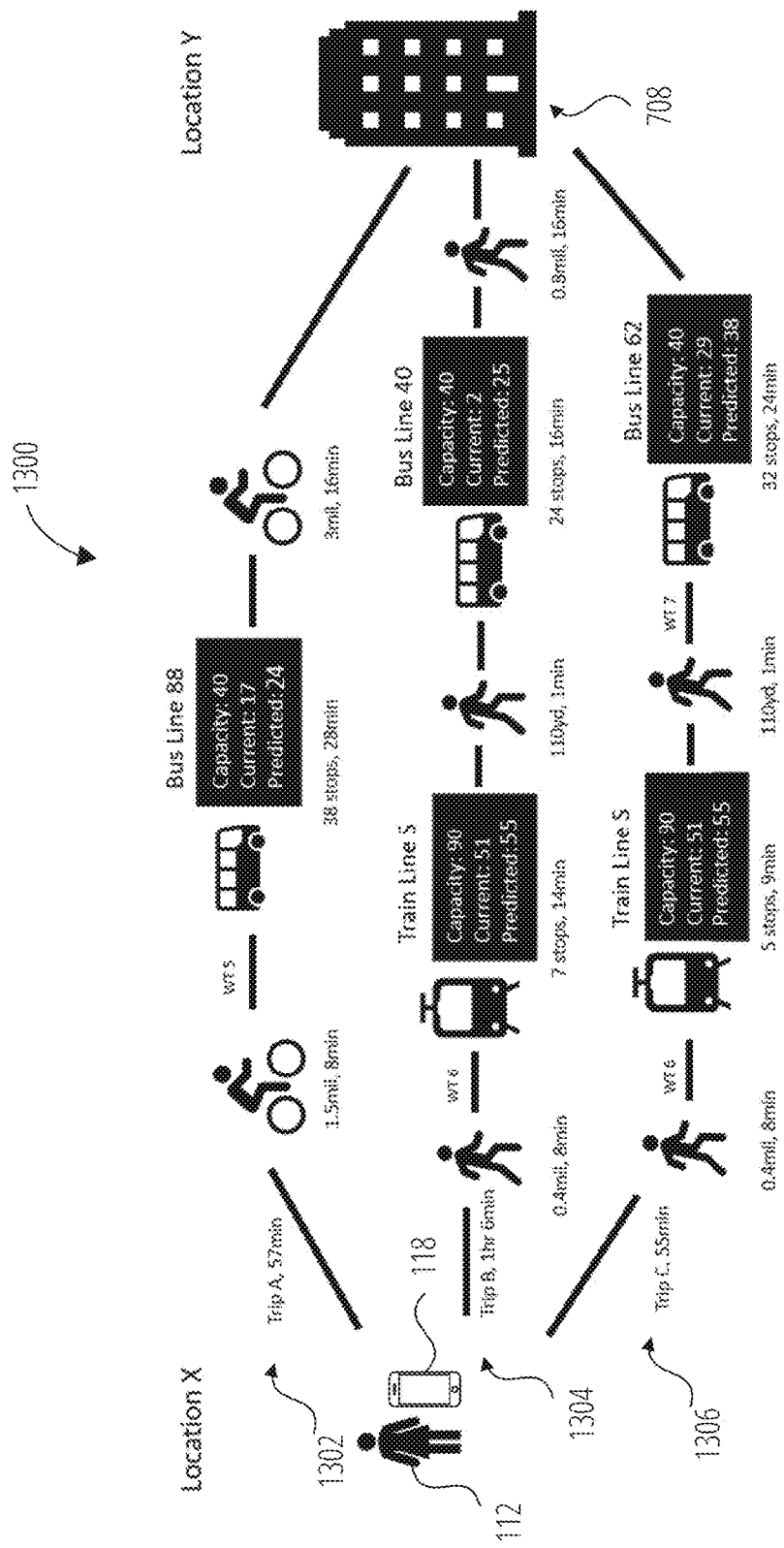
FIG. 13 depicts a fourth example routing-options diagram, in accordance with at least one embodiment.

FIG. 13 depicts a routing-options diagram 1300 that includes three candidate routes: a trip A 1302, a trip B 1304, and a trip C 1306. Among these, the trip A 1302 may be the most preferred option by the person 112 in this particular example, in that the trip A 1302 involves biking (as opposed to the walking in the other two routing options), and the occupancy of the #88 bus is below the 70% threshold set by the user. There is also quite a high predicted occupancy for the #62 bus in the trip C 1306. And though both predicted occupancies in the trip B 1304 are below that 70% threshold, it is above 60% and, together with the two walking legs, in this example drops the trip B 1304 below the trip A 1302 with respect to prioritization and recommendation based on the occupancy data and based further on the specific user preferences of the person 112 as stored in a corresponding user profile. It is also noted that, in this example, the trip C 1306 is not recommended for this particular person over the trip A 1302 even though the trip C 1306 is the fastest of the three.

Figure 14:
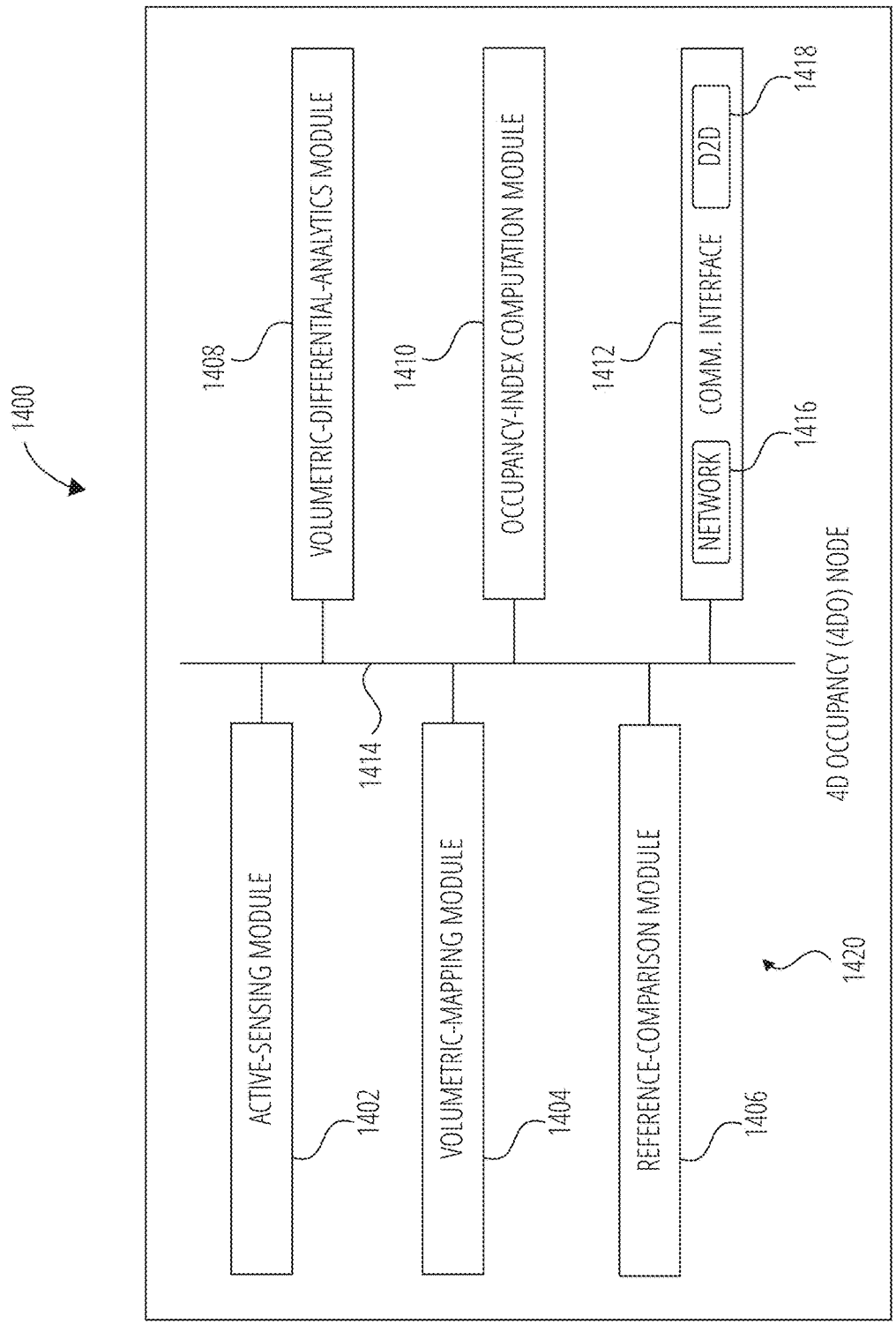
FIG. 14 depicts an example architecture of an example 4D occupancy node, in accordance with at least one embodiment.

Turning now to figures that pertain more particularly to volumetric-occupancy measurement, FIG. 14 depicts an example architecture 1420 of an example 4DO node 1400, in accordance with at least one embodiment. The 4DO node 1400 may be equipped, programmed, and configured to carry out various combinations of the operations that are described herein as being performed by a 4DO node. The architecture 1420 is provided by way of example and not limitation, as different architectures could be implemented in different contexts. In the embodiment that is depicted in FIG. 14, the 4DO node 1400 includes, in its architecture 1420, an active-sensing module 1402, a volumetric-mapping module 1404, a reference-comparison module 1406, a volumetric-differential-analytics module 1408, an occupancy-index computation module 1410, and a communication interface 1412, all of which are communicatively connected with one another via a system bus 1414. These elements are discussed below.

Figure 15:
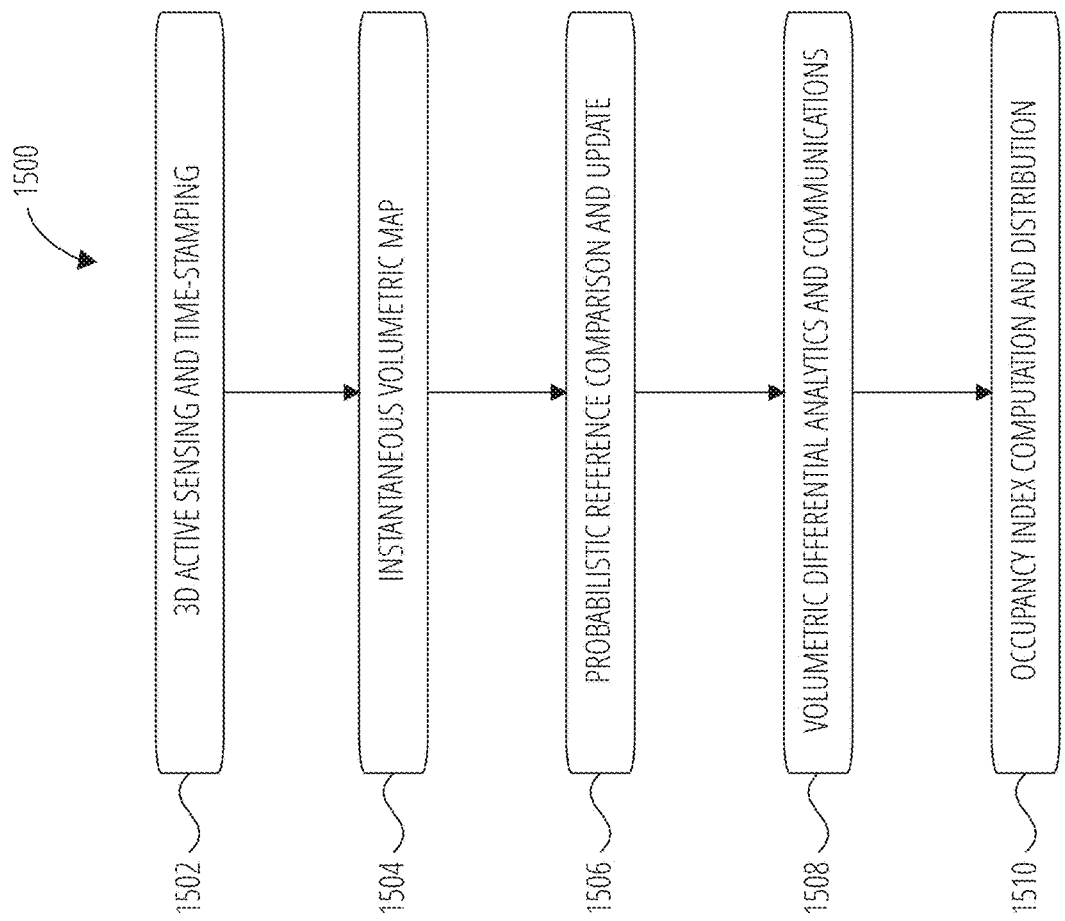
FIG. 15 depicts an example process flow that may be performed by the example 4D occupancy node of FIG. 14, in accordance with at least one embodiment.
Figure 16:
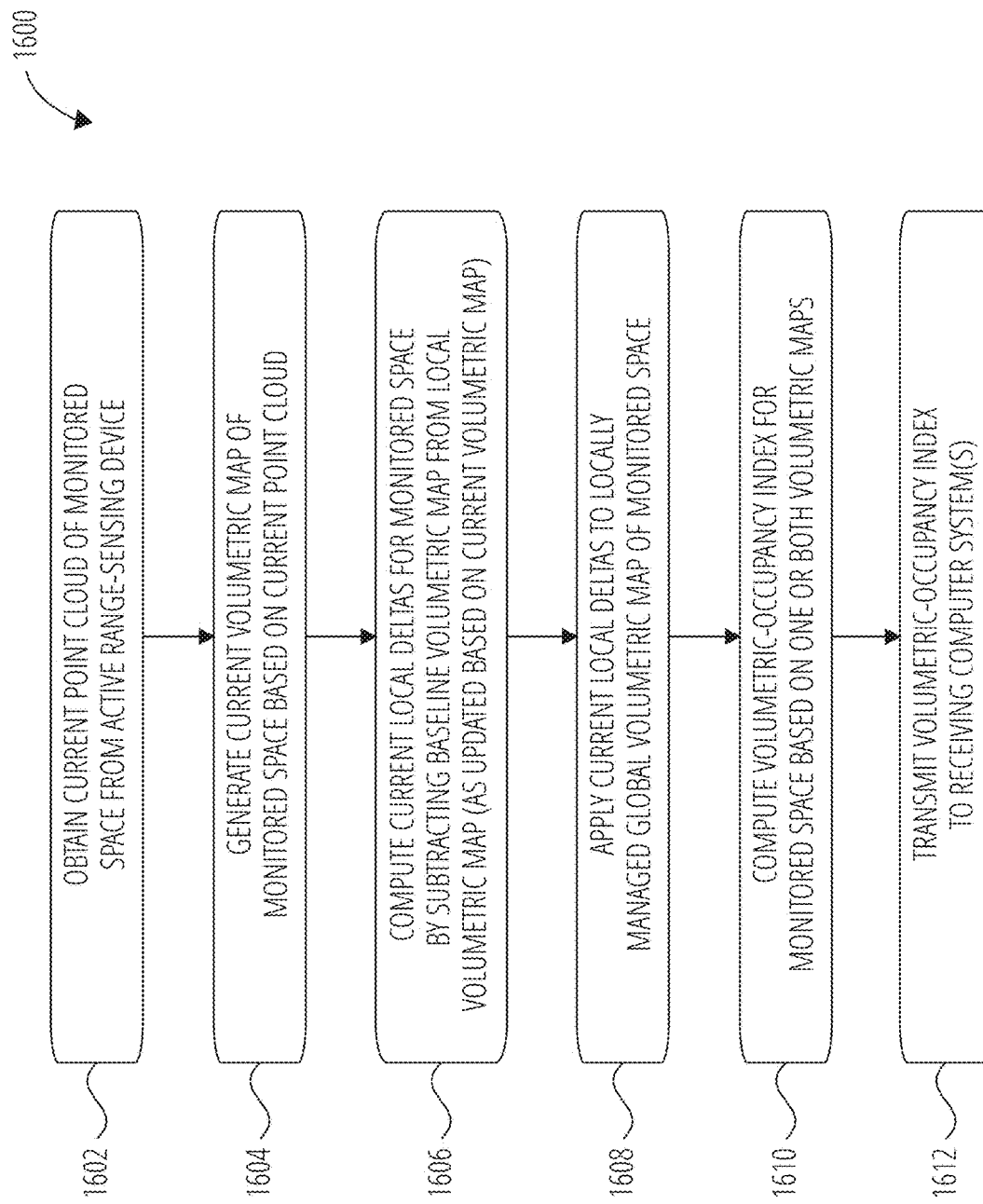
FIG. 16 depicts a third example method, which may be performed by the example 4D occupancy node of FIG. 14, in accordance with at least one embodiment.

Prior to that discussion, however, it is noted that there is some parallelism among FIG. 14, FIG. 15, and FIG. 16. While FIG. 14 depicts the 4DO node 1400 having various modules and a communication interface, FIG. 15 depicts an example process flow 1500 that may be performed by the 4DO node 1400, and that includes five operations that correspond respectively, and are numbered in parallel with, the five modules of the 4DO node 1400 that are depicted in FIG. 14. In at least some embodiments, each operation in FIG. 15 is performed by the corresponding module in FIG. 14. For brevity, the operations that are performed by the modules of FIG. 14 are described here with the understanding that this description should also be taken as an illustrative explanation regarding how the process flow 1500 may be performed in various different embodiments.

There is also substantive overlap between FIG. 14 and FIG. 15 on the one hand and a method 1600 that is depicted in FIG. 16 on the other. The method 1600 is described herein by way of example as a method that could be performed by the 4DO node 1400 among other possible implementations. The mapping between FIG. 14 and FIG. 15 on the one hand to FIG. 16 on the other is not so 1-to-1 as the mapping between FIG. 14 and FIG. 15, however. Thus, in the description below, it is the method 1600 that provides the structure of the discussion. Where relevant, module-operation tuples from FIG. 14 and FIG. 15 collectively are referenced in connection with various different operations of the method 1600.

Prior to proceeding through a discussion of the method 1600, however, it is noted here that many aspects of embodiments of the present disclosure that pertain to volumetric-occupancy measurement and so forth are described above, prior to the description of FIG. 1, starting with the paragraph that begins with "Broadly speaking, . . . " and continuing until right before the paragraph that begins with "A further embodiment takes the form of . . . ." That sequence of paragraphs of the present disclosure should be considered to be part of the description of FIG. 14 through FIG. 18. For brevity, many of the aspects that are explained there are not reexplained here. Those of skill in the art will readily see the clear applicability of those paragraphs to these figures and their accompanying descriptions.

With respect to hardware in certain embodiments, the active-sensing module 1402 may include a depth-information-capture device of any suitable sort, including a range-sensing (e.g., LiDAR) device, for example. As for the communication interface 1412, it may include any suitable set of one or chipsets, antennas, other communication-related hardware, and/or the like for engaging in wireless communication with one or more other entities. The communication interface 1412 may also include ports and the like for engaging in one or more types of wired communication, such as Ethernet, USB, and the like. Returning to the wireless side, in at least one embodiment, the communication interface 1412 includes both a network interface 1416 and a D2D interface 1418, where "D2D" stands for device-to-device, as is known in the art. As described in various other parts of this disclosure, the 4DO node 1400 may selectively use its network interface 1416 and/or its D2D interface 1418 based on identifying various different circumstances based on link quality, available of a connection via the network interface 1416, and the like.

Turning now to the method 1600 of FIG. 16, this is an example method that may be performed by the example 4D occupancy node of FIG. 14, in accordance with at least one embodiment. In other embodiments, the method 1600 may be performed by any suitable computing, sensing, and communication device that is equipped, programmed, and configured to perform the operations of the method 1600. In some instances, the method 1600 could be performed by two or more devices that are installed together and communicatively connected to one another, such as a combination of a range-sensing device and an edge computing device, among other possible implementations.

According to the method 1600, at operation 1602, the 4DO node 1400 obtains, from its active range-sensing device (e.g., LiDAR sensor), a current point cloud representative of a monitored space in which the 4DO node 1400 is positioned. The operation 1602 may correspond to the active-sensing module 1402 and with at least part of the 3D-active-sensing-and-time-stamping operation 1502. The active-sensing module 1402 performing the 3D-active-sensing-and-time-stamping operation 1502 may involve the active-sensing module 1402 performing a number of different operations as various parts, sub-operations, etc. of the 3D-active-sensing-and-time-stamping operation 1502. That is also the case with the other module-process pairs: each operation that is labeled in FIG. 15 may include any number of sub-operations including any number of loops at various rates and having various different operations within those loops.

Based on the current point cloud, the 4DO node 1400, at operation 1604, generates a current volumetric map of the monitored space based on the current point cloud. As described above, in some cases, the current volumetric map is one and the same with an instantaneous volumetric map that the 4DO node 1400 generates directly from the point cloud. In other cases, the generating of the current volumetric map includes combining that newest instantaneous volumetric map with one or more earlier instantaneous volumetric maps, according to any suitable function such as any of those described above (e.g., a voxel-wise taking of the highest likelihood value across the multiple instantaneous volumetric maps). The operation 1604 may correspond to the volumetric-mapping module 1404 and the instantaneous-volumetric-map operation 1504.

While the generation of instantaneous volumetric maps from point clouds may occur at the above-described capture rate, it may be less often (e.g., at the reference-comparison rate) that the just-described current volumetric map is provided for comparison to the almost-current (e.g., t−1) local volumetric map that is maintained by the 4DO node 1400. In many embodiments, it is a copy of the local volumetric map (from, e.g., t−1) on which the hardware and/or software operate to perform a comparison of the current volumetric map to the local volumetric map in order to, for example, find any voxels that are different between the two and, in those cases, write the value from the current volumetric map over the value of the copy of the local volumetric map, and then subtract the local baseline map from the result of that operation in order to generate the current local deltas (at operation 1606). The operation 1606 may correspond to the reference-comparison module 1406 and the probabilistic-reference-comparison-and-update operation 1506.

In some embodiments, when the current volumetric map is provided for the generation of the local deltas, a copy of the current volumetric map is also passed to the functional part of the 4DO node 1400 that maintains the local volumetric map. That functional part may then make the same voxel-wise comparison of the current volumetric map and the local volumetric map, and may also, for any voxels that are different, write the values from the current volumetric map in place of the values from the existing local volumetric map. In other embodiments, a single entity (e.g., circuit or process) does that comparison and then may send a copy of the changes to the local volumetric map. Certainly other approaches could be implemented as well.

The 4DO node 1400 may then (at operation 1608) apply the local deltas that were identified at operation 1606 to the global volumetric map that the 4DO node 1400 also maintains in embodiments of the present disclosure. This application may take the form of simply writing those local-delta values over the corresponding values that were already in the global volumetric map for the corresponding voxels. In performing operation 1608, the 4DO node 1400 applies the current local deltas as changes to a second volumetric map maintained of the monitored space by the volumetric-occupancy node. In other embodiments, an average of the values could be used, such as a weighted average that favors the value that was already in the corresponding voxel of the global volumetric map, perhaps in the interest of model stability, or a weighted average that favors the local delta, perhaps in the interest of staying as current as possible. Other approaches could be selected by those of skill in the art having the benefit of this disclosure. The operation 1608 may also correspond to reference-comparison module 1406 and the probabilistic-reference-comparison-and-update operation 1506.

Typically based on the likelihood values in the voxels of the global volumetric map, the 4DO node 1400 may, at a given frequency, on a request (on-demand) basis, on an event-driven (e.g., change-driven) basis, and/or the like calculate (at operation 1610) a volumetric-occupancy index that is indicative of the current volumetric occupancy of the monitored space. Giving various considerations to remaining battery power, airlink quality, and/or the like, the 4DO node 1400 may select a given granularity at which to compute and accordingly transmit (at operation 1612) the volumetric-occupancy index. The 4DO node 1400 could compute the index as occupied voxels divided by total voxels in the monitored space, as an example, or use a different approach, as described above. There may be times that the 4DO node 1400 is asked for its own estimate of the volumetric-occupancy index of the monitored space, in which case the 4DO node 1400 may perform this calculation with respect to voxel values in the local volumetric map. Combinations (e.g., weighted combinations) of the two are also possible, as are many other approaches.

The volumetric-occupancy index is a distilled metric that conveys information about the occupation level of a space. For example, a volume of 10×10×2 m3 that is discretized using voxels of 0.1 m3 contains a total of 2000 voxels at its finest granularity resolution. If, at a point in time, the global volumetric map contains 500 voxels that are marked as occupied, the occupancy metric may be obtained by 500/2000=0.25. Considering that the space grows in a cubic function, the quantity of voxels rapidly increases, and computing the number of occupied voxels becomes computationally challenging. The herein-described hexadeca-tree implementation alleviates this issue by not explicitly encoding subspaces of empty or occupied volume, though tree traversal is still used.

As described herein, in at least one embodiment, the 4DO node 1400 propagates the volumetric-occupancy index from the tree leaves to the root upon insertion and modifications in order to reduce the computational burden that tree traversal can impose when the complexity of a data structure increases. In this manner, in at least one embodiment, each tree node encodes the number of occupied voxels in its subspace, making an occupancy-index query an O(1) operation, as discussed. This makes embodiments of the present disclosure usable in connection with other higher frequency analytics such as the computation of the first and second order rates of change that can be used to infer the dynamics of occupancy levels.

Additionally, in at least one embodiment, the occupancy levels are not just instantaneous metrics in that temporal values are also stored in the tree, enabling querying occupancy of metrics along the dimension of time, at specific points, for intervals, etc., enabling analytics that can visualize the evolution of occupancy of desired subspaces over time. An example embodiment may be utilized in a metro transportation setting. Access to occupancy metrics and their rate of change can be integrated into a control system that may receive the occupancy and its rate of change as inputs into a control algorithm that, e.g., tunes the number of assets deployed to transportation passengers, modulates the frequency, speed and capacity of trains, and/or the like, improving passenger experience and reducing energy consumption.

The operation 1610 and the operation 1612 may correspond to the occupancy-index computation module 1410, the occupancy-index-computation-and-distribution-operation 1510, and the communication interface 1412. It is noted that the volumetric-differential-analytics module 1408 and the volumetric-differential-analytics-and-communications operation 1508 have yet to be mentioned in connection with the method 1600. It is noted that the volumetric-differential-analytics module 1408 and the volumetric-differential-analytics-and-communications operation 1508 generally relate to assessing airlink quality, selecting granularities for various operations and communications, and the like, which are described below. In at least one embodiment, the volumetric-differential-analytics module 1408, as at least part of the volumetric-differential-analytics-and-communications operation 1508, performs kernel weighted finite differential analytics over the occupancy volume. This mathematical model encompass an integral summary of the scene while reducing the computation and memory requirements rendering valuable insights from the scene consuming low-power and minimal instrumentation investments.

As discussed, in in at least some embodiments, the 4DO node 1400 takes communication link quality and availability into consideration in connection with sending, e.g., volumetric-occupancy index data to a receiving computer system or sending another type of data to another type of device. In in at least some embodiments, in order to attempt to improve the reliability of, e.g., volumetric-occupancy-index transmission, at least two techniques are used alone or together in various different embodiments: the first is an adjustment of granularity or resolution of, e.g., responses to queries about the monitored space based on dynamic assessment of link quality, and the second is using an alternate communication path (via, e.g., the D2D interface 1418 with nearby peer nodes that may intermittently have a better link (e.g., less congested, stronger signal) with a given device or system.

As discussed, in example embodiments, the volumetric-differential-analytics module 1408 oversees determining the quality of the communications link and deciding on the level of granularity at which the occupancy updates will be sent to the peer nodes, given that multiresolution representation allows for varying levels of details on specific regions of interest. Moreover, it performs the differential analysis to determine which subspaces of the map to send as updates. The differential analysis consists of the Boolean operation of the two hexadeca-trees that represent the spatio-temporal global map. This herein-disclosed APIs enable a 4DO node to serve requests from a remote computation node that may be requesting higher resolution on a region of interest in the local space-time representation and can also be used to make the distributed mapping solution automatically load balance to avoid network saturation.

Depending on the RSSI of the radio link between two nodes, the bandwidth available to transmit map updates might vary. Each node is able to adapt to this circumstance by monitoring the signal quality as well as through specific API requests determining the rate at which information can be transmitted. The available bandwidth can be utilized to transmit a fixed number of voxels, thanks to the non-uniform resolution of the underlying representation, the voxels transmitted might represent different volumes. Another factor that influences the amount of data that needs to be transmitted is the smallest voxel size and the quantity of change to be transmitted. Due to the multi-resolution representation, the differential data (e.g., deltas) can be sent at different granularity levels. In cases where not enough bandwidth is available, the information can be sent at coarser levels of resolution, though this does not negatively impact occupancy-index computations.

From the perspective of a computer system receiving values of the volumetric-occupancy index from the 4DO node 1400, the volumetric-occupancy index may form a time series of values that are consistently spaced (in time) or irregularly spaced values (in time). In other cases, that receiving computer system could experience essentially an asymmetric, interrupt-style, event-driven receipt of index values. In other cases or as an overlap with these, the receiving computer system may make requests to the 4DO node 1400 for various different indices at various different times. Such requests could target particular subsets of the monitored space, one or more historical summaries of the monitored space and/or one or more subsets thereof, and/or the like.

As described, in some embodiments, the 4DO node 1400 is, at least for a time, a node among a plurality of nodes in a mesh (network). The peers may each have a sensing volume that overlaps that of the 4DO node 1400 in the monitored space, and the 4DO node 1400 may broadcast its current local deltas via its wireless-communication interface for receipt by one or more of the peer volumetric-occupancy nodes in the mesh. The 4DO node 1400 may also receive peer deltas broadcast by one or more peer volumetric-occupancy nodes, where those peer deltas include likelihood values for particular voxels, which the 4DO node 1400 may apply to the global volumetric map again, in an overwrite manner, a weighted-average manner, etc. To enter and/or establish the mesh in the first place, the 4DO node 1400 may execute the various peer-finding and peer-confirming approaches described herein. Further explanation of these processes in various embodiments is provided below in connection with FIG. 17.

From time to time, the 4DO node 1400 may conduct the herein-described baseline-calibration process, including using the active range-sensing device to collect, during a baseline-calibration time period, point clouds representative of the monitored space. The 4DO node 1400 may identify a set of voxels that, across a plurality of point clouds collected during the baseline-calibration time period, exhibited less than a threshold amount of change, and save that identified set of voxels as the baseline volumetric map of the monitored space.

As stated, in at least one embodiment, the local volumetric map and the global volumetric map that is maintained by the 4DO node 1400 is made up largely of voxels that each have a likelihood value indicative of a likelihood that the voxel is occupied in the monitored space. The voxels copy of the local volumetric map and/or the global volumetric map may be first and second volumetric maps stored in leaf nodes of respective n-tree structures that each includes its respective leaf nodes, a root node, and a plurality of intermediate nodes between its leaf nodes and its root node. As described, in a given instance of an n-tree structure, the root node and each intermediate node may have at most a positive integer n child nodes. In various examples, n could be any positive-integer power of two, such as 2 (quadtree), 3 (octree), 4 (hexadeca tree), etc.

Furthermore, the efficiency with which the 4DO node 1400 can access the likelihood values (or various higher-in-the-tree summaries thereof) in the n-tree structure is enhanced by an approach according to which, in the context of a given, e.g., hexadeca tree (storing in its leaves, for example, the voxels of the global volumetric map, each leaf node is (i) configured to report its likelihood value to its parent node responsive to initialization and modifications of its likelihood value and also (ii) queryable by and via its parent node as to its likelihood value. Additionally to this example, each intermediate node (i) has one or more child nodes that are each either a leaf node or an intermediate node that is lower in the hexadeca tree than the intermediate node, (ii) includes a composite value referred to herein as a composite likelihood value that is collectively indicative of the likelihood values or composite likelihood values of the one or more child nodes of the intermediate node; and (iii) is configured to compute and store therein, and report to its parent node, its composite likelihood value responsive to receiving a likelihood value or composite likelihood value from a child node of the intermediate node.

Given this design, at anytime the global volumetric map can be queried at any level of its tree structure for likelihood data that is reflective of its subtree. The composite values could be averages of likelihood values or composite likelihood values in the level below, or they could be whole-number counts such as a 1 for each child node having a likelihood value above a certain threshold, etc. This design also enables the 4DO node 1400 to select granularity levels at which to compute and then transits volumetric-occupancy indices, and also to evaluate factors such as link quality and make granularity selections for the content of transmitted deltas such as relatively higher granularities (from information relatively lower in the tree) in times of low network traffic, great wireless signal, availability of network via the network interface 1416, etc., as opposed to relatively lower granularities (from information relatively higher in the tree), and so on.

Because it is immaterial timewise how deep in a given tree to go for such information, and because the leaves are substantially always ready with their likelihood values, and further because every intermediate node and perhaps the root node are substantially always ready with their respective composite likelihood values, the querying of a hexadeca tree or other n-tree for likelihood values in accordance with the present disclosure is what is known as an "O(1) operation," where the time taken to complete the operation is not dependent on the amount of data to be processed (e.g., the amount of nodes to which the 4DO node 1400 simply has to go and effectively say "so tell me about your subtree," or in the case of a leaf, "yourself.") Whether a leaf or an intermediate node, this operation is quite fast and computationally inexpensive. To achieve a particular level of granularity for a particular query or computation, the 4DO node 1400 typically must walk the tree but only down to the level that corresponds to the desired granularity for that operation. For the curious and perhaps ambitious reader, further detail about—and examples of—implementations of hexadeca trees, octrees, quadtrees and so forth along the lines that are discussed herein can be found in U.S. Patent Application Publication No. US 2019/0197029 A1, published Jun. 27, 2019 and entitled "Methods, Systems, and Apparatus to Improve Spatial-Temporal Data Management."

Figure 17:
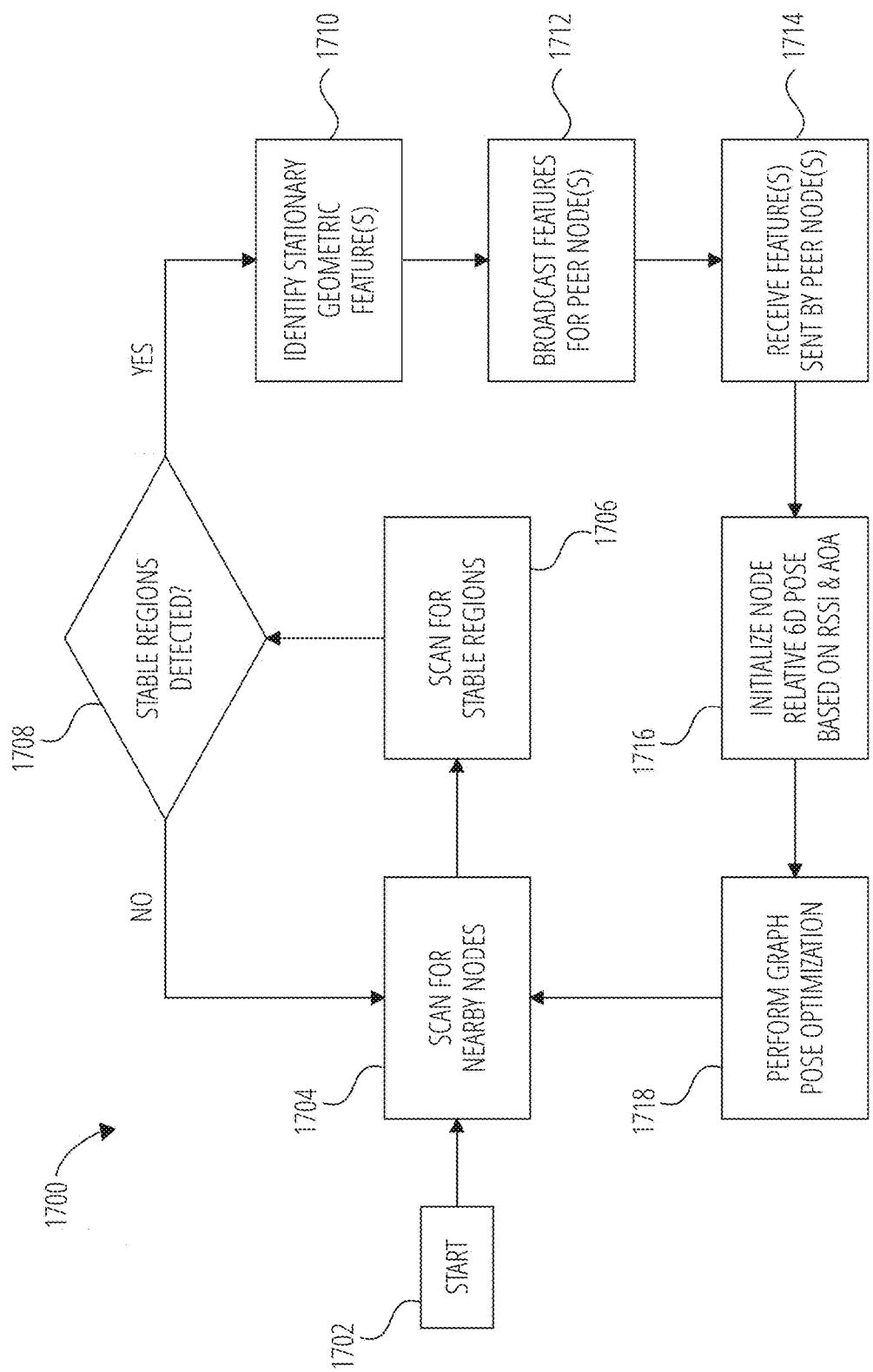
FIG. 17 depicts a flowchart of example operating logic that may be executed by the example 4D occupancy node of FIG. 14, in accordance with at least one embodiment.

With respect to peer finding, mesh building, and the like, FIG. 17 depicts a flowchart of example operating logic 1700 that may be executed by the example 4DO node 1400 of FIG. 14, in accordance with at least one embodiment. The operating logic 1700 starts at block 1702, and proceeds to scan for nearby peer nodes at block 1704. In some instances, it is possible that the nodes are laid out without any overlap or out of their radio communication range. In this case each node can operate in isolation and the metrics provided will only be with respect to the single node without integrating information from other nodes in the mesh. It is important to note that the process described in this section is run periodically and able to perform self-calibration of the sensor mesh in spatial and temporal domains.

Next, at operation 1706, the 4DO node 1400 scans for stable regions in its field of view of the monitored space. At decision block 1708, if stable regions have not been detected, control returns to 1704 to continue to scan for nearby nodes. If stable regions have been detected, however, control proceeds to block 1710, at which the 4DO node 1400 identifies one or more stationary geometric features in its sensing volume, the monitored space. At block 1712, the 4DO node 1400 broadcasts information specifying the identified one or more stationary geometric features for receipt by one or more peer nodes. At block 1714, the 4DO node 1400 receives information specifying one or more stationary geometric features identified by one or more peer nodes.

At block 1716, the 4DO node 1400 initializes its node relative 6D pose, which involves obtaining a mathematical transformation with respect to the 6 dimensions of space and rotation discussed above, in order to be able to translate among values expressed in local coordinate systems of various other 4DO nodes 1400. Part of deriving this transformation involves using information including, as examples, received signal strength indicator (RSSI) and angle of arrival (AoA).

At block 1718, the 4DO node 1400 performs a graph pose optimization, which is a known technique used to fine tune a transform in 6D between at least two different things such as, in this case, the origin of the line of sight of the range-sensing devices of various different 4DO nodes. A graph pose optimization may involve iteratively running a process that minimizes error between the appearance of one or more stationary geometric figures in each of the relevant cameras (or depth sensors, range finders, etc.) After enough processing, typically all of the involved nodes have arrived at the same map, and they can then determine their 6D position and orientation in that map relative to each other node.

Control then returns to block 1704, at which the 4DO node 1400 continues to scan for nearby nodes. In some embodiments, this scanning for nearby nodes continues for a number of different reasons, including that the set of nodes in a given area can change, and furthermore, especially in environments such as the inside of a moving city bus, over time the installed 4DO nodes may vibrate, shift, rotate, and/or the like. In at least some embodiments, each 4DO nodes has an operating parameter that determines the number of cycles after which this peer-finding-and-coordination procedure may be done again. If the parameter was set equal to 1000, for example, the 4DO node may return to scan for nearby nodes only 1 out of 1000 cycles, and so forth.

The active-sensing module 1402 carrying out the 3D-active-sensing-and-time-stamping operation 1502 may generally handle node discovery, initialization, self-calibration, and the like. In some embodiments, as discussed herein, node discovery is conducted in a manner that makes use of both radio capabilities and geometric features in what can generally be characterized as being a 3-phase process:

1. Communications Linking and Time Alignment:
    Nearby nodes can be discovered by detecting a wireless signature specific of the 4DO-Node. This signature can be transmitted in different modalities that can be specific to the particular installation. Signal strength and angle of arrival can provide a good initial estimates of the relative positions of the nearby nodes, as a way of identifying preliminary, approximate coordinates of the 4DO nodes, as a starting point from which to fine tune a transform.
2. Sensing Registration Features and Spatial-Alignment:
    Geometric features are obtained from regions that are classified as stationary. This enables relation of the rigid transformation between 4D nodes. Once the stationary geometric features are extracted, these features are shared with nearby nodes in order to determine whether there are regions of overlap that can be further used to obtain the full 6D relative position of overlapping nodes. The geometric features can be obtained by any existing engineered feature extraction method or may be deep-learning-based, among other options. The selection of the features to be used may depend on a target manner and degree of heat generation and dissipation, among other factors, in design of a given type of 4DO node.
3. 4D Joint Calibration Optimization:
    a graph optimization procedure can be run to determine a 6D relative position of the nodes that is consistent with observed features. The optimization process can be bootstrapped using an initial estimate from radio characteristics such as RSSI and AoA.

Some additional considerations include.

Automatic Sensing Graph Partitioning:
In the presence of empty scenes (for instance in some down time of a metro station), a first detection of volumetric changes (e.g., first people walking in early in the morning) may allow nodes to correlate a shared volumetric space with other nodes in the network. This may enable the above-described processes to be more effective, and may also assist in identifying that nodes have gone down or that something else has perhaps caused some sort of sudden miscorrelation.

Timing Considerations:
In order to maintain the most recently updated occupancy state, nodes that form a mesh can benefit from synchronizing their internal clocks. In situations in which there is a wireless link between them, this can be achieved using a Network-Time-Protocol-(NTP)-based approach. Additionally, in many indoor scenarios, artificial lighting provides an oscillating signal (typically at 50 or 60 Hz) that can be detected using frequency analysis of light intensity values. A signal such as that can be used in at least some embodiments as a synchronization signal by a group of 4DO nodes that share the same space. This may be considered a backup synchronization modality in many implementations, due to existing protocols typically being able to obtain micro-second-level accuracy synchronization even under jitter and challenging radio environments.

As described above, in some embodiments, in addition to the one or more—though typically two or more—4DO nodes, there is also an on-site entity referred to herein as a 4DO aggregator, which could be embodied as a separate physical device that typically would have more processing power, memory, data storage, and the like as compared with each 4DO node. In other cases, a 4DO aggregator could be embodied as a server process running on one of the 4DO nodes themselves. The latter arrangement may work better for an installation having a relatively small number of 4DO nodes, though that is not conceptually a requirement. In general, a 4DO aggregator receives deltas broadcast from each of the 4DO nodes at the site, updates a global map that it maintains of the environment, and broadcasts its own global-map deltas back to the 4DO nodes.

Figure 18:
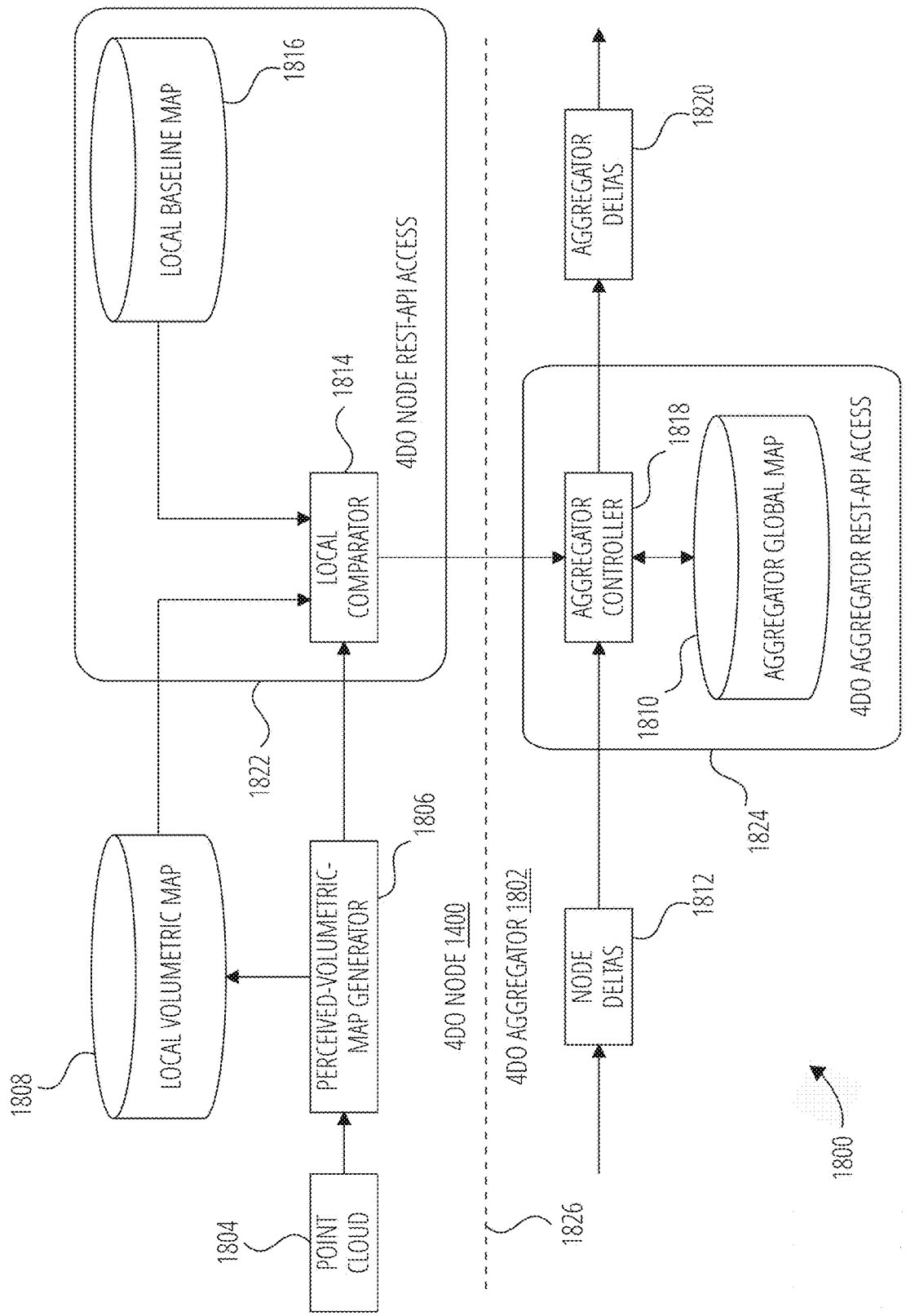
FIG. 18 depicts an example information-flow diagram that reflects an example demarcation of communications and functions between the example 4D occupancy node of FIG. 14 and an example 4D occupancy aggregator, in accordance with at least one embodiment.

FIG. 18 depicts an example information-flow diagram 1800 that reflects an example demarcation of functions and communications between the 4DO node 1400 of FIG. 14 and an example 4DO aggregator 1802, in accordance with at least one embodiment. A horizontal LINE1826 visually separates the components, functions, and communications of the 4DO node 1400 above the LINE from those of the 4DO aggregator 1802 below the LINE. As discussed below, there are example REST APIs depicted in FIG. 18, one for each device, denoting example resources that one or both devices may expose to an external interface in various different embodiments, such that this information could be queryable by, as examples, other nodes or derived technologies such as web services or analytics, perhaps providing access to the scene representations at intermediate and final levels. A number of the functions and communications that are depicted in FIG. 18 are discussed at length elsewhere in this disclosure, and so are discussed only briefly here.

A perceived-volumetric-map generator 1806 receives a point cloud 1804, generates a current perceived volumetric map from its newest instantaneous volumetric map and perhaps one or more other recent instantaneous volumetric maps. The perceived-volumetric-map generator 1806 outputs this newest instantaneous volumetric map to both the local volumetric map 1808 and a local comparator 1814. The local volumetric map 1808 may be updated based on the newest instantaneous volumetric map, and a copy of the local volumetric map 1808 may be updated similarly by the local comparator 1814, which may then subtract the local baseline map 1816 from the result of that previous operation.

The 4DO node 1400 in this example depiction includes a 4DO node REST-API access 1822 that includes both the local comparator 1814 and the local baseline map 1816, such that inquiring parties may be able to query for data stored in the local baseline map 1816 and/or for the local deltas that the local comparator 1814 outputs in this scenario to an aggregator controller 1818 of the 4DO aggregator 1802. The aggregator controller 1818 may be arranged to update its aggregator global map 1810 based on local deltas from the 4DO node 1400, as well as from node deltas 1812 from one or more other 4DO nodes that may be peers of the 4DO node 1400 in a given mesh. The aggregator controller 1818 also broadcasts aggregator deltas 1820 out to all 4DO nodes in the network. The 4DO aggregator 1802 in this example includes a 4DO aggregator REST-API access 1824 that includes (e.g., exposes) both the aggregator global map 1810 and the aggregator controller 1818.

Figure 19:
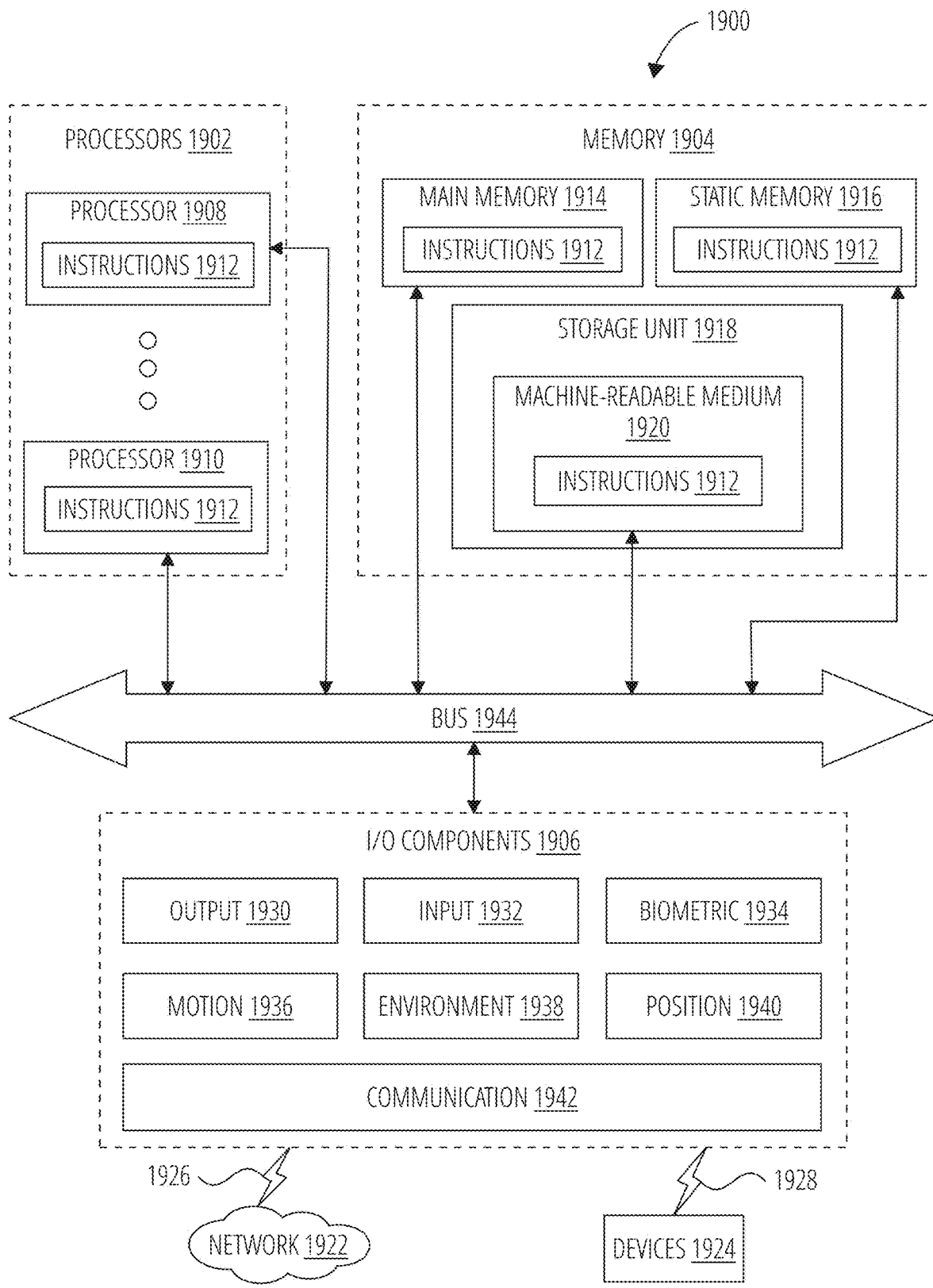
FIG. 19 depicts an example computer system, in accordance with at least one embodiment.

FIG. 19 illustrates an example computer system 1900 within which instructions 1912 (e.g., software, a program, an application, an applet, an app, and/or other executable code) for causing the computer system 1900 to perform any one or more of the methodologies discussed herein may be executed. For example, execution of the instructions 1912 may cause the computer system 1900 to perform any one or more of the methods described herein. The instructions 1912 transform the general, non-programmed computer system 1900 into a particular computer system 1900 programmed to carry out the described and illustrated functions in the manner described. The computer system 1900 may operate as a standalone device or may be coupled (e.g., networked) to other machines. In a networked deployment, the computer system 1900 may operate in the capacity of a server machine or a client machine in a server-client network environment, or as a peer machine in a peer-to-peer (or distributed) network environment.

The computer system 1900 may be or include, but is limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 1912, sequentially or otherwise, that specify actions to be taken by the computer system 1900. Further, while only a single computer system 1900 is illustrated, the term "machine" shall also be taken to include a collection of machines that individually or jointly execute the instructions 1912 to perform any one or more of the methodologies discussed herein.

The computer system 1900 may include processors 1902, memory 1904, and I/O components 1906, which may be configured to communicate with each other via a bus 1944. In an example embodiment, the processors 1902 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 1908 and a processor 1910 that execute the instructions 1912. The term "processor" is intended to include multi-core processors that may include two or more independent processors (sometimes referred to as "cores") that may execute instructions contemporaneously. Although FIG. 19 shows multiple processors 1902, the computer system 1900 may include a single processor with a single core, a single processor with multiple cores (e.g., a multi-core processor), multiple processors with a single core, multiple processors with multiples cores, or any combination thereof.

The memory 1904 includes a main memory 1914, a static memory 1916, and a storage unit 1918, each of which is accessible to the processors 1902 via the bus 1944. The memory 1904, the static memory 1916, and/or the storage unit 1918 may store the instructions 1912 executable for performing any one or more of the methodologies or functions described herein. The instructions 1912 may also or instead reside completely or partially within the main memory 1914, within the static memory 1916, within machine-readable medium 1920 within the storage unit 1918, within at least one of the processors 1902 (e.g., within a cache memory of a given one of the processors 1902), and/or any suitable combination thereof, during execution thereof by the computer system 1900. The machine-readable medium 1920 is one or more non-transitory computer-readable storage media.

The I/O components 1906 may include a wide variety of components to receive input, produce and/or provide output, transmit information, exchange information, capture measurements, and/or the like. The specific/O components 1906 that are included in a particular instance of the computer system 1900 will depend on the type of machine. For example, portable machines such as mobile phones may include a touch input device or other such input mechanisms, while a headless server machine may not include such a touch input device. It will be appreciated that the I/O components 1906 may include many other components that are not shown in FIG. 19.

In various example embodiments, the I/O components 1906 may include output components 1930 and input components 1932. The output components 1930 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 1932 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 1906 may include biometric components 1934, motion components 1936, environmental components 1938, and/or position components 1940, among a wide array of other components.

The biometric components 1934 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, and/or electroencephalogram-based identification), and/or the like.

The motion components 1936 may include acceleration-sensing components (e.g., an accelerometer), gravitation-sensing components, rotation-sensing components (e.g., a gyroscope), etc.

The environmental components 1938 may include, for example, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors that detect nearby objects), gas-sensing components (e.g., gas-detection sensors to detection concentrations of hazardous gases for safety and/or to measure pollutants in the atmosphere), and/or other components that may provide indications, measurements, signals, and/or the like that correspond to a surrounding physical environment. The position components 1940 may include location-sensing components (e.g., a global positioning system (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 1906 may further include communication components 1942 operable to communicatively couple the computer system 1900 to a network 1922 and/or devices 1924 via a coupling 1926 and/or a coupling 1928, respectively. For example, the communication components 1942 may include a network-interface component or another suitable device to interface with the network 1922. In further examples, the communication components 1942 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 1924 may include one or more other machines and/or any of a wide variety of peripheral devices (e.g., a peripheral device coupled via a universal serial bus (USB) connection).

Moreover, the communication components 1942 may detect identifiers or include components operable to detect identifiers. For example, the communication components 1942 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 1942, such as location via Internet Protocol (IP) geolocation, location via Wi-Fi signal triangulation, location via detecting an NFC beacon signal that may indicate a particular location, and/or the like.

One or more of the various memories (e.g., the memory 1904, the main memory 1914, the static memory 1916, and/or the (e.g., cache) memory of one or more of the processors 1902) and/or the storage unit 1918 may store one or more sets of instructions (e.g., software) and/or data structures embodying or used by any one or more of the methodologies or functions described herein. These instructions (e.g., the instructions 1912), when executed by one or more of the processors 1902, cause various operations to implement various embodiments of the present disclosure.

The instructions 1912 may be transmitted or received over the network 1922, using a transmission medium, via a network-interface device (e.g., a network-interface component included in the communication components 1942) and using any one of a number of well-known transfer protocols (e.g., the Session Initiation Protocol (SIP), the hypertext transfer protocol (HTTP), and/or the like). Similarly, the instructions 1912 may be transmitted or received using a transmission medium via the coupling 1928 (e.g., a peer-to-peer coupling) to the devices 1924.

Figure 20:
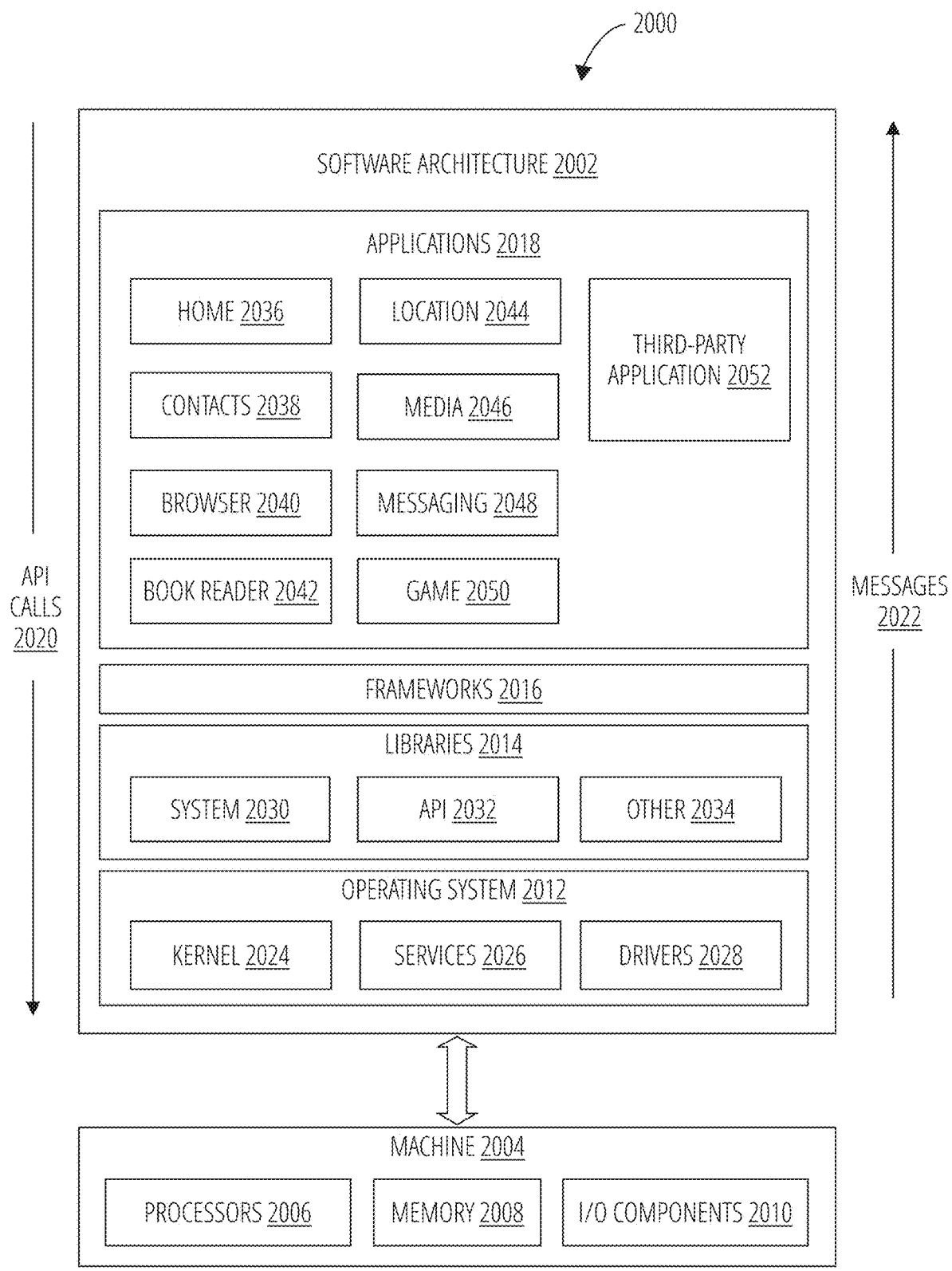
FIG. 20 depicts an example software architecture, in accordance with at least one embodiment.

FIG. 20 is a diagram 2000 illustrating an example software architecture 2002, which can be installed on any one or more of the devices described herein. For example, the software architecture 2002 could be installed on any device or system that is arranged similar to the computer system 1900 of FIG. 19. The software architecture 2002 is supported by hardware such as a machine 2004 that includes processors 2006, memory 2008, and I/O components 2010. In this example, the software architecture 2002 can be conceptualized as a stack of layers, where each layer provides a particular functionality. The software architecture 2002 includes layers such an operating system 2012, libraries 2014, frameworks 2016, and applications 2018. Operationally, using one or more application programming interfaces (APIs), the applications 2018 invoke API calls 2020 through the software stack and receive messages 2022 in response to the API calls 2020.

The operating system 2012 manages hardware resources and provides common services. The operating system 2012 includes, for example, a kernel 2024, services 2026, and drivers 2028. The kernel 2024 acts as an abstraction layer between the hardware and the other software layers. For example, the kernel 2024 may provide memory management, processor management (e.g., scheduling), component management, networking, and/or security settings, in some cases among other functionality. The services 2026 can provide other common services for the other software layers. The drivers 2028 are responsible for controlling or interfacing with the underlying hardware. For instance, the drivers 2028 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 2014 provide a low-level common infrastructure used by the applications 2018. The libraries 2014 can include system libraries 2030 (e.g., a C standard library) that provide functions such as memory-allocation functions, string-manipulation functions, mathematic functions, and/or the like. In addition, the libraries 2014 can include API libraries 2032 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 2014 can also include a wide variety of other libraries 2034 to provide many other APIs to the applications 2018.

The frameworks 2016 may provide a high-level common infrastructure that is used by the applications 2018. For example, the frameworks 2016 may provide various graphical user interface (GUI) functions, high-level resource management, high-level location services, and/or the like. The frameworks 2016 can provide a broad spectrum of other APIs that can be used by the applications 2018, some of which may be specific to a particular operating system or platform.

Purely as representative examples, the applications 2018 may include a home application 2036, a contacts application 2038, a browser application 2040, a book-reader application 2042, a location application 2044, a media application 2046, a messaging application 2048, a game application 2050, and/or a broad assortment of other applications generically represented in FIG. 20 as a third-party application 2052. The applications 2018 are programs that execute functions defined in the programs. Various programming languages can be employed to create one or more of the applications 2018, structured in a variety of manners, such as object-oriented programming languages (e.g., Objective-C, Java, C++, etc.), procedural programming languages (e.g., C, assembly language, etc.), and/or the like. In a specific example, the third-party application 2052 (e.g., an application developed using the ANDROID™ or IOS™ software development kit (SDK) by an entity other than the vendor of the particular platform) could be mobile software running on a mobile operating system such as IOS™, ANDROD™, WINDOWS® Phone, and/or the like. In this example, the third-party application 2052 can invoke the API calls 2020 provided by the operating system 2012 to facilitate functionality described herein.

In view of the disclosure above, various examples are set forth below. It should be noted that one or more features of an example, taken in isolation or combination, should be considered within the disclosure of this application.

Example 1 is a system that includes a processor configured to receive a routing-options request for routing options from a first location to a second location, the routing-options request being received from a user device associated with a user; identify, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle; and provide the one or more identified routing options to the user device.

Example 2 is the system of Example 1, where the processor is further configured to retrieve, in response to receiving the routing-options request, the occupancy data by querying the occupancy-measurement system onboard the vehicle.

Example 3 is the system of Example 1 or Example 2, where the occupancy-measurement system includes a person-counting system and the occupancy data includes a current actual occupancy of the vehicle.

Example 4 is the system of any of the Examples 1-3, where the occupancy data includes a predicted occupancy of the vehicle at a time the user boards the vehicle according to the associated identified routing option; and the processor is further configured to generate the predicted occupancy based on historical occupancy data of the vehicle of the associated identified routing option.

Example 5 is the system of any of the Examples 1-4, where the processor is further configured to cause presentation of the occupancy data via a user interface of the user device.

Example 6 is the system of any of the Examples 1-5, where the processor is further configured to select, based at least in part on one or both of the occupancy data and one or more travel preferences in a stored user profile associated with the user, a recommendation order for the one or more identified routing options; and cause presentation of one or more of the identified routing options according to the selected recommendation order.

Example 7 is the system of any of the Examples 1-6, where the processor is configured to identify the one or more routing options based also at least in part on one or more travel preferences in a stored user profile associated with the user.

Example 8 is the system of Example 6 or Example 7, where the stored user profile lists one or more personal vehicles available to the user; and the processor is configured to include, in the one or more identified routing options, at least one routing option that utilizes at least one of the listed personal vehicles.

Example 9 is the system of any of the Examples 6-8, where the stored user profile specifies a preferred maximum occupancy of the vehicle; and the processor is configured to include, in the one or more identified routing options, routing options in which one or both of an actual occupancy of the vehicle; and a predicted occupancy of the vehicle at a time the user boards the vehicle according to the associated identified routing option is less than the specified preferred maximum occupancy.

Example 10 is the system of any of the Examples 6-9, where the stored user profile specifies a preference for a first travel modality over a second travel modality; and the processor is configured to prioritize, in the one or more identified routing options, at least one routing option that includes the first travel modality and not the second travel modality over at least one routing option that includes the second travel modality.

Example 11 is the system of any of the Examples 6-10, where the stored user profile includes a first travel preference of the user, a second travel preference of the user, and an indication of a higher importance to the user of the first travel preference as compared to the second travel preference; and the processor is configured to prioritize, in the one or more identified routing options, a first routing option that aligns with the first travel preference of the user over a second routing option that aligns with the second travel preference of the user but does not align with the first travel preference of the user.

Example 12 is the system of Example 11, where the indication in the stored user profile of the higher importance to the user of the first travel preference as compared to the second travel preference reflects input received from the user via a user interface of the user device upon presentation to the user of a graphical tool with which users can visually specify a relative importance to them as between at least the first and second travel preferences.

Example 13 is the system of any of the Examples 1-12, where the processor is further configured to receive a boarding-status message from the user device, the boarding-status message indicating that the user completed boarding the vehicle, and responsively update an actual occupancy of the vehicle to reflect the completion.

Example 14 is the system of any of the Examples 1-13, where the processor is further configured to receive a timing-update message from a second user device, the timing-update message indicating a delay for a particular routing option among the one or more identified routing options; and modify, in response to receiving the timing-update message, the particular routing option to reflect the delay.

Example 15 is the system of any of the Examples 1-14, where the processor being configured to provide the one or more identified routing options to the user device includes the processor being configured to transmit the one or more identified routing options to the user device together with an instruction to present the one or more identified routing options to the user.

Example 16 is a system including communication means for receiving a routing-options request for routing options from a first location to a second location, the routing-options request being received from a user device; and route-identification means for identifying, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle, the communication means being further for providing the one or more identified routing options to the user device.

Example 17 is the system of Example 16, where the occupancy data includes a predicted occupancy of the vehicle at a time the user boards the vehicle according to the associated identified routing option; and the system further includes vehicle-occupancy-prediction means for generating the predicted occupancy based on historical occupancy data of the vehicle of the associated identified routing option.

Example 18 is one or more non-transitory computer-readable storage media containing instructions that, when executed by at least one hardware processor, cause the at least one hardware processor to perform operations including receiving a routing-options request for routing options from a first location to a second location, the routing-options request being received from a user device associated with a user; identifying, responsive to receiving the routing-options request, one or more routing options from the first location to the second location based at least in part on occupancy data for a vehicle for at least one portion of at least one of the identified routing options, the occupancy data being based on an output of an automated occupancy-measurement system onboard the vehicle; and providing the one or more identified routing options to the user device.

Example 19 is the one or more non-transitory computer-readable storage media of Example 18, where the operations further include retrieving, in response to receiving the routing-options request, the occupancy data by querying the occupancy-measurement system onboard the vehicle; and the occupancy-measurement system includes a person-counting system and the occupancy data includes a current actual occupancy of the vehicle.

Example 20 is the one or more non-transitory computer-readable storage media of Example 18 or Example 19, where the occupancy data includes a predicted occupancy of the vehicle at a time the user boards the vehicle according to the associated identified routing option; and the operations further include generating the predicted occupancy based on historical occupancy data of the vehicle of the associated identified routing option.

Example 21 is the one or more non-transitory computer-readable storage media of any of the Examples 18-20, where the identifying of the one or more routing options is also based at least in part on one or more travel preferences in a stored user profile associated with the user.

Example 22 is the one or more non-transitory computer-readable storage media of Example 21, where the stored user profile specifies a preferred maximum occupancy of the vehicle; and the operations further include including, in the one or more identified routing options, routing options in which one or both of an actual occupancy of the vehicle: and a predicted occupancy of the vehicle at a time the user boards the vehicle according to the associated identified routing option is less than the specified preferred maximum occupancy.

Example 23 is the one or more non-transitory computer-readable storage media of Example 21 or Example 22, where the stored user profile specifies a preference for a first travel modality over a second travel modality; and the operations further include prioritizing, in the one or more identified routing options, at least one routing option that includes the first travel modality and not the second travel modality over at least one routing option that includes the second travel modality.

Example 24 is the one or more non-transitory computer-readable storage media of any of the Examples 18-23, the operations further including receiving a boarding-status message from the user device, the boarding-status message indicating that the user completed boarding the vehicle, and responsively updating an actual occupancy of the vehicle to reflect the completion.

Example 25 is the one or more non-transitory computer-readable storage media of any of the Examples 18-24, the operations further including receiving, from a 4D occupancy node, a time series of a volumetric-occupancy index for an intermediate location of a potential routing option; and processing the time series to derive therefrom an estimate of a number of people currently at the intermediate location, where the identifying of the one or more routing options is also based in part on the derived estimate.

Example 26 is a volumetric-occupancy node including an active range-sensing device, a wireless-communication interface, and a processor configured to perform operations including obtaining, from the active range-sensing device, a current point cloud representative of a monitored space in which the volumetric-occupancy node is positioned; generating a current volumetric map of the monitored space based on the current point cloud, computing current local deltas for the monitored space by subtracting a baseline volumetric map of the monitored space from a first volumetric map maintained of the monitored space by the volumetric-occupancy node, the first volumetric map having been updated to reflect any differences between it and the current volumetric map; applying the current local deltas as changes to a second volumetric map maintained of the monitored space by the volumetric-occupancy node; computing, based on one or both of the first and second volumetric maps, a volumetric-occupancy index indicative of a current volumetric occupancy of the monitored space; and transmitting the volumetric-occupancy index via the wireless-communication interface to at least one receiving computer system.

Example 27 is the volumetric-occupancy node of Example 26, where the volumetric-occupancy node is a node in a mesh that further includes one or more peer volumetric-occupancy nodes that each have a sensing volume that overlaps that of the volumetric-occupancy node in the monitored space; and the operations further include broadcasting the current local deltas via the wireless-communication interface for receipt by one or more of the peer volumetric-occupancy nodes in the mesh.

Example 28 is the volumetric-occupancy node of Example 27, the operations further including receiving peer deltas broadcast by one or more of the peer volumetric-occupancy nodes, the peer deltas including likelihood values for particular voxels: and applying the peer deltas as updates to the second volumetric map.

Example 29 is the volumetric-occupancy node of Example 27 or Example 28, the operations further including performing a baseline-calibration process including using the active range-sensing device to collect, during a baseline-calibration time period, point clouds representative of the monitored space; identifying a set of voxels that across a plurality of point clouds collected during the baseline-calibration time period, exhibited less than a threshold amount of change; and saving the identified set of voxels as the baseline volumetric map of the monitored space.

Example 30 is the volumetric-occupancy node of any of the Examples 26-29, the operations further including obtaining one or more link-quality metrics of a wireless link with the at least one receiving device; and selecting a granularity at which to broadcast the current local deltas based at least in part on the obtained one or more link-quality metrics.

Example 31 is the volumetric-occupancy node of any of the Examples 26-30, where the current volumetric map is generated as a combination of a current instantaneous volumetric map of the monitored space as generated from the current point cloud together with one or more preceding instantaneous volumetric maps of the monitored space as generated by the volumetric-occupancy node from previous point clouds of the monitored space.

Example 32 is the volumetric-occupancy node of any of the Examples 26-31, where the first and second volumetric maps of the monitored space each include voxels, each voxel including a likelihood value indicative of a likelihood that the voxel is occupied in the monitored space.

Example 33 is the volumetric-occupancy node of Example 32, where the voxels of the first and second volumetric maps are stored in leaf nodes of first and second n-tree structures each including its leaf nodes, a root node, and a plurality of intermediate nodes between its leaf nodes and its root node, the root node and each intermediate node having at most a positive integer n child nodes.

Example 34 is the volumetric-occupancy node of Example 33, where n is a positive-integer power of 2.

Example 35 is the volumetric-occupancy node of Example 33 or Example 34, where n is 4 and the n-tree structures are hexadeca-tree data structures.

Example 36 is the volumetric-occupancy node of any of the Examples 33-35, where, in each of the first and second n-tree structures each leaf node is configured to report its likelihood value to its parent node responsive to initialization and modifications of its likelihood value; and queryable by and via its parent node as to its likelihood value; and each intermediate node has one or more child nodes that are each either a leaf node or an intermediate node that is lower in the n-tree structure than the intermediate node; includes a composite likelihood value that is collectively indicative of likelihood values or composite likelihood values of the one or more child nodes of the intermediate node; and is configured to compute and store therein, and report to its parent node, its composite likelihood value responsive to receiving a likelihood value or composite likelihood value from a child node of the intermediate node.

Example 37 is one or more non-transitory computer-readable storage media containing instructions that, when executed by at least one hardware processor of a volumetric-occupancy node, cause the volumetric-occupancy node to perform operations including obtaining, from an active range-sensing device of the volumetric-occupancy node, a current point cloud representative of a monitored space in which the volumetric-occupancy node is positioned; generating a current volumetric map of the monitored space based on the current point cloud; computing current local deltas for the monitored space by subtracting a baseline volumetric map of the monitored space from a first volumetric map maintained of the monitored space by the volumetric-occupancy node, the first volumetric map having been updated to reflect any differences between it and the current volumetric map; applying the current local deltas as changes to a second volumetric map maintained of the monitored space by the volumetric-occupancy node; computing, based on one or both of the first and second volumetric maps, a volumetric-occupancy index indicative of a current volumetric occupancy of the monitored space; and transmitting the volumetric-occupancy index via a wireless-communication interface of the volumetric-occupancy node to at least one receiving computer system.

Example 38 is the one or more non-transitory computer-readable storage media of Example 37, where the volumetric-occupancy node is a node in a mesh that further includes one or more peer volumetric-occupancy nodes that each have a sensing volume that overlaps that of the volumetric-occupancy node in the monitored space; and the operations further include broadcasting the current local deltas via the wireless-communication interface for receipt by one or more of the peer volumetric-occupancy nodes in the mesh.

Example 39 is the one or more non-transitory computer-readable storage media of Example 38, the operations further including receiving peer deltas broadcast by one or more of the peer volumetric-occupancy nodes, the peer deltas including likelihood values for particular voxels; and applying the peer deltas as updates to the second volumetric map.

Example 40 is the one or more non-transitory computer-readable storage media of any of the Examples 37-39, the operations further including performing a baseline-calibration process including using the active range-sensing device to collect, during a baseline-calibration time period, point clouds representative of the monitored space; identifying a set of voxels that across a plurality of point clouds collected during the baseline-calibration time period, exhibited less than a threshold amount of change; and saving the identified set of voxels as the baseline volumetric map of the monitored space.

Example 41 is the one or more non-transitory computer-readable storage media of any of the Examples 37-40, the operations further including obtaining one or more link-quality metrics of a wireless link with the at least one receiving device; and selecting a granularity at which to broadcast the current local deltas based at least in part on the obtained one or more link-quality metrics.

Example 42 is the one or more non-transitory computer-readable storage media of any of the Examples 37-41, where the current volumetric map is generated as a combination of a current instantaneous volumetric map of the monitored space as generated from the current point cloud together with one or more preceding instantaneous volumetric maps of the monitored space as generated by the volumetric-occupancy node from previous point clouds of the monitored space.

Example 43 is the one or more non-transitory computer-readable storage media of any of the Examples 37-42, where the first and second volumetric maps of the monitored space each include voxels, each voxel including a likelihood value indicative of a likelihood that the voxel is occupied in the monitored space.

Example 44 is the one or more non-transitory computer-readable storage media of Example 43, where the voxels of the first and second volumetric maps are stored in leaf nodes of first and second n-tree structures each including its leaf nodes, a root node, and a plurality of intermediate nodes between its leaf nodes and its root node, the root node and each intermediate node having at most a positive integer n child nodes.

Example 45 is the one or more non-transitory computer-readable storage media of Example 44, where n is a positive-integer power of 2.

Example 46 is the one or more non-transitory computer-readable storage media of Example 44 or Example 45, where n is 4 and the n-tree structures are hexadeca-tree data structures.

Example 47 is the one or more non-transitory computer-readable storage media of any of the Examples 44-46, where, in each of the first and second n-tree structures each leaf node is configured to report its likelihood value to its parent node responsive to initialization and modifications of its likelihood value: and queryable by and via its parent node as to its likelihood value; and each intermediate node has one or more child nodes that are each either a leaf node or an intermediate node that is lower in the n-tree structure than the intermediate node; includes a composite likelihood value that is collectively indicative of likelihood values or composite likelihood values of the one or more child nodes of the intermediate node; and is configured to compute and store therein, and report to its parent node, its composite likelihood value responsive to receiving a likelihood value or composite likelihood value from a child node of the intermediate node.

Example 48 is a method performed by a volumetric-occupancy node executing instructions on at least one hardware processor, the method including obtaining, from an active range-sensing device of the volumetric-occupancy node, a current point cloud representative of a monitored space in which the volumetric-occupancy node is positioned; generating a current volumetric map of the monitored space based on the current point cloud, computing current local deltas for the monitored space by subtracting a baseline volumetric map of the monitored space from a first volumetric map maintained of the monitored space by the volumetric-occupancy node, the first volumetric map having been updated to reflect any differences between it and the current volumetric map; applying the current local deltas as changes to a second volumetric map maintained of the monitored space by the volumetric-occupancy node; computing, based on one or both of the first and second volumetric maps, a volumetric-occupancy index indicative of a current volumetric occupancy of the monitored space; and transmitting the volumetric-occupancy index via a wireless-communication interface of the volumetric-occupancy node to at least one receiving computer system.

Example 49 is the method of Example 48, where the volumetric-occupancy node is a node in a mesh that further includes one or more peer volumetric-occupancy nodes that each have a sensing volume that overlaps that of the volumetric-occupancy node in the monitored space; and the method further includes broadcasting the current local deltas via the wireless-communication interface for receipt by one or more of the peer volumetric-occupancy nodes in the mesh.

Example 50 is the method of Example 49, further including receiving peer deltas broadcast by one or more of the peer volumetric-occupancy nodes, the peer deltas including likelihood values for particular voxels; and applying the peer deltas as updates to the second volumetric map.

Example 51 is the method of any of the Examples 48-50, further including performing a baseline-calibration process including using the active range-sensing device to collect, during a baseline-calibration time period, point clouds representative of the monitored space; identifying a set of voxels that across a plurality of point clouds collected during the baseline-calibration time period, exhibited less than a threshold amount of change; and saving the identified set of voxels as the baseline volumetric map of the monitored space.

Example 52 is the method of any of the Examples 48-51, further including obtaining one or more link-quality metrics of a wireless link with the at least one receiving device; and selecting a granularity at which to broadcast the current local deltas based at least in part on the obtained one or more link-quality metrics.

Example 53 is the method of any of the Examples 48-52, where the current volumetric map is generated as a combination of a current instantaneous volumetric map of the monitored space as generated from the current point cloud together with one or more preceding instantaneous volumetric maps of the monitored space as generated by the volumetric-occupancy node from previous point clouds of the monitored space.

Example 54 is the method of any of the Examples 48-53, where the first and second volumetric maps of the monitored space each include voxels, each voxel including a likelihood value indicative of a likelihood that the voxel is occupied in the monitored space.

Example 55 is the method of Example 53 or Example 54, where the voxels of the first and second volumetric maps are stored in leaf nodes of first and second n-tree structures each including its leaf nodes, a root node, and a plurality of intermediate nodes between its leaf nodes and its root node, the root node and each intermediate node having at most a positive integer n child nodes.

Example 56 is the method of Example 55, where n is a positive-integer power of 2.

Example 57 is the method of Example 55 or Example 56, where n is 4 and the n-tree structures are hexadeca-tree data structures.

Example 58 is the method of any of the Examples 55-57, where, in each of the first and second n-tree structures each leaf node is configured to report its likelihood value to its parent node responsive to initialization and modifications of its likelihood value; and queryable by and via its parent node as to its likelihood value; and each intermediate node has one or more child nodes that are each either a leaf node or an intermediate node that is lower in the n-tree structure than the intermediate node; includes a composite likelihood value that is collectively indicative of likelihood values or composite likelihood values of the one or more child nodes of the intermediate node; and is configured to compute and store therein, and report to its parent node, its composite likelihood value responsive to receiving a likelihood value or composite likelihood value from a child node of the intermediate node.

Example 59 is the method of Example 58, where the composite values in the intermediate nodes each include a numerical average of the composite values of all of the nodes in the subtree of the respective intermediate node.

Example 60 is the method of Example 58 or Example 59, where the composite values in the intermediate nodes each include a voxel score indicative of a number of voxels in the leaf nodes in the subtree of the respective intermediate node that have a respective likelihood value that exceeds a likelihood-value threshold.

Example 61 is a mobile device including a user interface; a communication interface; at least one hardware processor; and one or more non-transitory computer-readable storage media containing instructions that, when executed by the at least one hardware processor, cause the at least one hardware processor to perform operations including receiving, via the user interface, a routing-options request from a user for routing options from a first location to a second location; identifying, responsive to receiving the routing-options request, one or more routing options from the first location to the second location based at least in part on occupancy data for a vehicle that would be used for at least one portion of at least one of the identified routing options; and presenting, via the user interface, the one or more identified routing options.

Example 62 is the mobile device of Example 61, the operations further including querying, in response to receiving the routing-options request, a network server to retrieve the occupancy data from the network server, the occupancy data having been received by the network server from a person-counting system onboard the vehicle, where the occupancy data includes a current actual occupancy of the at least one vehicle.

Example 63 is the mobile device of Example 61 or Example 62, where the occupancy data includes a predicted occupancy of the vehicle at a time the user would board the vehicle according to the associated identified routing option; and the predicted occupancy was generated based on historical occupancy data of the vehicle in connection with the associated identified routing option.

Example 64 is the mobile device of any of the Examples 61-63, where presenting the one or more identified routing options includes presenting the occupancy data via the user interface.

Example 65 is the mobile device of any of the Examples 61-65, further including selecting, based at least in part on one or both of the occupancy data and one or more travel preferences in a stored user profile associated with the user, a recommendation order for the one or more identified routing options, where presenting the one or more identified routing options includes presenting the one or more identified routing options according to the selected recommendation order.

Example 66 is the mobile device of any of the Examples 61-66, where the identifying of the one or more routing options is also based at least in part on one or more travel preferences in a stored user profile associated with the user.

Example 67 is the mobile device of Example 66, where the stored user profile lists one or more personal vehicles available to the user; and the identifying of the one or more routing options includes including, in the one or more identified routing options, at least one routing option that would utilize at least one of the listed personal vehicles.

Example 68 is the mobile device of Example 66 or Example 67, where the stored user profile specifies a preferred maximum occupancy with respect to the vehicle; and the identifying of the one or more routing options includes only including, in the one or more identified routing options, routing options in which one or both of an actual occupancy of the vehicle; and a predicted occupancy of the vehicle at a time the user would board the vehicle according to the associated identified routing option is less than the specified preferred maximum occupancy.

Example 69 is the mobile device of any of the Examples 66-68, where the stored user profile specifies a preference for a first travel modality over a second travel modality; and the identifying of the one or more routing options includes prioritizing, in the one or more identified routing options, at least one routing option that involves the first travel modality and not the second travel modality over at least one routing option that involves the second travel modality.

Example 70 is the mobile device of any of the Examples 66-69, where the stored user profile specifies an importance to the user of using environmentally friendly travel modalities; and the identifying of the one or more routing options includes prioritizing, in the one or more identified routing options, at least one routing option that involves at least one of walking, biking, using at least one electric vehicle, and using public transportation.

Example 71 is the mobile device of any of the Examples 66-70, where the operations further include presenting, via the user interface, a graphical tool with which a user can visually specify a relative importance to the user of at least a first travel preference in the stored user profile over a second travel preference in the stored user profile; and the identifying of the one or more routing options includes prioritizing, in the one or more identified routing options, at least one routing option that aligns with the first travel preference of the user over a routing option that aligns with the second travel preference of the user and does not align with the first travel preference of the user.

Example 72 is the mobile device of any of the Examples 61-71, the operations further including presenting, via the user interface, a prompt requesting a confirmation that the user has boarded the vehicle; and receiving the confirmation via the user interface, and responsively transmitting an update message to a server to update an actual occupancy of the vehicle to reflect that the user has boarded the vehicle.

Example 73 is the mobile device of any of the Examples 61-72, further including receiving a route-update message sent by a second mobile device, the message informing of a delay in connection with a particular routing option among the one or more identified routing options; and modifying, in response to receiving the route-update message, the particular routing option to include the delay.

Example 74. One or more non-transitory computer-readable storage media containing instructions that, when executed by at least one hardware processor, cause the at least one hardware processor to perform operations including receiving, via the user interface, a routing-options request from a user for routing options from a first location to a second location; identifying, responsive to receiving the routing-options request, one or more routing options from the first location to the second location based at least in part on occupancy data for a vehicle that would be used for at least one portion of at least one of the identified routing options; and presenting, via the user interface, the one or more identified routing options.

Example 75 is the one or more non-transitory computer-readable storage media of Example 74, the operations further including querying, in response to receiving the routing-options request, a network server to retrieve the occupancy data from the network server, the occupancy data having been received by the network server from a person-counting system onboard the vehicle, where the occupancy data includes a current actual occupancy of the at least one vehicle.

Example 76 is the one or more non-transitory computer-readable storage media of Example 74 or Example 75, where the occupancy data includes a predicted occupancy of the vehicle at a time the user would board the vehicle according to the associated identified routing option; and the predicted occupancy was generated based on historical occupancy data of the vehicle in connection with the associated identified routing option.

Example 77 is the one or more non-transitory computer-readable storage media of any of the Examples 74-76, where the identifying of the one or more routing options is also based at least in part on one or more travel preferences in a stored user profile associated with the user.

Example 78 is the one or more non-transitory computer-readable storage media of Example 77, where the stored user profile specifies a preferred maximum occupancy with respect to the vehicle; and the identifying of the one or more routing options includes only including, in the one or more identified routing options, routing options in which one or both of an actual occupancy of the vehicle; and a predicted occupancy of the vehicle at a time the user would board the vehicle according to the associated identified routing option is less than the specified preferred maximum occupancy.

Example 79 is the one or more non-transitory computer-readable storage media of Example 77 or Example 78, where the operations further include presenting, via the user interface, a graphical tool with which a user can visually specify a relative importance to the user of at least a first travel preference in the stored user profile over a second travel preference in the stored user profile; and the identifying of the one or more routing options includes prioritizing, in the one or more identified routing options, at least one routing option that aligns with the first travel preference of the user over a routing option that aligns with the second travel preference of the user and does not align with the first travel preference of the user.

Example 80. A method performed by a computer system executing instructions on at least one hardware processor, the method including receiving, via the user interface, a routing-options request from a user for routing options from a first location to a second location; identifying, responsive to receiving the routing-options request, one or more routing options from the first location to the second location based at least in part on occupancy data for a vehicle that would be used for at least one portion of at least one of the identified routing options; and presenting, via the user interface, the one or more identified routing options.

Example 81 is the method of Example 80, further including querying, in response to receiving the routing-options request, a network server to retrieve the occupancy data from the network server, the occupancy data having been received by the network server from a person-counting system onboard the vehicle, where the occupancy data includes a current actual occupancy of the at least one vehicle.

Example 82 is the method of Example 80 or Example 81, where the occupancy data includes a predicted occupancy of the vehicle at a time the user would board the vehicle according to the associated identified routing option; and the predicted occupancy was generated based on historical occupancy data of the vehicle in connection with the associated identified routing option.

Example 83 is the method of any of the Examples 80-82, where the identifying of the one or more routing options is also based at least in part on one or more travel preferences in a stored user profile associated with the user.

Example 84 is the method of Example 83, where the stored user profile specifies a preferred maximum occupancy with respect to the vehicle; and the identifying of the one or more routing options includes only including, in the one or more identified routing options, routing options in which one or both of an actual occupancy of the vehicle; and a predicted occupancy of the vehicle at a time the user would board the vehicle according to the associated identified routing option is less than the specified preferred maximum occupancy.

Example 85 is the method of any of the Examples 80-84, further including using a 4D occupancy node to generate a time series of a volumetric-occupancy index for an intermediate location on a potential routing option; and receiving and processing the time series to derive therefrom an estimate of a number of people currently at the intermediate location, where the identifying of the one or more routing options is also based on the derived estimate.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

Any component of a device, system, and/or the like that is referred to in the present disclosure as a module includes both hardware and executable instructions, and could be realized in or as a single component or could be distributed across multiple components. When executed by the hardware, the instructions cause the hardware to perform (e.g., execute, carry out, and the like) the one or more operations (e.g., functions) that are described herein as being performed by the module. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more hardware devices and/or hardware components of any other type deemed suitable by those of skill in the art for a given implementation. The instructions could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Additionally, as used in this disclosure, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, in this disclosure, this manner of phrasing does not mean "at least one of A and at least one of B," "at least one of A, at least one of B, and at least one of C," and so on. As used in this disclosure, the two-element version covers each of the following: one or more of A and no B, one or more of B and no A, and one or more of A and one or more of B. And similarly for the three-element version and beyond. Similar construction should be given to such phrases in which "one or more" is used in place of "at least one," again unless explicitly stated otherwise in connection with a particular instance.

Moreover, consistent with the fact that the entities and arrangements that are described herein, including the entities and arrangements that are depicted in and described in connection with the drawings, are presented as examples and not by way of limitation, any and all statements or other indications as to what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively self-qualified by such a clause. It is for reasons akin to brevity and clarity of presentation that this implied self-qualifying clause is not repeated ad nauseum in this disclosure.

What is claimed is:

1. A computing system comprising memory and processor circuitry, the processor circuitry configured to:
   receive a routing-options request for routing options from a first location to a second location, the routing-options request being received from a user device associated with a user;
   identify, responsive to receiving the routing-options request, one or more routing options from the first location to the second location based at least in part on measured occupancy data for a respective vehicle and predicted occupancy data for the respective vehicle, the respective vehicle being used for at least one portion of the one or more identified routing options,
   wherein the measured occupancy data is based on an output of an automated occupancy-measurement system onboard the respective vehicle that generates a current occupancy level,
   wherein the predicted occupancy data is based on an output of a predictive model that generates a predicted occupancy level of the respective vehicle at an estimated time for the user to board the respective vehicle according to the one or more identified routing options, and with the predicted occupancy level of the respective vehicle changing over time for the one or more identified routing options, and
   wherein an occupancy level of the respective vehicle is an amount of a space capacity of the respective vehicle that is occupied; and
   provide the one or more identified routing options to the user device, wherein the user device is adapted to present information in a user interface including the measured occupancy data and the predicted occupancy data.

2. The computing system of claim 1, wherein the processor circuitry is further configured to retrieve, in response to receiving the routing-options request, the measured occupancy data by querying the automated occupancy-measurement system onboard the respective vehicle.

3. The computing system of claim 1, wherein the automated occupancy-measurement system comprises a person-counting system and the measured occupancy data comprises a current actual occupancy of the respective vehicle.

4. The computing system of claim 1, wherein:
   the processor circuitry is further configured to generate the predicted occupancy level based on historical occupancy data of the respective vehicle of the one or more identified routing options.

5. The computing system of claim 1, wherein the processor circuitry is further configured to:
   select, based at least in part on one or more of the measured occupancy data, the predicted occupancy data, and one or more travel preferences in a stored user profile associated with the user, a recommendation order for the one or more identified routing options; and
   cause presentation of the one or more identified routing options according to the selected recommendation order.

6. The computing system of claim 1, wherein the processor circuitry is configured to identify the one or more routing options based also at least in part on one or more travel preferences in a stored user profile associated with the user.

7. The computing system of claim 6, wherein:
   the stored user profile lists one or more personal vehicles available to the user; and
   the processor circuitry is configured to include, in the one or more identified routing options, at least one routing option that utilizes at least one of the one or more listed personal vehicles.

8. The computing system of claim 6, wherein:
   the stored user profile specifies a preferred maximum occupancy of the respective vehicle; and
   the processor circuitry is configured to include, in the one or more identified routing options, routing options in which one or both of:
   an actual occupancy level of the respective vehicle is less than the specified preferred maximum occupancy; and
   the predicted occupancy level of the respective vehicle at or after the estimated time the user boards the respective vehicle according to the one or more identified routing options is less than the specified preferred maximum occupancy.

9. The computing system of claim 6, wherein:
   the stored user profile specifies a preference for a first travel modality over a second travel modality; and
   the processor circuitry is configured to prioritize, in the one or more identified routing options, at least one routing option that includes the first travel modality and excludes the second travel modality over at least one routing option that includes the second travel modality.

10. The computing system of claim 6, wherein:
the stored user profile comprises a first travel preference of the user, a second travel preference of the user, and an indication of a higher importance to the user of the first travel preference as compared to the second travel preference; and
the processor circuitry is configured to prioritize, in the one or more identified routing options, a first routing option that aligns with the first travel preference of the user over a second routing option that aligns with the second travel preference of the user but does not align with the first travel preference of the user.

11. The computing system of claim 10, wherein the indication in the stored user profile of the higher importance to the user of the first travel preference as compared to the second travel preference reflects input received from the user via the user interface of the user device, based upon presentation to the user of a graphical tool with which users can visually specify a relative importance between at least the first and second travel preferences.

12. The computing system of claim 1, wherein the processor circuitry is further configured to receive a boarding-status message from the user device, the boarding-status message indicating that the user completed boarding the respective vehicle, and responsively update an actual occupancy of the respective vehicle to reflect the completion.

13. The computing system of claim 1, wherein the processor circuitry is further configured to:
receive a timing-update message from a second user device, the timing-update message indicating a delay for a particular routing option among the one or more identified routing options; and
modify, in response to receiving the timing-update message, the particular routing option to reflect the delay.

14. The computing system of claim 1, wherein to provide the one or more identified routing options to the user device comprises the processor circuitry being configured to transmit the one or more identified routing options to the user device together with an instruction to present the one or more identified routing options to the user.

15. A system comprising:
communication means for receiving a routing-options request for routing options from a first location to a second location, the routing-options request being received from a user device associated with a user; and
route-identification means for identifying, responsive to receiving the routing-options request, one or more routing options from the first location to the second location based at least in part on measured occupancy data for a respective vehicle and predicted occupancy data for the respective vehicle, the respective vehicle being used for at least one portion of the one or more identified routing options,
wherein the measured occupancy data is based on an output of an automated occupancy-measurement system onboard the respective vehicle that generates a current occupancy level,
wherein the predicted occupancy data is based on an output of a predictive model that generates a predicted occupancy level of the respective vehicle at an estimated time for the user to board the respective vehicle according to the one or more identified routing options, and with the predicted occupancy level of the respective vehicle changing over time for the one or more identified routing options, and
wherein an occupancy level of the respective vehicle is an amount of a space capacity of the respective vehicle that is occupied; and
the communication means being further for providing the one or more identified routing options to the user device, to cause the user device to present information in a user interface including the measured occupancy data and the predicted occupancy data.

16. The system of claim 15, wherein:
the system further comprises vehicle-occupancy-prediction means for generating the predicted occupancy level based on historical occupancy data of the respective vehicle of the one or more identified routing options.

17. One or more non-transitory computer-readable storage media containing instructions that, when executed by at least one hardware processor, cause the at least one hardware processor to perform operations comprising:
receiving a routing-options request for routing options from a first location to a second location, the routing-options request being received from a user device associated with a user;
identifying, responsive to receiving the routing-options request, one or more routing options from the first location to the second location based at least in part on measured occupancy data for a respective vehicle and predicted occupancy data for the respective vehicle, the respective vehicle being used for at least one portion of the one or more identified routing options,
wherein the measured occupancy data is based on an output of an automated occupancy-measurement system onboard the respective vehicle that generates a current occupancy level,
wherein the predicted occupancy data is based on an output of a predictive model that generates a predicted occupancy level of the respective vehicle at an estimated time for the user to board the respective vehicle according to the one or more identified routing options, and with the predicted occupancy level of the respective vehicle changing over time for the one or more identified routing options, and
wherein an occupancy level of the respective vehicle is an amount of a space capacity of the respective vehicle that is occupied; and
providing the one or more identified routing options to the user device, wherein the user device is adapted to present information in a user interface including the measured occupancy data and the predicted occupancy data.

18. The one or more non-transitory computer-readable storage media of claim 17, wherein:
the operations further comprise retrieving, in response to receiving the routing-options request, the measured occupancy data by querying the automated occupancy-measurement system onboard the respective vehicle; and
the automated occupancy-measurement system comprises a person-counting system and the measured occupancy data comprises a current actual occupancy of the respective vehicle.

19. The one or more non-transitory computer-readable storage media of claim 17, wherein:
The measured occupancy data comprises a predicted occupancy of the respective vehicle at a time the user boards the respective vehicle according to the one or more identified routing options; and the operations further comprise generating the predicted occupancy based on historical occupancy data of the respective vehicle of the one or more identified routing options.

20. The one or more non-transitory computer-readable storage media of claim 17, wherein the identifying of the one or more routing options is also based at least in part on one or more travel preferences in a stored user profile associated with the user.

21. The one or more non-transitory computer-readable storage media of claim 20, wherein:
the stored user profile specifies a preferred maximum occupancy of the respective vehicle; and
the operations further comprise including, in the one or more identified routing options, routing options in which one or both of:
an actual occupancy of the respective vehicle; and
the predicted occupancy level of the respective vehicle at or after the estimated time the user boards the respective vehicle according to the one or more identified routing options is less than the specified preferred maximum occupancy.

22. The one or more non-transitory computer-readable storage media of claim 21, wherein:
the stored user profile specifies a preference for a first travel modality over a second travel modality; and
the operations further comprise prioritizing, in the one or more identified routing options, at least one routing option that includes the first travel modality and excludes the second travel modality over at least one routing option that includes the second travel modality.

23. The one or more non-transitory computer-readable storage media of claim 17, the operations further comprising receiving a boarding-status message from the user device, the boarding-status message indicating that the user completed boarding the respective vehicle, and responsively updating an actual occupancy of the respective vehicle to reflect the completion.

24. The one or more non-transitory computer-readable storage media of claim 17, the operations further comprising:
receiving, from a 4D occupancy node, a time series of a volumetric-occupancy index for an intermediate location of a potential routing option; and
processing the time series to derive therefrom an estimate of a number of people currently at the intermediate location,
wherein the identifying of the one or more routing options is also based in part on the derived estimate.

\* \* \* \* \*